United States Patent
Scapel et al.

(10) Patent No.: US 12,482,161 B2
(45) Date of Patent: *Nov. 25, 2025

(54) VIRTUAL AVATAR ANIMATION BASED ON FACIAL FEATURE MOVEMENT

(71) Applicant: Apple Inc., Cupertino, CA (US)

(72) Inventors: Nicolas Scapel, Sunnyvale, CA (US); Guillaume Pierre André Barlier, San Mateo, CA (US); Aurelio Guzman, San Jose, CA (US); Jason Rickwald, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 273 days.

This patent is subject to a terminal disclaimer.

(21) Appl. No.: 17/461,014

(22) Filed: Aug. 30, 2021

(65) Prior Publication Data
US 2021/0390753 A1    Dec. 16, 2021

Related U.S. Application Data

(63) Continuation of application No. 16/663,062, filed on Oct. 24, 2019, now Pat. No. 11,107,261.

(60) Provisional application No. 62/794,496, filed on Jan. 18, 2019.

(51) Int. Cl.
*G06T 13/40* (2011.01)
*G06V 40/16* (2022.01)

(52) U.S. Cl.
CPC ............ *G06T 13/40* (2013.01); *G06V 40/166* (2022.01); *G06V 40/169* (2022.01)

(58) Field of Classification Search
CPC ...... A63F 13/213; A63F 13/92; A63F 13/655; G06K 9/00275; G06T 13/40; G06T 19/006; G06T 2215/16

USPC ........................................................ 345/418
See application file for complete search history.

(56) References Cited

U.S. PATENT DOCUMENTS

| 3,633,354 A | 1/1972 | Stemmler |
| 4,847,819 A | 7/1989 | Hong |
| 4,945,521 A | 7/1990 | Klaus |
| 5,383,165 A | 1/1995 | Vaucher |

(Continued)

FOREIGN PATENT DOCUMENTS

| AU | 2015101639 A4 | 12/2015 |
| AU | 2017100683 B4 | 1/2018 |

(Continued)

OTHER PUBLICATIONS

Zollhöfer M, Thies J, Garrido P, Bradley D, Beeler T, Perez P, Stamminger M, Nießner M, Theobalt C. State of the art on monocular 3D face reconstruction, tracking, and applications. InComputer graphics forum May 2018 (vol. 37, No. 2, pp. 523-550).*

(Continued)

*Primary Examiner* — Phu K Nguyen
(74) *Attorney, Agent, or Firm* — DLA Piper LLP (US)

(57) ABSTRACT

The present disclosure generally relates to displaying visual effects such as virtual avatars. An electronic device having a camera and a display apparatus displays a virtual avatar that changes appearance in response to changes in a face in a field of view of the camera. In response to detecting changes in one or more physical features of the face in the field of view of the camera, the electronic device modifies one or more features of the virtual avatar.

48 Claims, 15 Drawing Sheets

(56) References Cited

U.S. PATENT DOCUMENTS

| | | |
|---|---|---|
| 5,559,947 A | 9/1996 | Wugofski |
| 5,995,119 A | 11/1999 | Cosatto et al. |
| 6,084,598 A | 7/2000 | Chekerylla |
| 6,088,040 A | 7/2000 | Oda et al. |
| 6,173,402 B1 | 1/2001 | Chapman |
| 6,323,846 B1 | 11/2001 | Westerman et al. |
| 6,545,682 B1 | 4/2003 | Ventrella et al. |
| 6,570,557 B1 | 5/2003 | Westerman et al. |
| 6,621,524 B1 | 9/2003 | Iijima et al. |
| 6,919,892 B1 | 7/2005 | Cheiky et al. |
| 7,027,054 B1 | 4/2006 | Cheiky et al. |
| 7,046,838 B1 | 5/2006 | Sakagawa et al. |
| 7,180,524 B1 | 2/2007 | Axelrod |
| 7,227,976 B1 | 6/2007 | Jung et al. |
| 7,657,849 B2 | 2/2010 | Chaudhri et al. |
| 7,716,057 B2 | 5/2010 | Horvitz |
| 7,751,285 B1 | 7/2010 | Cain et al. |
| 7,840,668 B1 | 11/2010 | Sylvain et al. |
| 7,908,554 B1 | 3/2011 | Blattner |
| 8,130,219 B2 | 3/2012 | Fleury et al. |
| 8,131,848 B1 | 3/2012 | Denise |
| 8,156,060 B2 | 4/2012 | Borzestowski et al. |
| 8,169,438 B1 | 5/2012 | Baraff et al. |
| 8,234,218 B2 | 7/2012 | Robinson et al. |
| 8,254,647 B1 | 8/2012 | Nechyba et al. |
| 8,280,979 B2 | 10/2012 | Kunz et al. |
| 8,295,546 B2 | 10/2012 | Craig et al. |
| 8,390,628 B2 | 3/2013 | Harding et al. |
| 8,423,089 B2 | 4/2013 | Song et al. |
| 8,488,040 B2 | 7/2013 | Chen et al. |
| 8,506,396 B1 | 8/2013 | Snyder et al. |
| 8,601,379 B2 | 12/2013 | Marks et al. |
| 8,867,849 B1 | 10/2014 | Kirkham et al. |
| 8,896,652 B2 | 11/2014 | Ralston |
| 8,949,618 B1 | 2/2015 | Lee et al. |
| 8,988,490 B2 | 3/2015 | Fujii |
| 9,041,764 B2 | 5/2015 | Wang et al. |
| 9,083,844 B2 | 7/2015 | Tamiya et al. |
| 9,094,576 B1 | 7/2015 | Karakotsios |
| 9,104,908 B1 | 8/2015 | Rogers et al. |
| 9,153,031 B2 | 10/2015 | El-Saban et al. |
| 9,170,645 B2 | 10/2015 | Park et al. |
| 9,207,837 B2 | 12/2015 | Paretti et al. |
| 9,230,241 B1 | 1/2016 | Singh et al. |
| 9,230,355 B1 | 1/2016 | Ahuja et al. |
| 9,245,177 B2 | 1/2016 | Perez |
| 9,246,961 B2 | 1/2016 | Walkin et al. |
| 9,253,223 B1 | 2/2016 | Cushing et al. |
| 9,264,660 B1 | 2/2016 | Petterson et al. |
| 9,269,196 B1 | 2/2016 | Fan et al. |
| 9,298,257 B2 | 3/2016 | Hwang et al. |
| 9,298,263 B2 | 3/2016 | Geisner et al. |
| 9,331,970 B2 | 5/2016 | Yuen et al. |
| 9,349,414 B1 | 5/2016 | Furment et al. |
| 9,411,506 B1 | 8/2016 | Marra et al. |
| 9,448,708 B1 | 9/2016 | Bennett et al. |
| 9,451,210 B1 | 9/2016 | Smus |
| 9,542,070 B2 | 1/2017 | Xu et al. |
| 9,576,400 B2 | 2/2017 | Van Os et al. |
| 9,602,559 B1 | 3/2017 | Barros et al. |
| 9,625,987 B1 | 4/2017 | Lapenna et al. |
| 9,628,416 B2 | 4/2017 | Henderson |
| 9,638,730 B2 | 5/2017 | Umamoto |
| 9,639,974 B2 | 5/2017 | Smith et al. |
| 9,686,497 B1 | 6/2017 | Terry |
| 9,747,716 B1 | 8/2017 | Mallet et al. |
| 9,760,976 B2 | 9/2017 | Kameyama |
| 9,786,084 B1 * | 10/2017 | Bhat ................. G06T 7/73 |
| 9,913,246 B1 | 3/2018 | Carey et al. |
| 9,948,589 B2 | 4/2018 | Gonnen et al. |
| 9,949,697 B2 | 4/2018 | Iscoe et al. |
| 10,062,133 B1 | 8/2018 | Mishra et al. |
| 10,095,385 B2 | 10/2018 | Walkin et al. |
| 10,139,218 B2 | 11/2018 | Matsushita |
| 10,155,168 B2 | 12/2018 | Blackstock et al. |
| 10,169,897 B1 | 1/2019 | Geiger et al. |
| 10,171,985 B1 | 1/2019 | Czajka et al. |
| 10,237,276 B2 | 3/2019 | Gupta |
| 10,262,327 B1 | 4/2019 | Hardebeck et al. |
| 10,270,983 B1 | 4/2019 | Van Os et al. |
| 10,289,265 B2 | 5/2019 | Kulkarni |
| 10,325,416 B1 | 6/2019 | Scapel et al. |
| 10,325,417 B1 | 6/2019 | Scapel et al. |
| 10,341,612 B2 | 7/2019 | Imaoka |
| 10,375,313 B1 | 8/2019 | Van Os et al. |
| 10,376,153 B2 | 8/2019 | Tzvieli et al. |
| 10,379,719 B2 | 8/2019 | Scapel et al. |
| 10,397,391 B1 | 8/2019 | Czajka et al. |
| 10,410,434 B1 | 9/2019 | Scapel et al. |
| 10,505,726 B1 | 12/2019 | Andon et al. |
| 10,521,091 B2 | 12/2019 | Anzures et al. |
| 10,521,948 B2 | 12/2019 | Rickwald et al. |
| 10,580,221 B2 | 3/2020 | Scapel et al. |
| 10,607,065 B2 | 3/2020 | Milman et al. |
| 10,607,419 B2 | 3/2020 | Os et al. |
| 10,620,590 B2 | 4/2020 | Guzman et al. |
| 10,628,985 B2 | 4/2020 | Mishra et al. |
| 10,657,695 B2 | 5/2020 | Chand et al. |
| 10,659,405 B1 | 5/2020 | Chang et al. |
| 10,698,575 B2 | 6/2020 | Walkin et al. |
| 10,708,545 B2 | 7/2020 | Rivard et al. |
| 10,789,753 B2 | 9/2020 | Miller et al. |
| 10,796,480 B2 | 10/2020 | Chen et al. |
| 10,798,035 B2 | 10/2020 | Lewis et al. |
| 10,810,409 B2 | 10/2020 | Bacivarov et al. |
| 10,811,055 B1 | 10/2020 | Kimber et al. |
| 10,817,981 B1 | 10/2020 | Belkin |
| 10,845,968 B2 | 11/2020 | Scapel et al. |
| 10,855,910 B2 | 12/2020 | Tano et al. |
| 10,902,661 B1 | 1/2021 | Mourkogiannis et al. |
| 10,931,813 B1 | 2/2021 | Kim et al. |
| 11,055,889 B2 | 7/2021 | Lee et al. |
| 11,061,372 B1 | 7/2021 | Chen et al. |
| 11,107,261 B2 * | 8/2021 | Scapel ................. G06V 40/166 |
| 11,188,190 B2 | 11/2021 | Blackstock et al. |
| 11,729,339 B2 | 8/2023 | Morii |
| 11,798,246 B2 | 10/2023 | Lee et al. |
| 12,033,296 B2 | 7/2024 | Scapel et al. |
| 2001/0019330 A1 | 9/2001 | Bickmore et al. |
| 2001/0033675 A1 | 10/2001 | Maurer et al. |
| 2001/0047365 A1 | 11/2001 | Yonaitis |
| 2001/0050689 A1 | 12/2001 | Park |
| 2002/0015024 A1 | 2/2002 | Westerman et al. |
| 2002/0054157 A1 | 5/2002 | Hayashi et al. |
| 2002/0061130 A1 | 5/2002 | Kirk et al. |
| 2002/0072993 A1 | 6/2002 | Sandus et al. |
| 2002/0109668 A1 | 8/2002 | Rosenberg et al. |
| 2002/0135581 A1 | 9/2002 | Russell et al. |
| 2003/0135769 A1 | 7/2003 | Loughran |
| 2003/0140309 A1 | 7/2003 | Saito et al. |
| 2003/0154446 A1 | 8/2003 | Constant et al. |
| 2003/0157983 A1 | 8/2003 | Kobayashi et al. |
| 2003/0206170 A1 | 11/2003 | Bickmore et al. |
| 2004/0075699 A1 | 4/2004 | Franchi et al. |
| 2004/0179039 A1 | 9/2004 | Blattner et al. |
| 2004/0203342 A1 | 10/2004 | Sibecas et al. |
| 2004/0225966 A1 | 11/2004 | Besharat et al. |
| 2005/0027716 A1 | 2/2005 | Apfel |
| 2005/0122543 A1 | 6/2005 | Walker |
| 2005/0124389 A1 | 6/2005 | Yang |
| 2005/0137015 A1 | 6/2005 | Rogers et al. |
| 2005/0174216 A1 | 8/2005 | Lintell |
| 2005/0190059 A1 | 9/2005 | Wehrenberg |
| 2005/0190653 A1 | 9/2005 | Chen |
| 2005/0193343 A1 | 9/2005 | Kawabe et al. |
| 2005/0202748 A1 | 9/2005 | Porter |
| 2005/0231513 A1 | 10/2005 | Lebarton et al. |
| 2005/0231625 A1 | 10/2005 | Parulski et al. |
| 2005/0248574 A1 | 11/2005 | Ashtekar et al. |
| 2005/0248582 A1 | 11/2005 | Scheepers et al. |
| 2005/0257042 A1 | 11/2005 | Sierra et al. |
| 2005/0261031 A1 | 11/2005 | Seo et al. |
| 2006/0017692 A1 | 1/2006 | Wehrenberg et al. |
| 2006/0020904 A1 | 1/2006 | Aaltonen et al. |

(56) References Cited

U.S. PATENT DOCUMENTS

| | | |
|---|---|---|
| 2006/0046699 A1 | 3/2006 | Guyot et al. |
| 2006/0143569 A1 | 6/2006 | Kinsella et al. |
| 2006/0166708 A1 | 7/2006 | Kim et al. |
| 2006/0188144 A1 | 8/2006 | Sasaki et al. |
| 2006/0294465 A1 | 12/2006 | Ronen et al. |
| 2007/0003915 A1 | 1/2007 | Templeman |
| 2007/0024614 A1 | 2/2007 | Tam et al. |
| 2007/0025723 A1 | 2/2007 | Baudisch et al. |
| 2007/0052851 A1 | 3/2007 | Ochs et al. |
| 2007/0081081 A1 | 4/2007 | Cheng |
| 2007/0113181 A1 | 5/2007 | Blattner et al. |
| 2007/0127844 A1 | 6/2007 | Watanabe |
| 2007/0168357 A1 | 7/2007 | Mo |
| 2007/0168863 A1 | 7/2007 | Blattner et al. |
| 2007/0171091 A1 | 7/2007 | Nisenboim et al. |
| 2007/0192718 A1 | 8/2007 | Voorhees et al. |
| 2007/0226653 A1 | 9/2007 | Moore et al. |
| 2007/0260984 A1 | 11/2007 | Marks et al. |
| 2008/0052242 A1 | 2/2008 | Merritt et al. |
| 2008/0095470 A1 | 4/2008 | Chao et al. |
| 2008/0098031 A1 | 4/2008 | Ducharme |
| 2008/0133580 A1 | 6/2008 | Wanless et al. |
| 2008/0158232 A1 | 7/2008 | Shuster |
| 2008/0201438 A1 | 8/2008 | Mandre et al. |
| 2008/0242423 A1 | 10/2008 | Kerr et al. |
| 2008/0250315 A1 | 10/2008 | Eronen et al. |
| 2008/0267459 A1 | 10/2008 | Nakada et al. |
| 2008/0298571 A1 | 12/2008 | Kurtz et al. |
| 2008/0300572 A1 | 12/2008 | Rankers et al. |
| 2009/0027337 A1 | 1/2009 | Hildreth |
| 2009/0031240 A1 | 1/2009 | Hildreth |
| 2009/0044113 A1 | 2/2009 | Jones et al. |
| 2009/0055484 A1 | 2/2009 | Vuong et al. |
| 2009/0066817 A1 | 3/2009 | Sakamaki |
| 2009/0077497 A1 | 3/2009 | Cho et al. |
| 2009/0083847 A1 | 3/2009 | Fadell et al. |
| 2009/0132371 A1 | 5/2009 | Strietzel et al. |
| 2009/0144173 A1 | 6/2009 | Mo et al. |
| 2009/0144639 A1 | 6/2009 | Nims et al. |
| 2009/0168756 A1 | 7/2009 | Kurapati et al. |
| 2009/0175509 A1 | 7/2009 | Gonion et al. |
| 2009/0195545 A1 | 8/2009 | Debevec et al. |
| 2009/0201297 A1 | 8/2009 | Johansson |
| 2009/0202114 A1 | 8/2009 | Morin et al. |
| 2009/0216691 A1 | 8/2009 | Borzestowski et al. |
| 2009/0233650 A1 | 9/2009 | Hosono |
| 2009/0251484 A1 | 10/2009 | Zhao et al. |
| 2009/0254859 A1 | 10/2009 | Arrasvuori et al. |
| 2009/0254862 A1 | 10/2009 | Viginisson et al. |
| 2009/0271705 A1 | 10/2009 | Sheng et al. |
| 2009/0297022 A1 | 12/2009 | Pettigrew et al. |
| 2009/0300513 A1 | 12/2009 | Nims et al. |
| 2009/0300525 A1 | 12/2009 | Jolliff et al. |
| 2009/0307629 A1 | 12/2009 | Horiuchi et al. |
| 2009/0312049 A1 | 12/2009 | Isomursu |
| 2009/0325701 A1 | 12/2009 | Andres Del Valle |
| 2010/0007665 A1 | 1/2010 | Smith et al. |
| 2010/0009747 A1 | 1/2010 | Reville et al. |
| 2010/0026640 A1 | 2/2010 | Kim et al. |
| 2010/0030660 A1 | 2/2010 | Edwards |
| 2010/0097375 A1 | 4/2010 | Tadaishi et al. |
| 2010/0123915 A1 | 5/2010 | Kashimoto |
| 2010/0124363 A1 | 5/2010 | Ek et al. |
| 2010/0124941 A1 | 5/2010 | Cho |
| 2010/0149573 A1 | 6/2010 | Pat et al. |
| 2010/0153847 A1 | 6/2010 | Fama |
| 2010/0164684 A1 | 7/2010 | Sasa et al. |
| 2010/0169376 A1 | 7/2010 | Chu |
| 2010/0169801 A1 | 7/2010 | Blattner et al. |
| 2010/0188426 A1 | 7/2010 | Ohmori et al. |
| 2010/0199200 A1 | 8/2010 | Fujioka |
| 2010/0203968 A1 | 8/2010 | Gill et al. |
| 2010/0207721 A1 | 8/2010 | Nakajima et al. |
| 2010/0211899 A1 | 8/2010 | Fujioka |
| 2010/0211900 A1 | 8/2010 | Fujioka |
| 2010/0217808 A1 | 8/2010 | Benninger |
| 2010/0218089 A1 | 8/2010 | Chao et al. |
| 2010/0257469 A1 | 10/2010 | Kim et al. |
| 2010/0277470 A1 | 11/2010 | Margolis |
| 2010/0302138 A1 | 12/2010 | Poot et al. |
| 2010/0317410 A1 | 12/2010 | Song et al. |
| 2010/0322111 A1 | 12/2010 | Li |
| 2011/0007174 A1 | 1/2011 | Bacivarov et al. |
| 2011/0025707 A1 | 2/2011 | Fujioka |
| 2011/0064388 A1 | 3/2011 | Brown et al. |
| 2011/0067098 A1 | 3/2011 | Ruggiero et al. |
| 2011/0072394 A1 | 3/2011 | Victor et al. |
| 2011/0074807 A1 | 3/2011 | Inada et al. |
| 2011/0080356 A1 | 4/2011 | Kang et al. |
| 2011/0119610 A1 | 5/2011 | Hackborn et al. |
| 2011/0221755 A1 | 9/2011 | Geisner et al. |
| 2011/0239115 A1 | 9/2011 | Williams et al. |
| 2011/0248992 A1 | 10/2011 | Van et al. |
| 2011/0249073 A1 | 10/2011 | Cranfill et al. |
| 2011/0249078 A1 | 10/2011 | Abuan et al. |
| 2011/0252344 A1 | 10/2011 | Van |
| 2011/0256848 A1 | 10/2011 | Bok et al. |
| 2011/0292283 A1 | 12/2011 | Stephens |
| 2011/0296324 A1 | 12/2011 | Goossens et al. |
| 2011/0298808 A1 | 12/2011 | Rovik |
| 2011/0304629 A1 | 12/2011 | Winchester |
| 2011/0304632 A1 | 12/2011 | Evertt et al. |
| 2012/0011453 A1 | 1/2012 | Shimono et al. |
| 2012/0017180 A1 | 1/2012 | Flik et al. |
| 2012/0059787 A1 | 3/2012 | Brown et al. |
| 2012/0069028 A1 | 3/2012 | Bouguerra |
| 2012/0075328 A1 | 3/2012 | Goossens |
| 2012/0079377 A1 | 3/2012 | Goossens |
| 2012/0079378 A1 | 3/2012 | Goossens |
| 2012/0081282 A1 | 4/2012 | Chin |
| 2012/0113762 A1 | 5/2012 | Frost |
| 2012/0139830 A1 | 6/2012 | Hwang et al. |
| 2012/0174029 A1 | 7/2012 | Bastide et al. |
| 2012/0179767 A1 | 7/2012 | Clarke et al. |
| 2012/0206452 A1 | 8/2012 | Geisner et al. |
| 2012/0210263 A1 | 8/2012 | Perry et al. |
| 2012/0218125 A1 | 8/2012 | Demirdjian et al. |
| 2012/0223952 A1 | 9/2012 | Kanemaru et al. |
| 2012/0231770 A1 | 9/2012 | Clarke et al. |
| 2012/0233120 A1 | 9/2012 | Nijim et al. |
| 2012/0235790 A1 | 9/2012 | Zhao et al. |
| 2012/0256967 A1 | 10/2012 | Baldwin et al. |
| 2012/0289290 A1 | 11/2012 | Chae et al. |
| 2012/0293686 A1 | 11/2012 | Kam et al. |
| 2012/0299945 A1 | 11/2012 | Aarabi |
| 2012/0309520 A1 | 12/2012 | Evertt et al. |
| 2012/0314047 A1 | 12/2012 | Kasahara et al. |
| 2012/0327183 A1 | 12/2012 | Fujii |
| 2013/0015946 A1 | 1/2013 | Lau et al. |
| 2013/0038759 A1 | 2/2013 | Jo et al. |
| 2013/0067453 A1 | 3/2013 | Luan |
| 2013/0080287 A1 | 3/2013 | Currie et al. |
| 2013/0101164 A1 | 4/2013 | Leclerc et al. |
| 2013/0113956 A1 | 5/2013 | Anderson et al. |
| 2013/0121119 A1 | 5/2013 | Umamoto |
| 2013/0135315 A1 | 5/2013 | Bares et al. |
| 2013/0136341 A1 | 5/2013 | Yamamoto |
| 2013/0141513 A1 | 6/2013 | Setton et al. |
| 2013/0147933 A1 | 6/2013 | Kulas et al. |
| 2013/0148867 A1 | 6/2013 | Wang |
| 2013/0157646 A1 | 6/2013 | Ferren et al. |
| 2013/0159900 A1 | 6/2013 | Pendharkar |
| 2013/0160141 A1 | 6/2013 | Tseng et al. |
| 2013/0176208 A1 | 7/2013 | Tanaka et al. |
| 2013/0194378 A1 | 8/2013 | Brown |
| 2013/0198210 A1 | 8/2013 | Lee et al. |
| 2013/0198296 A1 | 8/2013 | Roy et al. |
| 2013/0201104 A1 | 8/2013 | Ptucha et al. |
| 2013/0234964 A1 | 9/2013 | Kim et al. |
| 2013/0235045 A1 | 9/2013 | Corazza et al. |
| 2013/0238686 A1 | 9/2013 | O'Donoghue et al. |
| 2013/0258040 A1 | 10/2013 | Kaytaz et al. |
| 2013/0286161 A1 | 10/2013 | Lv et al. |
| 2013/0290905 A1 | 10/2013 | Luvogt et al. |

(56) References Cited

U.S. PATENT DOCUMENTS

| | | |
|---|---|---|
| 2013/0293686 A1 | 11/2013 | Blow et al. |
| 2013/0305189 A1 | 11/2013 | Kim |
| 2013/0318347 A1 | 11/2013 | Moffat |
| 2013/0322218 A1 | 12/2013 | Burkhardt et al. |
| 2013/0342672 A1 | 12/2013 | Gray et al. |
| 2013/0342730 A1 | 12/2013 | Lee et al. |
| 2014/0013422 A1 | 1/2014 | Janus et al. |
| 2014/0040066 A1 | 2/2014 | Fujioka |
| 2014/0043329 A1 | 2/2014 | Wang et al. |
| 2014/0047389 A1 | 2/2014 | Aarabi |
| 2014/0047560 A1 | 2/2014 | Meyer et al. |
| 2014/0055554 A1 | 2/2014 | Du et al. |
| 2014/0062853 A1 | 3/2014 | Chaudhri et al. |
| 2014/0071044 A1 | 3/2014 | Nam |
| 2014/0078144 A1 | 3/2014 | Berriman et al. |
| 2014/0085293 A1 | 3/2014 | Konoplev et al. |
| 2014/0085460 A1 | 3/2014 | Park et al. |
| 2014/0085487 A1 | 3/2014 | Park et al. |
| 2014/0092101 A1 | 4/2014 | Lee et al. |
| 2014/0092130 A1 | 4/2014 | Anderson et al. |
| 2014/0104394 A1 | 4/2014 | Yanai et al. |
| 2014/0111420 A1 | 4/2014 | Ahn et al. |
| 2014/0115451 A1 | 4/2014 | Sheldon-Dante |
| 2014/0115488 A1 | 4/2014 | Hackborn |
| 2014/0137013 A1 | 5/2014 | Matas |
| 2014/0143682 A1 | 5/2014 | Druck et al. |
| 2014/0143693 A1 | 5/2014 | Goossens et al. |
| 2014/0152758 A1 | 6/2014 | Tong et al. |
| 2014/0157153 A1 | 6/2014 | Yuen et al. |
| 2014/0165000 A1 | 6/2014 | Fleizach et al. |
| 2014/0168217 A1 | 6/2014 | Kim et al. |
| 2014/0181229 A1 | 6/2014 | Tucker et al. |
| 2014/0198121 A1 | 7/2014 | Tong et al. |
| 2014/0204173 A1 | 7/2014 | Eidelson et al. |
| 2014/0213318 A1 | 7/2014 | Leem et al. |
| 2014/0218371 A1 | 8/2014 | Du et al. |
| 2014/0218459 A1 | 8/2014 | Wenlong et al. |
| 2014/0220855 A1 | 8/2014 | Heilbron et al. |
| 2014/0254434 A1 | 9/2014 | Jain et al. |
| 2014/0267311 A1 | 9/2014 | Evertt et al. |
| 2014/0267618 A1 | 9/2014 | Esteban et al. |
| 2014/0279062 A1 | 9/2014 | Hackman et al. |
| 2014/0283128 A1 | 9/2014 | Shepherd et al. |
| 2014/0292641 A1 | 10/2014 | Cho et al. |
| 2014/0300635 A1 | 10/2014 | Suzuki |
| 2014/0310365 A1 | 10/2014 | Sample et al. |
| 2014/0313307 A1 | 10/2014 | Oh et al. |
| 2014/0324600 A1 | 10/2014 | Soffin |
| 2014/0333671 A1 | 11/2014 | Phang et al. |
| 2014/0336808 A1 | 11/2014 | Taylor et al. |
| 2014/0351720 A1 | 11/2014 | Mn |
| 2014/0354401 A1 | 12/2014 | Soni et al. |
| 2014/0354538 A1 | 12/2014 | Lee et al. |
| 2014/0361974 A1 | 12/2014 | Li et al. |
| 2014/0362091 A1 | 12/2014 | Bouaziz et al. |
| 2014/0366159 A1 | 12/2014 | Cohen |
| 2014/0368601 A1 | 12/2014 | Decharms |
| 2015/0011204 A1 | 1/2015 | Seo et al. |
| 2015/0029179 A1 | 1/2015 | Han et al. |
| 2015/0033192 A1 | 1/2015 | Bohannon et al. |
| 2015/0033364 A1 | 1/2015 | Wong |
| 2015/0035825 A1 | 2/2015 | Zhou et al. |
| 2015/0036883 A1 | 2/2015 | Deri et al. |
| 2015/0037545 A1 | 2/2015 | Sun |
| 2015/0042571 A1 | 2/2015 | Lombardi et al. |
| 2015/0043046 A1 | 2/2015 | Iwamoto |
| 2015/0049014 A1 | 2/2015 | Saito |
| 2015/0052462 A1 | 2/2015 | Kulkarni |
| 2015/0058754 A1 | 2/2015 | Rauh |
| 2015/0062052 A1 | 3/2015 | Bernstein et al. |
| 2015/0070378 A1 | 3/2015 | Kriese et al. |
| 2015/0077502 A1 | 3/2015 | Jordan et al. |
| 2015/0078621 A1 | 3/2015 | Choi et al. |
| 2015/0082193 A1 | 3/2015 | Wallace et al. |
| 2015/0082446 A1 | 3/2015 | Flowers et al. |
| 2015/0084950 A1 | 3/2015 | Li et al. |
| 2015/0091896 A1 | 4/2015 | Tarquini et al. |
| 2015/0121251 A1 | 4/2015 | Siddhartha et al. |
| 2015/0130716 A1 | 5/2015 | Sridharan et al. |
| 2015/0149899 A1 | 5/2015 | Bemstein et al. |
| 2015/0149927 A1 | 5/2015 | Walkin et al. |
| 2015/0172238 A1 | 6/2015 | Ahmed et al. |
| 2015/0172584 A1 | 6/2015 | Park et al. |
| 2015/0195277 A1 | 7/2015 | Faaborg et al. |
| 2015/0208244 A1 | 7/2015 | Nakao |
| 2015/0213307 A1 | 7/2015 | Beeler et al. |
| 2015/0213604 A1 | 7/2015 | Li et al. |
| 2015/0235476 A1 | 8/2015 | McMahon et al. |
| 2015/0248235 A1 | 9/2015 | Offenberg et al. |
| 2015/0253740 A1 | 9/2015 | Nishijima et al. |
| 2015/0254396 A1 | 9/2015 | Tamura et al. |
| 2015/0254886 A1 | 9/2015 | Li |
| 2015/0261292 A1 | 9/2015 | Conzola et al. |
| 2015/0261387 A1 | 9/2015 | Petersen et al. |
| 2015/0281145 A1 | 10/2015 | Ji |
| 2015/0288633 A1 | 10/2015 | Ogundokun et al. |
| 2015/0302624 A1 | 10/2015 | Burke |
| 2015/0310259 A1 | 10/2015 | Lau et al. |
| 2015/0312182 A1 | 10/2015 | Langholz |
| 2015/0312184 A1 | 10/2015 | Langholz et al. |
| 2015/0312185 A1 | 10/2015 | Langholz et al. |
| 2015/0317945 A1 | 11/2015 | Andress et al. |
| 2015/0325029 A1 | 11/2015 | Li et al. |
| 2015/0334075 A1 | 11/2015 | Wang et al. |
| 2015/0346912 A1 | 12/2015 | Yang et al. |
| 2015/0350125 A1 | 12/2015 | Henderson |
| 2015/0350141 A1 | 12/2015 | Yang et al. |
| 2015/0370529 A1 | 12/2015 | Zambetti et al. |
| 2015/0379252 A1 | 12/2015 | Tang et al. |
| 2016/0005206 A1 | 1/2016 | Li et al. |
| 2016/0005211 A1 | 1/2016 | Sarkis et al. |
| 2016/0006987 A1 | 1/2016 | Li et al. |
| 2016/0030844 A1 | 2/2016 | Nair et al. |
| 2016/0034133 A1 | 2/2016 | Wilson et al. |
| 2016/0035074 A1 | 2/2016 | Jeong et al. |
| 2016/0036759 A1 | 2/2016 | Prado et al. |
| 2016/0037331 A1 | 2/2016 | Vernon et al. |
| 2016/0042548 A1 | 2/2016 | Du et al. |
| 2016/0050169 A1 | 2/2016 | Ben Atar et al. |
| 2016/0055370 A1 | 2/2016 | Garcia |
| 2016/0057087 A1 | 2/2016 | Gomba |
| 2016/0062582 A1 | 3/2016 | Wilson et al. |
| 2016/0063828 A1 | 3/2016 | Verweij et al. |
| 2016/0063850 A1 | 3/2016 | Yang et al. |
| 2016/0086379 A1 | 3/2016 | Sadi et al. |
| 2016/0086387 A1 | 3/2016 | Os et al. |
| 2016/0092035 A1 | 3/2016 | Crocker et al. |
| 2016/0092043 A1 | 3/2016 | Missig et al. |
| 2016/0094705 A1 | 3/2016 | Vendrow |
| 2016/0103427 A1 | 4/2016 | Westra et al. |
| 2016/0104034 A1 | 4/2016 | Wilder et al. |
| 2016/0105388 A1 | 4/2016 | Bin Mahfooz et al. |
| 2016/0110922 A1 | 4/2016 | Haring |
| 2016/0127641 A1 | 5/2016 | Gove |
| 2016/0132200 A1 | 5/2016 | Walkin et al. |
| 2016/0134635 A1 | 5/2016 | Thelin et al. |
| 2016/0134840 A1 | 5/2016 | Mcculloch |
| 2016/0150215 A1 | 5/2016 | Chen et al. |
| 2016/0163084 A1 | 6/2016 | Corazza et al. |
| 2016/0182661 A1 | 6/2016 | Brezina et al. |
| 2016/0187995 A1 | 6/2016 | Rosewall |
| 2016/0191958 A1 | 6/2016 | Nauseef et al. |
| 2016/0192324 A1 | 6/2016 | Zhang et al. |
| 2016/0217601 A1 | 7/2016 | Tsuda et al. |
| 2016/0226926 A1 | 8/2016 | Singh et al. |
| 2016/0227115 A1 | 8/2016 | Bin Mahfooz et al. |
| 2016/0227121 A1 | 8/2016 | Matsushita |
| 2016/0231878 A1 | 8/2016 | Tsuda et al. |
| 2016/0247308 A1 | 8/2016 | Jiao et al. |
| 2016/0247309 A1 | 8/2016 | Li et al. |
| 2016/0259413 A1 | 9/2016 | Anzures et al. |
| 2016/0259497 A1 | 9/2016 | Bauer et al. |
| 2016/0259498 A1 | 9/2016 | Foss et al. |
| 2016/0259499 A1 | 9/2016 | Kocienda et al. |

(56) References Cited

U.S. PATENT DOCUMENTS

| | | |
|---|---|---|
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0267067 A1 | 9/2016 | Mays et al. |
| 2016/0267699 A1 | 9/2016 | Borke et al. |
| 2016/0275724 A1 | 9/2016 | Adeyoola et al. |
| 2016/0284123 A1 | 9/2016 | Hare et al. |
| 2016/0291822 A1 | 10/2016 | Ahuja et al. |
| 2016/0292901 A1 | 10/2016 | Li et al. |
| 2016/0292903 A1 | 10/2016 | Li et al. |
| 2016/0300379 A1 | 10/2016 | Du et al. |
| 2016/0307028 A1 | 10/2016 | Fedorov |
| 2016/0323507 A1 | 11/2016 | Chong et al. |
| 2016/0327911 A1 | 11/2016 | Eim et al. |
| 2016/0328874 A1 | 11/2016 | Tong et al. |
| 2016/0328875 A1 | 11/2016 | Fang et al. |
| 2016/0328876 A1 | 11/2016 | Tong et al. |
| 2016/0328886 A1 | 11/2016 | Tong et al. |
| 2016/0332025 A1 | 11/2016 | Repka |
| 2016/0350957 A1 | 12/2016 | Woods et al. |
| 2016/0357282 A1 | 12/2016 | Block et al. |
| 2016/0364600 A1 | 12/2016 | Shah et al. |
| 2016/0370974 A1 | 12/2016 | Stenneth |
| 2016/0378304 A1 | 12/2016 | Bahgat et al. |
| 2017/0003659 A1 | 1/2017 | Nakanishi |
| 2017/0018289 A1 | 1/2017 | Morgenstern |
| 2017/0032554 A1 | 2/2017 | O'Donovan et al. |
| 2017/0046045 A1 | 2/2017 | Tung et al. |
| 2017/0046065 A1 | 2/2017 | Zeng et al. |
| 2017/0046426 A1 | 2/2017 | Pearce et al. |
| 2017/0046507 A1 | 2/2017 | Archer et al. |
| 2017/0048450 A1 | 2/2017 | Lee et al. |
| 2017/0048458 A1 | 2/2017 | Jeon et al. |
| 2017/0061635 A1 | 3/2017 | Petrovich et al. |
| 2017/0069124 A1 | 3/2017 | Tong et al. |
| 2017/0080346 A1 | 3/2017 | Abbas |
| 2017/0082983 A1 | 3/2017 | Katzer et al. |
| 2017/0083086 A1 | 3/2017 | Mazur et al. |
| 2017/0083524 A1 | 3/2017 | Huang et al. |
| 2017/0083586 A1 | 3/2017 | Huang et al. |
| 2017/0098122 A1 | 4/2017 | El Kaliouby et al. |
| 2017/0102916 A1 | 4/2017 | Noble et al. |
| 2017/0111616 A1 | 4/2017 | Li et al. |
| 2017/0113140 A1 | 4/2017 | Blackstock et al. |
| 2017/0124751 A1 | 5/2017 | Ross et al. |
| 2017/0131886 A1 | 5/2017 | Kim et al. |
| 2017/0132828 A1 | 5/2017 | Zelenin et al. |
| 2017/0140214 A1 | 5/2017 | Matas et al. |
| 2017/0147802 A1 | 5/2017 | Li |
| 2017/0163588 A1 | 6/2017 | Devasthali et al. |
| 2017/0164888 A1 | 6/2017 | Matsuda et al. |
| 2017/0178287 A1 | 6/2017 | Anderson |
| 2017/0193684 A1 | 7/2017 | Du et al. |
| 2017/0206095 A1 | 7/2017 | Gibbs et al. |
| 2017/0220212 A1 | 8/2017 | Yang et al. |
| 2017/0236298 A1 | 8/2017 | Vetter |
| 2017/0255169 A1 | 9/2017 | Lee et al. |
| 2017/0256086 A1 | 9/2017 | Park et al. |
| 2017/0269715 A1 | 9/2017 | Kim et al. |
| 2017/0269792 A1 | 9/2017 | Xu et al. |
| 2017/0285764 A1 | 10/2017 | Kim et al. |
| 2017/0285916 A1 | 10/2017 | Xu et al. |
| 2017/0286423 A1 | 10/2017 | Shorman et al. |
| 2017/0286913 A1 | 10/2017 | Liu et al. |
| 2017/0322711 A1 | 11/2017 | Robinson et al. |
| 2017/0323266 A1 | 11/2017 | Seo |
| 2017/0336926 A1 | 11/2017 | Chaudhri et al. |
| 2017/0336928 A1 | 11/2017 | Chaudhri et al. |
| 2017/0337554 A1 | 11/2017 | Mokhasi et al. |
| 2017/0346772 A1 | 11/2017 | Albouyeh et al. |
| 2017/0358117 A1 | 12/2017 | Goossens et al. |
| 2017/0359302 A1 | 12/2017 | Van Os et al. |
| 2018/0004404 A1 | 1/2018 | Delfino et al. |
| 2018/0025219 A1 | 1/2018 | Baldwin et al. |
| 2018/0026922 A1 | 1/2018 | Perigault |
| 2018/0034867 A1 | 2/2018 | Zahn et al. |
| 2018/0047200 A1 | 2/2018 | O'Hara et al. |
| 2018/0059903 A1 | 3/2018 | Lim et al. |
| 2018/0063603 A1 | 3/2018 | Tang et al. |
| 2018/0067633 A1 | 3/2018 | Wilson et al. |
| 2018/0074693 A1 | 3/2018 | Jones et al. |
| 2018/0081515 A1 | 3/2018 | Block et al. |
| 2018/0088787 A1 | 3/2018 | Bereza et al. |
| 2018/0091732 A1 | 3/2018 | Wilson et al. |
| 2018/0095649 A1 | 4/2018 | Valdivia et al. |
| 2018/0114543 A1 | 4/2018 | Novikoff |
| 2018/0115503 A1 | 4/2018 | Baldwin et al. |
| 2018/0121060 A1 | 5/2018 | Jeong et al. |
| 2018/0130094 A1 | 5/2018 | Tung et al. |
| 2018/0131878 A1 | 5/2018 | Charlton et al. |
| 2018/0157901 A1 | 6/2018 | Arbatman et al. |
| 2018/0165862 A1 | 6/2018 | Sawaki |
| 2018/0165863 A1 | 6/2018 | Kubo et al. |
| 2018/0181201 A1 | 6/2018 | Grant et al. |
| 2018/0189549 A1 | 7/2018 | Inomata |
| 2018/0191944 A1 | 7/2018 | Carbonell et al. |
| 2018/0197343 A1 | 7/2018 | Hare et al. |
| 2018/0225263 A1 | 8/2018 | Zhong et al. |
| 2018/0246639 A1 | 8/2018 | Han et al. |
| 2018/0268589 A1 | 9/2018 | Grant |
| 2018/0275750 A1 | 9/2018 | Zeng |
| 2018/0316775 A1 | 11/2018 | Kwon et al. |
| 2018/0321826 A1 | 11/2018 | Bereza et al. |
| 2018/0324353 A1 | 11/2018 | Kim et al. |
| 2018/0329587 A1 | 11/2018 | Ko et al. |
| 2018/0335927 A1 | 11/2018 | Anzures et al. |
| 2018/0335929 A1 | 11/2018 | Scapel et al. |
| 2018/0335930 A1 | 11/2018 | Scapel et al. |
| 2018/0336715 A1 | 11/2018 | Rickwald et al. |
| 2018/0349795 A1 | 12/2018 | Boyle et al. |
| 2019/0050045 A1 | 2/2019 | Jha et al. |
| 2019/0058827 A1 | 2/2019 | Park et al. |
| 2019/0072909 A1 | 3/2019 | Misaki et al. |
| 2019/0087082 A1 | 3/2019 | Chaudhri et al. |
| 2019/0088018 A1 | 3/2019 | Shenton et al. |
| 2019/0096106 A1 | 3/2019 | Shapiro et al. |
| 2019/0114038 A1 | 4/2019 | Geiger et al. |
| 2019/0139207 A1 | 5/2019 | Jeong et al. |
| 2019/0158735 A1 | 5/2019 | Wilson et al. |
| 2019/0160378 A1 | 5/2019 | Fajt et al. |
| 2019/0171338 A1 | 6/2019 | Voss et al. |
| 2019/0171869 A1 | 6/2019 | Fortune et al. |
| 2019/0180088 A1 | 6/2019 | Norimatsu |
| 2019/0235748 A1 | 8/2019 | Seol et al. |
| 2019/0266775 A1 | 8/2019 | Lee et al. |
| 2019/0266807 A1 | 8/2019 | Lee et al. |
| 2019/0276051 A1 | 9/2019 | Marti et al. |
| 2019/0279410 A1 | 9/2019 | Orvalho et al. |
| 2019/0295056 A1 | 9/2019 | Wright |
| 2019/0310761 A1 | 10/2019 | Agarawala et al. |
| 2019/0339847 A1 | 11/2019 | Scapel et al. |
| 2019/0342507 A1 | 11/2019 | Dye et al. |
| 2019/0347868 A1 | 11/2019 | Scapel et al. |
| 2019/0370492 A1 | 12/2019 | Falchuk et al. |
| 2020/0045245 A1 | 2/2020 | Van Os et al. |
| 2020/0068095 A1 | 2/2020 | Nabetani |
| 2020/0074711 A1 | 3/2020 | Barlier et al. |
| 2020/0089302 A1 | 3/2020 | Kim et al. |
| 2020/0142484 A1 | 5/2020 | Maalouf et al. |
| 2020/0226848 A1 | 7/2020 | Van Os et al. |
| 2020/0234481 A1 | 7/2020 | Scapel et al. |
| 2020/0234508 A1 | 7/2020 | Shaburov et al. |
| 2020/0285851 A1 | 9/2020 | Lin et al. |
| 2020/0302669 A1 | 9/2020 | Barlier et al. |
| 2020/0306640 A1 | 10/2020 | Kolen et al. |
| 2020/0358725 A1 | 11/2020 | Scapel et al. |
| 2020/0358726 A1 | 11/2020 | Dryer et al. |
| 2020/0380103 A1 | 12/2020 | Hosoda |
| 2020/0380768 A1 | 12/2020 | Harris et al. |
| 2020/0380781 A1 | 12/2020 | Barlier et al. |
| 2020/0410763 A1 | 12/2020 | Hare et al. |
| 2020/0412975 A1 | 12/2020 | Al Majid et al. |
| 2021/0005003 A1 | 1/2021 | Chong et al. |

(56) References Cited

U.S. PATENT DOCUMENTS

| | | |
|---|---|---|
| 2021/0027514 A1 | 1/2021 | Kwon et al. |
| 2021/0056769 A1 | 2/2021 | Scapel et al. |
| 2021/0058351 A1 | 2/2021 | Viklund et al. |
| 2021/0065448 A1 | 3/2021 | Goodrich et al. |
| 2021/0065454 A1 | 3/2021 | Goodrich et al. |
| 2021/0089136 A1 | 3/2021 | Hossain et al. |
| 2021/0096703 A1 | 4/2021 | Anzures et al. |
| 2021/0099568 A1 | 4/2021 | Depue et al. |
| 2021/0099761 A1 | 4/2021 | Zhang |
| 2021/0152505 A1 | 5/2021 | Baldwin et al. |
| 2021/0168108 A1 | 6/2021 | Antmen et al. |
| 2021/0264656 A1 | 8/2021 | Barlier et al. |
| 2021/0287343 A1 | 9/2021 | Kaida |
| 2021/0311609 A1 | 10/2021 | Dandoko |
| 2021/0335055 A1 | 10/2021 | Scapel et al. |
| 2021/0349426 A1 | 11/2021 | Chen et al. |
| 2021/0349427 A1 | 11/2021 | Chen et al. |
| 2021/0349611 A1 | 11/2021 | Chen et al. |
| 2021/0349612 A1 | 11/2021 | Triverio |
| 2021/0375042 A1 | 12/2021 | Chen et al. |
| 2022/0070385 A1 | 3/2022 | Van Os et al. |
| 2022/0084279 A1 | 3/2022 | Lindmeier et al. |
| 2022/0122309 A1 | 4/2022 | Kim et al. |
| 2022/0124140 A1 | 4/2022 | Okina et al. |
| 2022/0134234 A1 | 5/2022 | Sachson et al. |
| 2022/0244838 A1 | 8/2022 | Bereza et al. |
| 2022/0262080 A1 | 8/2022 | Burton et al. |
| 2022/0392132 A1 | 12/2022 | Sepulveda et al. |
| 2023/0004270 A1 | 1/2023 | Chen et al. |
| 2023/0043249 A1 | 2/2023 | Van Os et al. |
| 2023/0090342 A1 | 3/2023 | Barlier et al. |
| 2023/0229283 A1 | 7/2023 | Long et al. |
| 2023/0283884 A1 | 9/2023 | Van Os et al. |
| 2023/0343053 A1 | 10/2023 | Scapel et al. |
| 2023/0350564 A1 | 11/2023 | Chen et al. |
| 2023/0364936 A1 | 11/2023 | Antonakis |
| 2023/0379573 A1 | 11/2023 | Wilson et al. |
| 2024/0029334 A1 | 1/2024 | Sepulveda et al. |
| 2024/0036717 A1 | 2/2024 | Triverio |
| 2024/0077937 A1 | 3/2024 | Rickwald et al. |
| 2024/0144626 A1 | 5/2024 | Van Os et al. |
| 2024/0187361 A1 | 6/2024 | Van Os et al. |
| 2024/0259676 A1 | 8/2024 | Wilson et al. |
| 2024/0310988 A1 | 9/2024 | Bereza et al. |
| 2025/0024134 A1 | 1/2025 | Van Os et al. |
| 2025/0037398 A1 | 1/2025 | Scapel et al. |
| 2025/0044932 A1 | 2/2025 | Chen et al. |
| 2025/0103132 A1 | 3/2025 | Rickwald et al. |
| 2025/0166330 A1 | 5/2025 | Van Os et al. |

FOREIGN PATENT DOCUMENTS

| | | |
|---|---|---|
| AU | 2015297035 B2 | 6/2018 |
| CA | 2356232 A1 | 3/2002 |
| CN | 1083229 A | 3/1994 |
| CN | 2602404 Y | 2/2004 |
| CN | 1581901 A | 2/2005 |
| CN | 101055646 A | 10/2007 |
| CN | 101329707 A | 12/2008 |
| CN | 101472158 A | 7/2009 |
| CN | 101692681 A | 4/2010 |
| CN | 101742053 A | 6/2010 |
| CN | 101930284 A | 12/2010 |
| CN | 102035990 A | 4/2011 |
| CN | 102075727 A | 5/2011 |
| CN | 102142149 A | 8/2011 |
| CN | 102271241 A | 12/2011 |
| CN | 102298797 A | 12/2011 |
| CN | 102394919 A | 3/2012 |
| CN | 102447873 A | 5/2012 |
| CN | 102479388 A | 5/2012 |
| CN | 202217134 U | 5/2012 |
| CN | 102622085 A | 8/2012 |
| CN | 102750070 A | 10/2012 |
| CN | 102841683 A | 12/2012 |
| CN | 102854979 A | 1/2013 |
| CN | 102984195 A | 3/2013 |
| CN | 102999934 A | 3/2013 |
| CN | 103116902 A | 5/2013 |
| CN | 103209642 A | 7/2013 |
| CN | 103294171 A | 9/2013 |
| CN | 103346957 A | 10/2013 |
| CN | 103516894 A | 1/2014 |
| CN | 103703438 A | 4/2014 |
| CN | 103886632 A | 6/2014 |
| CN | 103927190 A | 7/2014 |
| CN | 103947190 A | 7/2014 |
| CN | 104011738 A | 8/2014 |
| CN | 104115503 A | 10/2014 |
| CN | 104170318 A | 11/2014 |
| CN | 104170358 A | 11/2014 |
| CN | 104182741 A | 12/2014 |
| CN | 104246793 A | 12/2014 |
| CN | 104270597 A | 1/2015 |
| CN | 104376160 A | 2/2015 |
| CN | 104732396 A | 6/2015 |
| CN | 104753762 A | 7/2015 |
| CN | 104753766 A | 7/2015 |
| CN | 104836879 A | 8/2015 |
| CN | 104869346 A | 8/2015 |
| CN | 104898402 A | 9/2015 |
| CN | 104935497 A | 9/2015 |
| CN | 104952063 A | 9/2015 |
| CN | 105051651 A | 11/2015 |
| CN | 105099861 A | 11/2015 |
| CN | 105100462 A | 11/2015 |
| CN | 105139438 A | 12/2015 |
| CN | 105190700 A | 12/2015 |
| CN | 105374055 A | 3/2016 |
| CN | 105391843 A | 3/2016 |
| CN | 105391937 A | 3/2016 |
| CN | 105528805 A | 4/2016 |
| CN | 105611215 A | 5/2016 |
| CN | 105611275 A | 5/2016 |
| CN | 105653031 A | 6/2016 |
| CN | 105844101 A | 8/2016 |
| CN | 106101358 A | 11/2016 |
| CN | 106303690 A | 1/2017 |
| CN | 106575444 A | 4/2017 |
| CN | 106792147 A | 5/2017 |
| CN | 106909064 A | 6/2017 |
| CN | 107171934 A | 9/2017 |
| CN | 107533356 A | 1/2018 |
| CN | 107561904 A | 1/2018 |
| CN | 107613085 A | 1/2018 |
| CN | 107924113 A | 4/2018 |
| CN | 107944397 A | 4/2018 |
| CN | 108885795 A | 11/2018 |
| DK | 201670652 A1 | 12/2017 |
| EP | 0579093 A1 | 1/1994 |
| EP | 1215867 A2 | 6/2002 |
| EP | 1429291 A1 | 6/2004 |
| EP | 1592212 A1 | 11/2005 |
| EP | 1599862 A2 | 11/2005 |
| EP | 1736931 A2 | 12/2006 |
| EP | 2028611 A | 2/2009 |
| EP | 2416563 A2 | 2/2012 |
| EP | 2713298 A1 | 4/2014 |
| EP | 2741175 A2 | 6/2014 |
| EP | 2762997 A2 | 8/2014 |
| EP | 2960822 A1 | 12/2015 |
| EP | 2990887 A2 | 3/2016 |
| EP | 3026636 A1 | 6/2016 |
| EP | 3047884 A1 | 7/2016 |
| EP | 3051525 A1 | 8/2016 |
| EP | 3079044 A1 | 10/2016 |
| EP | 3101958 A1 | 12/2016 |
| EP | 3118761 A1 | 1/2017 |
| EP | 3190563 A1 | 7/2017 |
| EP | 3211587 A1 | 8/2017 |
| EP | 3308563 A1 | 4/2018 |
| EP | 2556665 B1 | 8/2018 |
| EP | 3396618 A1 | 10/2018 |
| EP | 3401770 A1 | 11/2018 |

(56) References Cited

FOREIGN PATENT DOCUMENTS

| | | |
|---|---|---|
| JP | 53-31170 A | 3/1978 |
| JP | 56-621 A | 1/1981 |
| JP | 3007616 U | 2/1995 |
| JP | 9-9072 A | 1/1997 |
| JP | 10-506472 A | 6/1998 |
| JP | 10-293860 A | 11/1998 |
| JP | 11-109066 A | 4/1999 |
| JP | 11-312159 A | 11/1999 |
| JP | 2000-76460 A | 3/2000 |
| JP | 2000-162349 A | 6/2000 |
| JP | 2000-283720 A | 10/2000 |
| JP | 2001-92783 A | 4/2001 |
| JP | 2001-144884 A | 5/2001 |
| JP | 2001-273064 A | 10/2001 |
| JP | 2001-313886 A | 11/2001 |
| JP | 2002-222412 A | 8/2002 |
| JP | 2002-251238 A | 9/2002 |
| JP | 2003-9404 A | 1/2003 |
| JP | 2003-150550 A | 5/2003 |
| JP | 2003-219217 A | 7/2003 |
| JP | 2003-233616 A | 8/2003 |
| JP | 2004-28918 A | 1/2004 |
| JP | 2004-184396 A | 7/2004 |
| JP | 2004-194069 A | 7/2004 |
| JP | 2004-287558 A | 10/2004 |
| JP | 2005-115480 A | 4/2005 |
| JP | 2005-202651 A | 7/2005 |
| JP | 2005-521890 A | 7/2005 |
| JP | 2005-293280 A | 10/2005 |
| JP | 2006-65683 A | 3/2006 |
| JP | 2006-102327 A | 4/2006 |
| JP | 2006-520053 A | 8/2006 |
| JP | 2006-259930 A | 9/2006 |
| JP | 2007-52770 A | 3/2007 |
| JP | 2007-528240 A | 10/2007 |
| JP | 2007-329632 A | 12/2007 |
| JP | 2008-15800 A | 1/2008 |
| JP | 2009-135770 A | 6/2009 |
| JP | 2009-211166 A | 9/2009 |
| JP | 2009-217612 A | 9/2009 |
| JP | 2010-28404 A | 2/2010 |
| JP | 2010-224837 A | 10/2010 |
| JP | 2010-541046 A | 12/2010 |
| JP | 2011-40865 A | 2/2011 |
| JP | 2011-70623 A | 4/2011 |
| JP | 2011-515726 A | 5/2011 |
| JP | 2011-517810 A | 6/2011 |
| JP | 2011-192228 A | 9/2011 |
| JP | 2011-525648 A | 9/2011 |
| JP | 2011-199523 A | 10/2011 |
| JP | 2011-209887 A | 10/2011 |
| JP | 2011-217146 A | 10/2011 |
| JP | 2012-18569 A | 1/2012 |
| JP | 2012-38292 A | 2/2012 |
| JP | 2012-168802 A | 9/2012 |
| JP | 2012-208719 A | 10/2012 |
| JP | 2013-3671 A | 1/2013 |
| JP | 2013-9073 A | 1/2013 |
| JP | 2013-88906 A | 5/2013 |
| JP | 2013-88925 A | 5/2013 |
| JP | 2013-92989 A | 5/2013 |
| JP | 2013-97760 A | 5/2013 |
| JP | 2013-97814 A | 5/2013 |
| JP | 2013-101528 A | 5/2013 |
| JP | 2013-114498 A | 6/2013 |
| JP | 2013-140540 A | 7/2013 |
| JP | 2013-178723 A | 9/2013 |
| JP | 2013-232230 A | 11/2013 |
| JP | 2014-110009 A | 6/2014 |
| JP | 2014-149856 A | 8/2014 |
| JP | 2014-206817 A | 10/2014 |
| JP | 2014-222439 A | 11/2014 |
| JP | 2015-36925 A | 2/2015 |
| JP | 2015-504619 A | 2/2015 |
| JP | 2015-56142 A | 3/2015 |
| JP | 2015-207051 A | 11/2015 |
| JP | 2016-136324 A | 7/2016 |
| JP | 2016-162000 A | 9/2016 |
| JP | 2016-534435 A | 11/2016 |
| JP | 2017-54195 A | 3/2017 |
| JP | 2017-521804 A | 8/2017 |
| JP | 2017-527917 A | 9/2017 |
| JP | 2017-531225 A | 10/2017 |
| JP | 6240301 B1 | 11/2017 |
| JP | 6266736 B1 | 1/2018 |
| JP | 2018-50279 A | 3/2018 |
| JP | 2018-514020 A | 5/2018 |
| JP | 2018-514838 A | 6/2018 |
| JP | 2018-116067 A | 7/2018 |
| JP | 2018106365 A | 7/2018 |
| JP | 2018-151966 A | 9/2018 |
| JP | 2019145108 A | 8/2019 |
| JP | 2019-164825 A | 9/2019 |
| KR | 10-2004-0009115 A | 1/2004 |
| KR | 10-2004-0046272 A | 6/2004 |
| KR | 10-2004-0107489 A | 12/2004 |
| KR | 10-2005-0086630 A | 8/2005 |
| KR | 10-2008-0050336 A | 6/2008 |
| KR | 10-2010-0086052 A | 7/2010 |
| KR | 10-2011-0014224 A | 2/2011 |
| KR | 10-2011-0028581 A | 3/2011 |
| KR | 10-2011-0063741 A | 6/2011 |
| KR | 10-2011-0089429 A | 8/2011 |
| KR | 10-2012-0006610 A | 1/2012 |
| KR | 10-2012-0018479 A | 3/2012 |
| KR | 10-2012-0026004 A | 3/2012 |
| KR | 10-2012-0047616 A | 5/2012 |
| KR | 10-2012-0113252 A | 10/2012 |
| KR | 10-2012-0127842 A | 11/2012 |
| KR | 10-2012-0130627 A | 12/2012 |
| KR | 10-2012-0132134 A | 12/2012 |
| KR | 10-2013-0032620 A | 4/2013 |
| KR | 10-2014-0033088 A | 3/2014 |
| KR | 10-2014-0039737 A | 4/2014 |
| KR | 10-2014-0042427 A | 4/2014 |
| KR | 10-2014-0049340 A | 4/2014 |
| KR | 10-2015-0008996 A | 1/2015 |
| KR | 10-2015-0024899 A | 3/2015 |
| KR | 10-2015-0067197 A | 6/2015 |
| KR | 10-1540544 B1 | 7/2015 |
| KR | 10-1587115 B1 | 1/2016 |
| KR | 10-2016-0014623 A | 2/2016 |
| KR | 10-2016-0016910 A | 2/2016 |
| KR | 10-2016- 0026337 A | 3/2016 |
| KR | 10-2016-0047891 A | 5/2016 |
| KR | 10-2016-0063058 A | 6/2016 |
| KR | 10-1655078 B1 | 9/2016 |
| KR | 10-2016-0146942 A | 12/2016 |
| KR | 10-2017-0012384 A | 2/2017 |
| KR | 10-2017-0019595 A | 2/2017 |
| KR | 10-2017-0023063 A | 3/2017 |
| KR | 10-2017-0081391 A | 7/2017 |
| KR | 10-2017-0112267 A | 10/2017 |
| KR | 10-2017-0112406 A | 10/2017 |
| KR | 10-2017-0117306 A | 10/2017 |
| KR | 10-2017-0134366 A | 12/2017 |
| KR | 10-2017-0139621 A | 12/2017 |
| KR | 10-2018-0017227 A | 2/2018 |
| KR | 10-1866407 B1 | 6/2018 |
| KR | 10-1875907 B1 | 7/2018 |
| KR | 10-2019-0033082 A | 3/2019 |
| KR | 10-2019-0114034 A | 10/2019 |
| KR | 10-2338576 B1 | 12/2021 |
| WO | 98/40795 A1 | 9/1998 |
| WO | 03/085460 A2 | 10/2003 |
| WO | 2004/010672 A2 | 1/2004 |
| WO | 2004/079530 A2 | 9/2004 |
| WO | 2007/120981 A2 | 10/2007 |
| WO | 2009/073607 A2 | 6/2009 |
| WO | 2009/114239 A1 | 9/2009 |
| WO | 2009/133710 A1 | 11/2009 |
| WO | 2010/037956 A1 | 4/2010 |
| WO | 2010/059306 A2 | 5/2010 |
| WO | 2011/084860 A2 | 7/2011 |

(56) References Cited

FOREIGN PATENT DOCUMENTS

| | | | |
|---|---|---|---|
| WO | 2011/127309 | A1 | 10/2011 |
| WO | 2012/033708 | A1 | 3/2012 |
| WO | 2012/068193 | A2 | 5/2012 |
| WO | 2012/170354 | A2 | 12/2012 |
| WO | 2013/082325 | A1 | 6/2013 |
| WO | 2013/097139 | A1 | 7/2013 |
| WO | 2013/097264 | A1 | 7/2013 |
| WO | 2013/120851 | A1 | 8/2013 |
| WO | 2013/152453 | A1 | 10/2013 |
| WO | 2013/152454 | A1 | 10/2013 |
| WO | 2013/152455 | A1 | 10/2013 |
| WO | 2013/169849 | A2 | 11/2013 |
| WO | 2013/189058 | A1 | 12/2013 |
| WO | 2014/012456 | A1 | 1/2014 |
| WO | 2014/053063 | A1 | 4/2014 |
| WO | 2014/094199 | A1 | 6/2014 |
| WO | 2014/105276 | A1 | 7/2014 |
| WO | 2014/161429 | A1 | 10/2014 |
| WO | 2014/193465 | A1 | 12/2014 |
| WO | 2014/200734 | A1 | 12/2014 |
| WO | 2015/034960 | A1 | 3/2015 |
| WO | 2015/065928 | A1 | 5/2015 |
| WO | 2015/069153 | A1 | 5/2015 |
| WO | 2015/084891 | A1 | 6/2015 |
| WO | 2015/119605 | A1 | 8/2015 |
| WO | 2015/144209 | A1 | 10/2015 |
| WO | 2015/167590 | A1 | 11/2015 |
| WO | 2015/183756 | A1 | 12/2015 |
| WO | 2015/187458 | A1 | 12/2015 |
| WO | 2015/195216 | A1 | 12/2015 |
| WO | 2015/196448 | A1 | 12/2015 |
| WO | 2016/022203 | A1 | 2/2016 |
| WO | 2016/022204 | A1 | 2/2016 |
| WO | 2016/022205 | A1 | 2/2016 |
| WO | 2016/026402 | A2 | 2/2016 |
| WO | 2016/036218 | A1 | 3/2016 |
| WO | 2016/042926 | A1 | 3/2016 |
| WO | 2016/045005 | A1 | 3/2016 |
| WO | 2016/049439 | A1 | 3/2016 |
| WO | 2016/057062 | A1 | 4/2016 |
| WO | 2016/064435 | A1 | 4/2016 |
| WO | 2016/101124 | A1 | 6/2016 |
| WO | 2016/101131 | A1 | 6/2016 |
| WO | 2016/101132 | A1 | 6/2016 |
| WO | 2016/144385 | A1 | 9/2016 |
| WO | 2016/144975 | A2 | 9/2016 |
| WO | 2016/145129 | A1 | 9/2016 |
| WO | 2016/161556 | A1 | 10/2016 |
| WO | 2016/200587 | A1 | 12/2016 |
| WO | 2017/012302 | A1 | 1/2017 |
| WO | 2017/015949 | A1 | 2/2017 |
| WO | 2017/030646 | A1 | 2/2017 |
| WO | 2017/043314 | A1 | 3/2017 |
| WO | 2017/077751 | A1 | 5/2017 |
| WO | 2017/153771 | A1 | 9/2017 |
| WO | 2017/173319 | A1 | 10/2017 |
| WO | 2017/201326 | A1 | 11/2017 |
| WO | 2017/213439 | A1 | 12/2017 |
| WO | 2017/218193 | A1 | 12/2017 |
| WO | 2018/006053 | A1 | 1/2018 |
| WO | 2018/049430 | A2 | 3/2018 |
| WO | 2018/057272 | A1 | 3/2018 |
| WO | 2018/151758 | A1 | 8/2018 |
| WO | 2018/212801 | A1 | 11/2018 |
| WO | 2018/212802 | A1 | 11/2018 |
| WO | 2019/216997 | A1 | 11/2019 |
| WO | 2019/216999 | A1 | 11/2019 |
| WO | 2021/050190 | A1 | 3/2021 |

OTHER PUBLICATIONS

Pavlakos G, Choutas V, Ghorbani N, Bolkart T, Osman AA, Tzionas D, Black MJ. Expressive body capture: 3d hands, face, and body from a single image. InProceedings of the IEEE/CVF conference on computer vision and pattern recognition 2019 (pp. 10975-10985).*
Takahashi Y, Murata S, Idei H, Tomita H, Yamashita Y. Neural network modeling of altered facial expression recognition in autism spectrum disorders based on predictive processing framework. Scientific reports. Jul. 26, 2021;11(1):14684.*
"[B612] Addition of facial recognition bear/cat stamps and AR background function having moving sparkles or hearts", Available Online at: <URL, htpps://apptopi.jp/2017/01/22/b612>, Jan. 22, 2017, 11 pages.
A Day in the Life of Mike, "#SnapChat Vs #Msqrd", Available Online at: <https://www.youtube.com/watch?v=vS_1mrWXmC8>, See especially 4:22-6:05, Mar. 9, 2016, 4 pages.
Advisory Action received for U.S. Appl. No. 13/082,035, mailed on Jun. 19, 2015, 5 pages.
Advisory Action received for U.S. Appl. No. 13/082,035, mailed on Oct. 23, 2013, 3 pages.
Advisory Action received for U.S. Appl. No. 16/259,771, mailed on Feb. 26, 2020, 3 pages.
Advisory Action received for U.S. Appl. No. 16/259,771, mailed on Jul. 14, 2020, 6 pages.
AKG TECHNICAL,"Mojipop app//Mozipop gif maker app//How to use mojipop app; AKG Technical", Available online at: https://www.youtube.com/watch?v=_9pdQ3CpWA4, Feb. 4, 2019, 4 pages.
Ali et al., "Facial Expression Recognition Using Human to Animated-Character Expression Translation", Oct. 12, 2019, 8 pages.
Androidslide, "Camera Zoom FX", Available at: <https://www.youtube.com/watch?v=AHmPn8y74wY>, Nov. 5, 2011, 3 pages.
Appes Stela, "Gif Me! Camera [Android] Video review by Stelapps", Available Online at: <https://www.youtube.com/watch?v=uae0xUucOyY>, Jul. 17, 2014, 3 pages.
Applicant Initiated Interview Summary received for U.S. Appl. No. 15/714,887, mailed on Aug. 19, 2020, 4 pages.
Applicant Initiated Interview Summary received for U.S. Appl. No. 15/714,887, mailed on Mar. 17, 2020, 5 pages.
Applicant Initiated Interview Summary received for U.S. Appl. No. 15/940,017, mailed on Dec. 26, 2019, 5 pages.
Applicant Initiated Interview Summary received for U.S. Appl. No. 16/259,771, mailed on May 5, 2020, 10 pages.
Applicant-Initiated Interview Summary received for U.S. Appl. No. 13/082,035, mailed on Apr. 4, 2013, 3 pages.
Applicant-Initiated Interview Summary received for U.S. Appl. No. 13/082,035, mailed on Aug. 1, 2016, 3 pages.
Applicant-Initiated Interview Summary received for U.S. Appl. No. 13/082,035, mailed on Jan. 29, 2015, 3 pages.
Applicant-Initiated Interview Summary received for U.S. Appl. No. 13/082,035, mailed on Oct. 30, 2013, 3 pages.
Applicant-Initiated Interview Summary received for U.S. Appl. No. 14/866,560, mailed on Jan. 30, 2019, 3 pages.
Applicant-Initiated Interview Summary received for U.S. Appl. No. 14/866,560, mailed on Jul. 26, 2018, 3 pages.
Applicant-Initiated Interview Summary received for U.S. Appl. No. 14/866,560, mailed on May 14, 2019, 4 pages.
Applicant-Initiated Interview Summary received for U.S. Appl. No. 14/866,560, mailed on Oct. 21, 2019, 3 pages.
Applicant-Initiated Interview Summary received for U.S. Appl. No. 15/940,017, mailed on Jun. 30, 2020, 5 pages.
Applicant-Initiated Interview Summary received for U.S. Appl. No. 16/519,850, mailed on Jun. 26, 2020, 4 pages.
Applicant-Initiated Interview Summary received for U.S. Appl. No. 16/582,500, mailed on Aug. 25, 2020, 5 pages.
Applicant-Initiated Interview Summary received for U.S. Appl. No. 16/582,500, mailed on Feb. 1, 2021, 6 pages.
Applicant-Initiated Interview Summary received for U.S. Appl. No. 16/583,706, mailed on Feb. 27, 2020, 6 pages.
Applicant-Initiated Interview Summary received for U.S. Appl. No. 16/583,706, mailed on Nov. 18, 2020, 7 pages.
Applicant-Initiated Interview Summary received for U.S. Appl. No. 16/599,433, mailed on Apr. 20, 2021, 7 pages.
Applicant-Initiated Interview Summary received for U.S. Appl. No. 16/663,062, mailed on Dec. 18, 2020, 3 pages.

(56) References Cited

OTHER PUBLICATIONS

Applicant-Initiated Interview Summary received for U.S. Appl. No. 16/833,436, mailed on Jul. 1, 2021, 2 pages.
Applivgames, "Super Mario Run" Stickers for iMessage: Free Delivery Started!, Available online at: <https://games.app-liv.jp/archives/178627>, Sep. 13, 2016, 3 pages.
AT&T Customer Care, "How to Access & Manage Contacts on Your Samsung Galaxy S9 | S9+ | AT&T Wireless", Online Available at: https://www.youtube.com/watch?v=nb4Zf9X15ZQ, Mar. 9, 2018, 8 pages.
Beyouravatar, "Faceshift studio tutorial part 4.8: tracking—fbx export", Available online at: https://www.youtube.com/watch?v=_yqmc9yzKLM, Nov. 19, 2012, 3 pages.
Bomen XYZ, "Cara membuat stiker di android, WhatsApp, Fb Messenger dll || Work 100%", Available online at: https://www.youtube.com/watch?v=cafBfzD1Bbo, Feb. 21, 2019, 3 pages.
Brief Communication Regarding Oral Proceedings received for European Patent Application No. 19172407.9, mailed on Nov. 9, 2020, 1 page.
Brief Communication Regarding Oral Proceedings received for European Patent Application No. 19172407.9, mailed on Nov. 20, 2020, 2 pages.
Canchichi, "Mii Creation", Online available at: https://www.youtube.com/watch?v=bYm7IEYu42k, Jan. 16, 2007, 4 pages.
Certificate of Examination received for Australian Patent Application No. 2019100420, mailed on Jul. 3, 2019, 2 pages.
Certificate of Examination received for Australian Patent Application No. 2019100497, mailed on Jul. 29, 2019, 2 pages.
Certificate of Examination received for Australian Patent Application No. 2019100794, mailed on Dec. 19, 2019, 2 pages.
Certificate of Examination received for Australian Patent Application No. 2019101019, mailed on Nov. 12, 2019, 2 pages.
Certificate of Examination received for Australian Patent Application No. 2019101667, mailed on Mar. 20, 2020, 2 pages.
Certificate of Examination received for Australian Patent Application No. 2020100189, mailed on May 12, 2020, 2 pages.
Certificate of Examination received for Australian Patent Application No. 2020100675, mailed on Jun. 30, 2020, 2 pages.
Certificate of Examination received for Australian Patent Application No. 2020101043, mailed on Dec. 22, 2020, 2 pages.
Certificate of Examination received for Australian Patent Application No. 2020101715, mailed on Oct. 6, 2020, 2 pages.
Chicaview, "What is New! Make Funny GIFs Clips—Gif Me (Phone App)", Available online at: <https://www.youtube.com/watch?v=0LPGSFFP-V0>, See especially 1:15-2:25, Sep. 20, 2016, 3 pages.
Contents Pocket, "Line Stamp Information", Available online at: <https://web.archive.org/web/20150404080541/http://contents-pocket.net/linestamp.html>, Apr. 2015, 2 pages.
Corrected Notice of Allowance received for U.S. Appl. No. 15/713,490, mailed on May 1, 2019, 2 pages.
Corrected Notice of Allowance received for U.S. Appl. No. 15/940,017, mailed on Aug. 27, 2020, 2 pages.
Corrected Notice of Allowance received for U.S. Appl. No. 15/940,017, mailed on Oct. 21, 2020, 3 pages.
Corrected Notice of Allowance received for U.S. Appl. No. 15/981,754, mailed on Oct. 15, 2019, 2 pages.
Corrected Notice of Allowance received for U.S. Appl. No. 15/981,754, mailed on Oct. 24, 2019, 2 pages.
Corrected Notice of Allowance received for U.S. Appl. No. 16/142,288, mailed on Jul. 30, 2019, 5 pages.
Corrected Notice of Allowance received for U.S. Appl. No. 16/143,097, mailed on Nov. 8, 2019, 3 pages.
Corrected Notice of Allowance received for U.S. Appl. No. 16/519,850, mailed on Nov. 2, 2020, 5 pages.
Corrected Notice of Allowance received for U.S. Appl. No. 16/519,850, mailed on Sep. 8, 2020, 5 pages.
Corrected Notice of Allowance received for U.S. Appl. No. 16/582,570, mailed on Mar. 31, 2020, 2 pages.
Corrected Notice of Allowance received for U.S. Appl. No. 16/663,062, mailed on Apr. 14, 2021, 2 pages.
Corrected Notice of Allowance received for U.S. Appl. No. 16/663,062, mailed on Jul. 21, 2021, 2 pages.
Corrected Notice of Allowance received for U.S. Appl. No. 16/676,087, mailed on Aug. 3, 2020, 2 pages.
Corrected Notice of Allowance received for U.S. Appl. No. 16/676,087, mailed on Aug. 19, 2020, 2 pages.
Corrected Notice of Allowance received for U.S. Appl. No. 16/676,087, mailed on Jul. 8, 2020, 2 pages.
Corrected Notice of Allowance received for U.S. Appl. No. 16/896,457, mailed on Apr. 6, 2021, 3 pages.
Corrected Notice of Allowance received for U.S. Appl. No. 16/896,457, mailed on Feb. 24, 2021, 2 pages.
Corrected Notice of Allowance received for U.S. Appl. No. 16/896,457, mailed on Jan. 28, 2021, 2 pages.
Decision to Grant received for Danish Patent Application No. PA201770418, mailed on Oct. 25, 2019, 3 pages.
Decision to Grant received for Danish Patent Application No. PA201770419, mailed on Oct. 25, 2018, 2 pages.
Decision to Grant received for Danish Patent Application No. PA201770720, mailed on Aug. 8, 2019, 2 pages.
Decision to Grant received for Danish Patent Application No. PA201770721, mailed on Jun. 17, 2019, 2 pages.
Decision to Grant received for Danish Patent Application No. PA201870372, mailed on Jun. 17, 2020, 2 pages.
Decision to Grant received for Danish Patent Application No. PA201870375, mailed on Jul. 24, 2019, 2 pages.
Decision to Grant received for Danish Patent Application No. PA201870377, mailed on May 14, 2019, 2 pages.
Decision to Grant received for Danish Patent Application No. PA201870381, mailed on Oct. 14, 2019, 2 pages.
Decision to Grant received for European Patent Application No. 17853654.6, mailed on Apr. 15, 2021, 2 pages.
Decision to Grant received for European Patent Application No. 18704335.1, mailed on Sep. 24, 2020, 2 pages.
Decision to Grant received for European Patent Application No. 19172407.9, mailed on Jun. 17, 2021, 2 pages.
Decision to Refuse received for European Patent Application No. 19724959.2, mailed on Jun. 22, 2021, 13 pages.
Enterbrain, "No. 5 Create your own Avatar Mii Studio", vol. 26, No. 11, p. 138, Feb. 24, 2011, 4 pages.
European Search Report received for European Patent Application No. 19172407.9, mailed on Oct. 9, 2019, 4 pages.
European Search Report received for European Patent Application No. 19181242.9, mailed on Nov. 27, 2019, 4 pages.
European Search Report received for European Patent Application No. 19186042.8, mailed on Sep. 12, 2019, 4 pages.
European Search Report received for European Patent Application No. 19211833.9, mailed on Jul. 1, 2020, 4 pages.
European Search Report received for European Patent Application No. 20168021.2, mailed on Jul. 8, 2020, 4 pages.
Examiner's Answer to Appeal Brief received for U.S. Appl. No. 16/259,771, mailed on Oct. 23, 2020, 15 pages.
Extended European Search Report received for European Patent Application No. 17853654.6, mailed on Jul. 8, 2019, 9 pages.
Extended European Search Report received for European Patent Application No. 17853657.9, mailed on May 28, 2020, 9 pages.
Extended European Search Report received for European Patent Application No. 19204230.7, mailed on Feb. 21, 2020, 7 pages.
Extended European Search Report received for European Patent Application No. 19212057.4, mailed on Feb. 27, 2020, 8 pages.
Extended European Search Report received for European Patent Application No. 20191533.7, mailed on Nov. 13, 2020, 8 pages.
Facerig, "FaceRig Mobile Selfie Tip", Available online at: https://www.youtube.com/watch?v=x3DZHnXWZ3U, Oct. 18, 2016, 3 pages.
Facerig, "FaceRig Mobile Tip: How to record with and without the camera feed", Available Online at: https://www.youtube.com/watch?v=Iwk9FIWGvVM, Nov. 8, 2016, 3 pages.
Fedko Daria, "AR Hair Styles", Online Available at: <https://www.youtube.com/watch?v=FrS6tHRbFE0>, Jan. 24, 2017, 2 pages.

(56) References Cited

OTHER PUBLICATIONS

Final Office Action received for U.S. Appl. No. 13/082,035, mailed on Apr. 16, 2015, 24 pages.
Final Office Action received for U.S. Appl. No. 13/082,035, mailed on Aug. 15, 2013, 24 pages.
Final Office Action received for U.S. Appl. No. 14/866,560, mailed on Oct. 9, 2018, 22 pages.
Final Office Action received for U.S. Appl. No. 15/714,887, mailed on Nov. 13, 2020, 60 pages.
Final Office Action received for U.S. Appl. No. 15/714,887, mailed on Nov. 15, 2019, 55 pages.
Final Office Action received for U.S. Appl. No. 15/870,195, mailed on Dec. 13, 2018, 27 pages.
Final Office Action received for U.S. Appl. No. 15/940,017, mailed on Apr. 15, 2020, 19 pages.
Final Office Action received for U.S. Appl. No. 15/940,017, mailed on Dec. 20, 2018, 17 pages.
Final Office Action received for U.S. Appl. No. 15/940,232, mailed on Jan. 10, 2019, 27 pages.
Final Office Action received for U.S. Appl. No. 16/116,221, mailed on Mar. 22, 2019, 35 pages.
Final Office Action received for U.S. Appl. No. 16/259,771, mailed on Nov. 18, 2019, 13 pages.
Final Office Action received for U.S. Appl. No. 16/582,500, mailed on Nov. 30, 2020, 20 pages.
Final Office Action received for U.S. Appl. No. 16/583,706, mailed on Jun. 11, 2020, 31 pages.
Flatlinevertigo, "Black Desert Online: Intro to Hair Customization", Online Available at: <https://www.youtube.com/watch?v=9MCbfd_eMEg>, Sep. 9, 2015, 3 pages.
Flyme Global, "Flyme 6—Setup Contact Avatar", Available online at: https://www.youtube.com/watch?v=HvmyZdovhEk, May 15, 2017, 3 pages.
Gao et al., "Automatic Unpaired Shape Deformation Transfer", ACM Transactions on Graphics, Online available at: https://doi.org/10.1145/3272127.3275028, 2018, 11 pages.
Gardener Ricardo, "How to Create and Use AR Emoji Galaxy S10, S10 Plus", Available online at: https://www.youtube.com/watch?v=wNjgUQzFYto, May 9, 2019, 3 pages.
Gavin Brady, "How to Remove Old User Account Pictures in Windows 10", Available online at: https://www.howtogeek.com/369601/how-to-remove-old-user-account-pictures-in-windows-10/, Oct. 16, 2018, 5 pages.
Giphy Inc. Communication, "Giphy Cam. The GIF Camera", Available at: <https://web.archive.org/web/20170309234909/https://play.google.com/store/apps/details?id=com.giphy.camera>, Mar. 9, 2017, pp. 1-3.
"Here are Warez Files: Eve Online Character Creator", Online Available at: <http://theherearewarezfiles.blogspot.com/2014/03/eve-online-character-creator-download.html>, Mar. 3, 2014, 7 pages.
Holotech Studios Entertainment, "FaceRig", Available at: <https://web.archive.org/web/20161120090627/https://play.google.com/store/apps/details?id=com.holotech.facerig&hl=da>, Nov. 9, 2016, 3 pages.
"How to Use MSQRD", Available Online at: <https://web.archive.org/web/20160505072814/https:/www.wikihow.com/Use-MSQRD>, May 5, 2016, 3 pages.
Intention to Grant received for Danish Patent Application No. PA201770418, mailed on Aug. 22, 2019, 2 pages.
Intention to Grant received for Danish Patent Application No. PA201770418, mailed on Nov. 16, 2018, 3 pages.
Intention to Grant received for Danish Patent Application No. PA201770419, mailed on Mar. 28, 2018, 2 pages.
Intention to Grant received for Danish Patent Application No. PA201770720, mailed on Apr. 4, 2019, 2 pages.
Intention to Grant received for Danish Patent Application No. PA201770720, mailed on Jun. 21, 2019, 2 pages.
Intention to Grant received for Danish Patent Application No. PA201770721, mailed on Apr. 4, 2019, 2 pages.
Intention to Grant received for Danish Patent Application No. PA201870372, mailed on Feb. 13, 2020, 2 pages.
Intention to Grant received for Danish Patent Application No. PA201870375, mailed on Jun. 3, 2019, 2 pages.
Intention to Grant received for Danish Patent Application No. PA201870375, mailed on Mar. 26, 2019, 2 pages.
Intention to Grant received for Danish Patent Application No. PA201870377, mailed on Mar. 26, 2019, 2 pages.
Intention to Grant received for Danish Patent Application No. PA201870381, mailed on Jul. 18, 2019, 2 pages.
Intention to Grant received for European Patent Application No. 17853654.6, mailed on Nov. 23, 2020, 8 pages.
Intention to grant received for European Patent Application No. 18704335.1, mailed on Apr. 17, 2020, 6 pages.
Intention to Grant received for European Patent Application No. 19172407.9, mailed on Feb. 11, 2021, 9 pages.
Intention to Grant received for European Patent Application No. 20168021.2, mailed on Apr. 15, 2021, 8 pages.
International Preliminary Report on Patentability received for PCT Patent Application No. PCT/US2018/014658, mailed on Nov. 28, 2019, 14 pages.
International Preliminary Report on Patentability received for PCT Patent Application No. PCT/US2018/014892, mailed on Nov. 28, 2019, 8 pages.
International Preliminary Report on Patentability received for PCT Patent Application No. PCT/US2011/031616, mailed on Oct. 18, 2012, 6 pages.
International Preliminary Report on Patentability received for PCT Patent Application No. PCT/US2017/049760, mailed on Apr. 4, 2019, 9 pages.
International Preliminary Report on Patentability received for PCT Patent Application No. PCT/US2017/049795, mailed on Apr. 4, 2019, 16 pages.
International Preliminary Report on Patentability received for PCT Patent Application No. PCT/US2018/033044, mailed on Nov. 28, 2019, 8 pages.
International Preliminary Report on Patentability received for PCT Patent Application No. PCT/US2019/023793, mailed on Nov. 19, 2020, 12 pages.
International Preliminary Report on Patentability received for PCT Patent Application No. PCT/US2019/024067, mailed on Nov. 19, 2020, 12 pages.
International Search Report and Written Opinion received for PCT Application No. PCT/US2017/049795, mailed on Dec. 27, 2017, 26 pages.
International Search Report and Written Opinion received for PCT Patent Application No. PCT/US17/49760, mailed on Jan. 19, 2018, 12 pages.
International Search Report and Written Opinion received for PCT Patent Application No. PCT/US2011/031616, mailed on Aug. 30, 2011, 8 pages.
International Search Report and Written Opinion received for PCT Patent Application No. PCT/US2018/014658, mailed on Jun. 6, 2018, 20 pages.
International Search Report and Written Opinion received for PCT Patent Application No. PCT/US2018/014892, mailed on Mar. 7, 2018, 10 pages.
International Search Report and Written Opinion received for PCT Patent Application No. PCT/US2018/033044, mailed on Sep. 11, 2018, 13 pages.
International Search Report and Written Opinion received for PCT Patent Application No. PCT/US2019/023793, mailed on Aug. 27, 2019, 17 pages.
International Search Report and Written Opinion received for PCT Patent Application No. PCT/US2019/024067, mailed on Oct. 9, 2019, 18 pages.
International Search Report and Written Opinion received for PCT Patent Application No. PCT/US2020/014176, mailed on Mar. 26, 2020, 12 pages.
International Search Report and Written Opinion received for PCT Patent Application No. PCT/US2020/025913, mailed on Sep. 15, 2020, 19 pages.
Invitation to Pay Addition Fees received for PCT Patent Application No. PCT/US2018/014658, mailed on Apr. 11, 2018, 14 pages.

(56) References Cited

OTHER PUBLICATIONS

Invitation to pay Additional fees received for PCT Patent Application No. PCT/US17/49760, mailed on Nov. 21, 2017, 2 pages.
Invitation to Pay Additional Fees received for PCT Patent Application No. PCT/US2017/049795, mailed on Nov. 3, 2017, 3 pages.
Invitation to Pay Additional Fees received for PCT Patent Application No. PCT/US2019/023793, mailed on Jul. 5, 2019, 11 pages.
Invitation to Pay Additional Fees received for PCT Patent Application No. PCT/US2019/024067, mailed on Jul. 16, 2019, 13 pages.
Invitation to Pay Additional Fees received for PCT Patent Application No. PCT/US2020/025913, mailed on Jul. 24, 2020, 11 pages.
Invitation to Pay Search Fees received for European Patent Application No. 19724959.2, mailed on Feb. 25, 2020, 3 pages.
Invitation to Pay Search Fees received for European Patent Application No. 20722020.3, mailed on Feb. 16, 2021, 3 pages.
Itjungles, "Samsung Galaxy S8: How to Assign a Photo to a Contact", Available online at: <https://www.youtube.com/watch?v=2ZdwxijxDzE>, Feb. 13, 2018, 3 pages.
Itjungles, "Samsung Galaxy S9: How to Add Stickers to Text Messages", Available online at: https://www.youtube.com/watch?v=ojGC_UMQds0, Jan. 22, 2019, 3 pages.
Jabbari Ibrahim, "How to set up Google Gboard's 'Mini' stickers", Available online at: https://www.youtube.com/watch?v=z_sWkctRr8Q, Aug. 30, 2018, 3 pages.
Koti Kotresh, "Colour with Asian Paints.A Mobail App by Android Application—2018", Available Online at: <https://www.youtube.com/watch?v=M6EIO7ErYd0&feature=youtu.be&t=81>, May 6, 2018, 2 pages.
Kozak Tadeusz, "When You're Video Chatting on Snapchat, How Do You Use Face Filters?", Quora, Online Available at: https://www.quora.com/When-youre-video-chatting-on-Snapchat-how-do-you-use-face-filters, Apr. 29, 2018, 1 page.
Kyoko Makino, "How to Make a Lookalike Face Icon for Your Friend", ASCII, Japan Weekly, ASCII Media Works Inc., vol. 24, pp. 90-93, Jul. 17, 2014, 7 pages.
Lang Brian, "How to Audio & Video Chat with Multiple Users at the Same Time in Groups", Snapchat 101, Online Available at: <https://smartphones.gadgethacks.com/how-to/snapchat-101-audio-video-chat-with-multiple-users-same-time-groups-0184113/>, Apr. 17, 2018, 4 pages.
Latest Technology, "How to Create Personalized Emojis on Gboard Using Your Selfies II Personal Emojis", Available online at: https://www.youtube.com/watch?v=udyom84oqqA, Nov. 1, 2018, 3 pages.
Maria Del Puy Carretero et al., "Preserving Avatar Genuineness in Different Display Media", Mobile Networks and Applications, Kluwer Academic Publishers, BO, vol. 13, No. 6, Jul. 15, 2008, pp. 627-634.
Mega Ninja, "Face rig review", Available online at: https://www.youtube.com/watch?v=8YqeeiEVKRg, Feb. 6, 2017, 3 pages.
Minutes of the Oral Proceedings received for European Patent Application No. 19181242.9, mailed on Dec. 15, 2020, 6 pages.
Minutes of the Oral Proceedings received for European Patent Application No. 19724959.2, mailed on Jun. 14, 2021, 6 pages.
Mitsuru Takeuchi, "Face Shape Selection for Automatic Avatar Generation", 13th Annual Conference Proceedings of Virtual Reality Society of Japan tournament Papers [DVD-ROM], The Virtual Reality Society of Japan, Sep. 24, 2008, 7 pages.
Nathan B Tech, "New Samsung S10 AR Emojis In Depth", Available online at: https://www.youtube.com/watch?v=xXeNSuNoEHc, Mar. 17, 2019, 4 pages.
NCCU DCT, "Faceshift", Available online at: https://www.youtube.com/watch?v=4Ph0_SP8tpA, Dec. 1, 2014, 3 pages.
Neurotechnology, "Sentimask SDK", Available at: https://www.neurotechnology.com/sentimask.html, Apr. 22, 2018, 5 pages.
Nineverything, "Making a Mii on Switch—all of the options", Online available at: https://www.youtube.com/watch?v=kUDPmbBK7ys, Feb. 23, 2017, 3 pages.
Noh et al., "Expression Cloning", Proceedings of the 28th annual conference on Computer Graphics and Interactive Techniques, ACM SIGGRAPH, Los Angeles, CA, USA, Aug. 12-17, 2001, 12 pages.
Non-Final Office Action received for U.S. Appl. No. 13/082,035, mailed on Apr. 21, 2016, 25 pages.
Non-Final Office Action received for U.S. Appl. No. 13/082,035, mailed on Dec. 19, 2012, 19 pages.
Non-Final Office Action received for U.S. Appl. No. 13/082,035, mailed on Sep. 11, 2014, 23 pages.
Non-Final Office Action received for U.S. Appl. No. 14/866,560, mailed on Apr. 19, 2018, 10 pages.
Non-Final Office Action received for U.S. Appl. No. 14/866,560, mailed on Apr. 30, 2019, 23 pages.
Non-Final Office Action received for U.S. Appl. No. 15/714,887, mailed on May 27, 2020, 48 pages.
Non-Final Office Action received for U.S. Appl. No. 15/714,887, mailed on May 30, 2019, 47 pages.
Non-Final Office Action received for U.S. Appl. No. 15/940,017, mailed on Jun. 18, 2018, 15 pages.
Non-Final Office Action received for U.S. Appl. No. 15/940,017, mailed on Sep. 30, 2019, 16 pages.
Non-Final Office Action received for U.S. Appl. No. 15/940,232, mailed on Jun. 18, 2018, 23 pages.
Non-Final Office Action received for U.S. Appl. No. 16/035,419, mailed on Jan. 30, 2019, 24 pages.
Non-Final Office Action received for U.S. Appl. No. 16/116,221, mailed on Nov. 13, 2018, 27 pages.
Non-Final Office Action received for U.S. Appl. No. 16/142,288, mailed on Nov. 20, 2018, 15 pages.
Non-Final Office Action received for U.S. Appl. No. 16/142,305, mailed on Nov. 23, 2018, 32 pages.
Non-Final Office Action received for U.S. Appl. No. 16/142,328, mailed on Nov. 8, 2018, 18 pages.
Non-Final Office Action received for U.S. Appl. No. 16/143,097, mailed on Feb. 28, 2019, 17 pages.
Non-Final Office Action received for U.S. Appl. No. 16/259,771, mailed on May 8, 2019, 11 pages.
Non-Final Office Action received for U.S. Appl. No. 16/519,850, mailed on Mar. 23, 2020, 8 pages.
Non-Final Office Action received for U.S. Appl. No. 16/582,500, mailed on Jun. 2, 2020, 15 pages.
Non-Final Office Action received for U.S. Appl. No. 16/583,706, mailed on Jan. 10, 2020, 27 pages.
Non-Final Office Action received for U.S. Appl. No. 16/583,706, mailed on Mar. 4, 2021, 34 pages.
Non-Final Office Action received for U.S. Appl. No. 16/599,433, mailed on Jan. 28, 2021, 16 pages.
Non-Final Office Action received for U.S. Appl. No. 16/663,062, mailed on Oct. 28, 2020, 14 pages.
Non-Final Office Action received for U.S. Appl. No. 16/676,087, mailed on Apr. 9, 2020, 55 pages.
Non-Final Office Action received for U.S. Appl. No. 16/833,436, mailed on Mar. 29, 2021, 27 pages.
Non-Final Office Action received for U.S. Appl. No. 15/870,195, mailed on May 2, 2018, 22 pages.
Notice of Acceptance received for Australian Patent Application No. 2017330208, mailed on Nov. 28, 2019, 3 pages.
Notice of Acceptance received for Australian Patent Application No. 2017330212, mailed on Apr. 28, 2020, 3 pages.
Notice of Acceptance received for Australian Patent Application No. 2018269375, mailed on Dec. 3, 2020, 3 pages.
Notice of Acceptance received for Australian Patent Application No. 2019265357, mailed on Dec. 24, 2020, 3 pages.
Notice of Acceptance received for Australian Patent Application No. 2019266049, mailed on Nov. 24, 2020, 3 pages.
Notice of Acceptance received for Australian Patent Application No. 2020213402, mailed on Sep. 21, 2020, 3 pages.
Notice of Allowance received for Chinese Patent Application No. 201880022585.3, mailed on Oct. 28, 2020, 6 pages.
Notice of Allowance received for Chinese Patent Application No. 201910278273.5, mailed on Nov. 19, 2020, 2 pages.

(56) References Cited

OTHER PUBLICATIONS

Notice of Allowance received for Chinese Patent Application No. 201910379481.4, mailed on Nov. 9, 2020, 6 pages.
Notice of Allowance received for Chinese Patent Application No. 201910563974.3, mailed on Jun. 2, 2021, 2 pages.
Notice of Allowance received for Chinese Patent Application No. 201910692958.4, mailed on Jul. 21, 2020, 2 pages.
Notice of Allowance received for Chinese Patent Application No. 201910692978.1, mailed on Feb. 4, 2021, 6 pages.
Notice of Allowance received for Chinese Patent Application No. 201911202668.3, mailed on Feb. 4, 2021, 5 pages.
Notice of Allowance received for Chinese Patent Application No. 201911219525.3, mailed on Sep. 29, 2020, 2 pages.
Notice of Allowance received for Chinese Patent Application No. 202010776600.2, mailed on Apr. 1, 2021, 8 pages.
Notice of Allowance received for Japanese Patent Application No. 2018484254, mailed on Jun. 15, 2020, 4 pages.
Notice of Allowance received for Japanese Patent Application No. 2019-511767, mailed on Mar. 30, 2020, 4 pages.
Notice of Allowance received for Japanese Patent Application No. 2019-511975, mailed on Dec. 14, 2020, 4 pages.
Notice of Allowance received for Korean Patent Application No. 10-2019-7005136, mailed on Feb. 19, 2021, 5 pages.
Notice of Allowance received for Korean Patent Application No. 10-2019-7005369, mailed on Oct. 26, 2020, 4 pages.
Notice of Allowance received for Korean Patent Application No. 10-2020-7031855, mailed on Mar. 22, 2021, 5 pages.
Notice of Allowance received for Korean Patent Application No. 10-2020-7032147, mailed on May 12, 2021, 4 pages.
Notice of Allowance received for U.S. Appl. No. 13/082,035, mailed on Oct. 5, 2016, 9 pages.
Notice of Allowance received for U.S. Appl. No. 14/866,560, mailed on Nov. 15, 2019, 9 pages.
Notice of Allowance received for U.S. Appl. No. 15/713,490, mailed on Mar. 20, 2019, 15 pages.
Notice of Allowance received for U.S. Appl. No. 15/870,195, mailed on Sep. 23, 2019, 13 pages.
Notice of Allowance received for U.S. Appl. No. 15/940,017, mailed on Aug. 6, 2020, 10 pages.
Notice of Allowance received for U.S. Appl. No. 15/940,232, mailed on Jun. 4, 2019, 12 pages.
Notice of Allowance received for U.S. Appl. No. 15/981,754, mailed on Jul. 17, 2019, 15 pages.
Notice of Allowance received for U.S. Appl. No. 15/981,754, mailed on Sep. 18, 2019, 14 pages.
Notice of Allowance received for U.S. Appl. No. 16/035,419, mailed on May 24,2019, 14 pages.
Notice of Allowance received for U.S. Appl. No. 16/110,514, mailed on Apr. 29, 2019, 9 pages.
Notice of Allowance received for U.S. Appl. No. 16/110,514, mailed on Mar. 13, 2019, 11 pages.
Notice of Allowance received for U.S. Appl. No. 16/116,221, mailed on Nov. 22, 2019, 13 pages.
Notice of Allowance received for U.S. Appl. No. 16/116,221, mailed on Sep. 20, 2019, 13 pages.
Notice of Allowance received for U.S. Appl. No. 16/142,288, mailed on Jun. 24, 2019, 10 pages.
Notice of Allowance received for U.S. Appl. No. 16/142,288, mailed on Mar. 27, 2019, 9 pages.
Notice of Allowance received for U.S. Appl. No. 16/142,288, mailed on May 1, 2019, 4 pages.
Notice of Allowance received for U.S. Appl. No. 16/142,305, mailed on Apr. 3, 2019, 5 pages.
Notice of Allowance received for U.S. Appl. No. 16/142,305, mailed on May 1, 2019, 2 pages.
Notice of Allowance received for U.S. Appl. No. 16/142,328, mailed on Apr. 5, 2019, 7 pages.
Notice of Allowance received for U.S. Appl. No. 16/143,097, mailed on Aug. 29, 2019, 23 pages.
Notice of Allowance received for U.S. Appl. No. 16/143,201, mailed on Feb. 8, 2019, 9 pages.
Notice of Allowance received for U.S. Appl. No. 16/143,201, mailed on Nov. 28, 2018, 14 pages.
Notice of Allowance received for U.S. Appl. No. 16/519,850, mailed on Aug. 26, 2020, 8 pages.
Notice of Allowance received for U.S. Appl. No. 16/582,570, mailed on Mar. 6, 2020, 28 pages.
Notice of Allowance received for U.S. Appl. No. 16/599,433, mailed on May 14, 2021, 11 pages.
Notice of Allowance received for U.S. Appl. No. 16/663,062, mailed on Jul. 13, 2021, 7 pages.
Notice of Allowance received for U.S. Appl. No. 16/663,062, mailed on Mar. 24, 2021, 8 pages.
Notice of Allowance received for U.S. Appl. No. 16/676,087, mailed on Jun. 19, 2020, 9 pages.
Notice of Allowance received for U.S. Appl. No. 16/676,087, mailed on Oct. 21, 2020, 9 pages.
Notice of Allowance received for U.S. Appl. No. 16/896,457, mailed on Jan. 8, 2021, 22 pages.
Office Action received for Australian Patent Application No. 2017330208, mailed on Jul. 25, 2019, 5 pages.
Office Action received for Australian Patent Application No. 2017330212, mailed on Feb. 21, 2020, 2 pages.
Office Action received for Australian Patent Application No. 2018269375, mailed on Jun. 19, 2020, 4 pages.
Office Action received for Australian Patent Application No. 2018269375, mailed on Sep. 7, 2020, 3 pages.
Office Action received for Australian Patent Application No. 2018270420, mailed on Apr. 19, 2021, 4 pages.
Office Action received for Australian Patent Application No. 2018270420, mailed on Jan. 7, 2021, 5 pages.
Office Action received for Australian Patent Application No. 2018270420, mailed on Jul. 21, 2020, 5 pages.
Office Action received for Australian Patent Application No. 2019100794, mailed on Oct. 3, 2019, 4 pages.
Office Action received for Australian Patent Application No. 2020100189, mailed on Apr. 1, 2020, 3 pages.
Office Action received for Australian Patent Application No. 2020101043, mailed on Aug. 14, 2020, 5 pages.
Office Action received for Australian Patent Application No. 2020101043, mailed on Oct. 30, 2020, 4 pages.
Office Action received for Australian Patent Application No. 2020201721, mailed on Feb. 26, 2021, 7 pages.
Office Action received for Chinese Patent Application No. 201780053143.0, mailed on Dec. 24, 2020, 21 pages.
Office Action received for Chinese Patent Application No. 201780053143.0, mailed on May 22, 2020, 21 pages.
Office Action received for Chinese Patent Application No. 201880000798.6, mailed on Aug. 5, 2020, 18 pages.
Office Action received for Chinese Patent Application No. 201880022585.3, mailed on May 22, 2020, 11 pages.
Office Action received for Chinese Patent Application No. 201910278273.5, mailed on Jan. 3, 2020, 17 pages.
Office Action received for Chinese Patent Application No. 201910278273.5, mailed on Jun. 9, 2020, 8 pages.
Office Action received for Chinese Patent Application No. 201910379481.4, mailed on Mar. 2, 2020, 18 pages.
Office Action received for Chinese Patent Application No. 201910563974.3, mailed on Feb. 7, 2021, 7 pages.
Office Action received for Chinese Patent Application No. 201910563974.3, mailed on May 8, 2020, 18 pages.
Office Action received for Chinese Patent Application No. 201910691865.X, mailed on Feb. 4, 2021, 16 pages.
Office Action received for Chinese Patent Application No. 201910691865.X, mailed on Jul. 8, 2020, 17 pages.
Office Action received for Chinese Patent Application No. 201910691872.X, mailed on Jun. 3, 2020, 10 pages.
Office Action received for Chinese Patent Application No. 201910691872.X, mailed on Mar. 24, 2021, 19 pages.
Office Action received for Chinese Patent Application No. 201910692958.4, mailed on Mar. 19, 2020, 20 pages.

(56) References Cited

OTHER PUBLICATIONS

Office Action received for Chinese Patent Application No. 201910692978.1, mailed on Apr. 3, 2020, 19 pages.
Office Action received for Chinese Patent Application No. 201910692978.1, mailed on Nov. 4, 2020, 4 pages.
Office Action received for Chinese Patent Application No. 201911199054.4, mailed on Jan. 20, 2021, 19 pages.
Office Action received for Chinese Patent Application No. 201911199054.4, mailed on Jul. 3, 2020, 15 pages.
Office Action received for Chinese Patent Application No. 201911199054.4, mailed on Jun. 10, 2021, 13 pages.
Office Action received for Chinese Patent Application No. 201911202668.3, mailed on Aug. 4, 2020, 13 pages.
Office Action received for Chinese Patent Application No. 201911219517.9, mailed on Mar. 2, 2021, 20 pages.
Office Action received for Chinese Patent Application No. 201911219525.3, mailed on Jul. 10, 2020, 7 pages.
Office Action received for Chinese Patent Application No. 202010330318.1, mailed on Mar. 31, 2021, 13 pages.
Office Action received for Chinese Patent Application No. 202010330318.1, mailed on Nov. 19, 2020, 18 pages.
Office Action received for Danish Patent Application No. PA201770393, mailed on Dec. 12, 2018, 7 pages.
Office Action received for Danish Patent Application No. PA201770393, mailed on Jan. 31, 2020, 6 pages.
Office Action received for Danish Patent Application No. PA201770393, mailed on Jul. 11, 2019, 2 pages.
Office Action received for Danish Patent Application No. PA201770393, mailed on Mar. 19, 2018, 8 pages.
Office Action received for Danish Patent Application No. PA201770418, mailed on May 8, 2018, 3 pages.
Office Action received for Danish Patent Application No. PA201770419, mailed on Jan. 10, 2018, 4 pages.
Office Action received for Danish Patent Application No. PA201770720, mailed on Apr. 26, 2018, 3 pages.
Office Action received for Danish Patent Application No. PA201770720, mailed on Nov. 16, 2018, 3 pages.
Office Action received for Danish Patent Application No. PA201770720, mailed on Oct. 18, 2017, 8 pages.
Office Action received for Danish Patent Application No. PA201770721, mailed on Apr. 26, 2018, 3 pages.
Office Action received for Danish Patent Application No. PA201770721, mailed on Nov. 16, 2018, 3 pages.
Office Action received for Danish Patent Application No. PA201770721, mailed on Oct. 19, 2017, 8 pages.
Office Action received for Danish Patent Application No. PA201870366, mailed on Aug. 22, 2019, 3 pages.
Office Action received for Danish Patent Application No. PA201870366, mailed on Dec. 12, 2018, 3 pages.
Office Action received for Danish Patent Application No. PA201870367, mailed on Dec. 20, 2018, 5 pages.
Office Action received for Danish Patent Application No. PA201870368, mailed on Dec. 20, 2018, 5 pages.
Office Action received for Danish Patent Application No. PA201870368, mailed on Oct. 1, 2019, 6 pages.
Office Action received for Danish Patent Application No. PA201870372, mailed on Aug. 20, 2019, 2 pages.
Office Action received for Danish Patent Application No. PA201870372, mailed on Jan. 31, 2019, 4 pages.
Office Action received for Danish Patent Application No. PA201870374, mailed on Feb. 6, 2019, 5 pages.
Office Action received for Danish Patent Application No. PA201870374, mailed on Jun. 17, 2019, 5 pages.
Office Action received for Danish Patent Application No. PA201870375, mailed on Jan. 31, 2019, 4 pages.
Office Action received for Danish Patent Application No. PA201870377, mailed on Jan. 31, 2019, 4 pages.
Office Action received for Danish Patent Application No. PA201970530, mailed on Mar. 4, 2020, 4 pages.
Office Action received for Danish Patent Application No. PA201970530, mailed on Mar. 25, 2021, 4 pages.
Office Action received for Danish Patent Application No. PA201970531, mailed on Feb. 17, 2020, 3 pages.
Office Action received for European Patent Application No. 17853654.6, mailed on Mar. 23, 2020, 4 pages.
Office Action received for European Patent Application No. 17853657.9, mailed on Apr. 1, 2021, 6 pages.
Office Action received for European Patent Application No. 18703184.4, mailed on Jul. 2, 2021, 6 pages.
Office Action received for European Patent Application No. 18703184.4, mailed on May 6, 2020, 7 pages.
Office Action received for European Patent Application No. 18703184.4, mailed on Nov. 23, 2020, 8 pages.
Office Action received for European Patent Application No. 18704335.1, mailed on Sep. 23, 2019, 7 pages.
Office Action received for European Patent Application No. 18732519.6, mailed on Apr. 24, 2020, 6 pages.
Office Action received for European Patent Application No. 18732519.6, mailed on Oct. 6, 2020, 5 pages.
Office Action received for European Patent Application No. 19172407.9, mailed on Oct. 18, 2019, 7 pages.
Office Action received for European Patent Application No. 19181242.9, mailed on Dec. 6, 2019, 9 pages.
Office Action received for European Patent Application No. 19186042.8, mailed on May 12, 2020, 5 pages.
Office Action received for European Patent Application No. 19186042.8, mailed on Sep. 24, 2019, 6 pages.
Office Action received for European Patent Application No. 19204230.7, mailed on Sep. 28, 2020, 6 pages.
Office Action received for European Patent Application No. 19211833.9, mailed on Jan. 29, 2021, 5 pages.
Office Action received for European Patent Application No. 19211833.9, mailed on Jul. 13, 2020, 7 pages.
Office Action received for European Patent Application No. 19212057.4, mailed on Mar. 9, 2021, 6 pages.
Office Action received for European Patent Application No. 19724959.2, mailed on Apr. 23, 2020, 10 pages.
Office Action received for European Patent Application No. 20168021.2, mailed on Jul. 22, 2020, 8 pages.
Office Action received for European Patent Application No. 20722020.3, mailed on May 12, 2021, 9 pages.
Office Action received for European Patent Application No. 18703184.4, mailed on Oct. 29, 2019, 6 pages.
Office Action received for Indian Patent Application No. 201814036470, mailed on Feb. 26, 2021, 7 pages.
Office Action received for Japanese Patent Application No. 2018-182607, mailed on Apr. 6, 2020, 6 pages.
Office Action received for Japanese Patent Application No. 2018-182607, mailed on Jul. 20, 2020, 5 pages.
Office Action received for Japanese Patent Application No. 2018-184254, mailed on Mar. 2, 2020, 8 pages.
Office Action received for Japanese Patent Application No. 2019-215503, mailed on Feb. 5, 2021, 12 pages.
Office Action received for Japanese Patent Application No. 2019-215503, mailed on Jul. 3, 2020, 12 pages.
Office Action received for Japanese Patent Application No. 2019-511975, mailed on Apr. 10, 2020, 6 pages.
Office Action received for Japanese Patent Application No. 2019-563408, mailed on Nov. 2, 2020, 4 pages.
Office Action received for Japanese Patent Application No. 2019-563560, mailed on Jun. 14, 2021, 6 pages.
Office Action received for Japanese Patent Application No. 2019-563560, mailed on Nov. 30, 2020, 7 pages.
Office Action received for Japanese Patent Application No. 2020-120086, mailed on May 21, 2021, 6 pages.
Office Action received for Japanese Patent Application No. 2020-120086, mailed on Nov. 20, 2020, 6 pages.
Office Action received for Japanese Patent Application No. 2020-193703, mailed on Apr. 19, 2021, 4 pages.
Office Action received for Korean Patent Application No. 10-2019-7005136, mailed on Jan. 28, 2020, 5 pages.

(56) References Cited

OTHER PUBLICATIONS

Office Action received for Korean Patent Application No. 10-2019-7005369, mailed on Mar. 13, 2020, 12 pages.
Office Action received for Korean Patent Application No. 10-2019-7033634, mailed on Sep. 28, 2020, 15 pages.
Office Action received for Korean Patent Application No. 10-2019-7033799, mailed on Apr. 27, 2021, 9 pages.
Office Action received for Korean Patent Application No. 10-2020-7031855, mailed on Nov. 24, 2020, 6 pages.
Office Action received for Korean Patent Application No. 10-2020-7032147, mailed on Feb. 16, 2021, 6 pages.
Office Action received for Korean Patent Application No. 10-2021-7002582, mailed on Apr. 16, 2021, 13 pages.
Office Action received for Taiwanese Patent Application No. 100111887, mailed on Oct. 7, 2013, 23 pages.
Opuni Kojo, "FaceShift Studio Demo", Available online at: https://www.youtube.com/watch?v=72ty7PYKwGU, Oct. 1, 2012, 3 pages.
PC World, "How to make AR Emojis on the Samsung Galaxy S9", You Tube, Available Online: https://www.youtube.com/watch?v=8wQICfulkz0, Feb. 25, 2018, 2 pages.
Pre-Appeal Review Report received for Japanese Patent Application No. 2018-182607, mailed on Jan. 21, 2021, 4 pages.
Pumarola et al., "GANimation: Anatomically-aware Facial Animation from a Single Image", Proceedings of the European Conference on Computer Vision (ECCV), Jul. 24, 2018, 16 pages.
Pyun et al., "An Example-Based Approach for Facial Expression Cloning", SIGGRAPH Symposium on Computer Animation, The Eurographics Association (2003), 2003, 10 pages.
Result of Consultation received for European Patent Application No. 19172407.9, mailed on Nov. 5, 2020, 17 pages.
Result of Consultation received for European Patent Application No. 19204230.7, mailed on Nov. 16, 2020, 3 pages.
Result of Consultation received for European Patent Application No. 19204230.7, mailed on Sep. 24, 2020, 5 pages.
Result of Consultation received for European Patent Application No. 19724959.2, mailed on Sep. 4, 2020, 3 pages.
Result of Consultation received for European Patent Application No. 19181242.9, mailed on Dec. 1, 2020, 12 pages.
Rosa et al., "Stripe Generator—a Free Tool for the Web Design Community", Available online at: http://www.stripegenerator.com/, Mar. 28, 2019, 2 pages.
Sambrook Jade, "Video Selfie Filters with MSQRD for Facebook Live", Available Online at: <https://www.youtube.com/watch?v=JZrWK2NEFeg>, See especially 2:44-3:03, Jul. 2, 2016, 3 pages.
Search Report and Opinion received for Danish Patent Application No. PA201770393, mailed on Jun. 21, 2017, 9 pages.
Search Report and Opinion received for Danish Patent Application No. PA201770418, mailed on Jun. 23, 2017, 8 pages.
Search Report and Opinion received for Danish Patent Application No. PA201770419, mailed on Jun. 19, 2017, 6 pages.
Search Report and Opinion received for Danish Patent Application No. PA201870366, mailed on Aug. 27, 2018, 9 pages.
Search Report and Opinion received for Danish Patent Application No. PA201870367, mailed on Aug. 27, 2018, 9 pages.
Search Report and Opinion received for Danish Patent Application No. PA201870368, mailed on Sep. 6, 2018, 7 pages.
Search Report and Opinion received for Danish Patent Application No. PA201870372, mailed on Sep. 14, 2018, 8 pages.
Search Report and Opinion received for Danish Patent Application No. PA201870372, mailed on Sep. 17, 2018, 10 pages.
Search Report and Opinion received for Danish Patent Application No. PA201870374, mailed on Aug. 27, 2018, 9 pages.
Search Report and Opinion received for Danish Patent Application No. PA201870375, mailed on Aug. 23, 2018, 8 pages.
Search Report and Opinion received for Danish Patent Application No. PA201870377, mailed on Sep. 4, 2018, 8 pages.
Search Report and Opinion received for Danish Patent Application No. PA201970530, mailed on Oct. 11, 2019, 8 pages.
Search Report and Opinion received for Danish Patent Application No. PA201970531, mailed on Oct. 11, 2019, 9 pages.
Search Report received for Danish Patent Application No. PA201870381, mailed on Sep. 13, 2018, 7 pages.
Singh Lovepreet, "Samsung Galaxy Watch: How to Change Watch Face—Tips and Tricks", Online available at: <https://www.youtube.com/watch?pp=desktop&v=IN7gPxTZ1qU>, Retrieved on Dec. 10, 2020, Dec. 4, 2018, 1 page.
Slashgear, "Samsung AR Emoji demo on the Galaxy S9", Available Online at <https://www.youtube.com/watch?v=GQwNKzY4C9Y>, Feb. 25, 2018, 3 pages.
Spellburst, "The Sims 3: Create a Sim With Me | #2—Dark Fairy + Full CC List!", Available online at: <https://www.youtube.com/watch?v=Dy_5g9B-wkA>, Oct. 9, 2017, 2 pages.
Stateoftech, "iPhone 6 Tips—How to Access the Camera from the Lock Screen", Screen captures with generated transcript from YouTube video clip, Online Available at: <https://www.youtube.com/watch?v=frB151RYB7U>, Jul. 2, 2015, 23 pages.
Summons to Attend Oral Proceedings received for European Patent Application No. 19172407.9, mailed on Jun. 24, 2020, 14 pages.
Summons to Attend Oral Proceedings received for European Patent Application No. 19181242.9, mailed on Jun. 16, 2020, 12 pages.
Summons to Attend Oral Proceedings received for European Patent Application No. 19204230.7, mailed on May 25, 2021, 10 pages.
Summons to Attend Oral Proceedings received for European Patent Application No. 19724959.2, mailed on Feb. 1, 2021, 9 pages.
Summons to Attend Oral Proceedings received for European Patent Application No. 19724959.2, mailed on Mar. 31, 2021, 3 pages.
Supplemental Notice of Allowance received for U.S. Appl. No. 15/713,490, mailed on May 30, 2019, 2 pages.
Supplemental Notice of Allowance received for U.S. Appl. No. 15/870,195, mailed on Nov. 14, 2019, 9 pages.
Supplemental Notice of Allowance received for U.S. Appl. No. 16/143,201, mailed on Dec. 13, 2018, 2 pages.
Supplemental Notice of Allowance received for U.S. Appl. No. 16/143,201, mailed on Dec. 19, 2018, 2 pages.
Supplemental Notice of Allowance received for U.S. Appl. No. 16/143,201, mailed on Jan. 10, 2019, 2 pages.
Switchforce, "Nintendo Switch Mii Creation+ NEW Mii Options and Poses", Online Available at: https://www.youtube.com/watch?v=n4ZFuaf2k4M, Feb. 23, 2017, 8 pages.
Tech With Brett, "How to Create Your AR Emoji on the Galaxy S9 and S9+", Available online at: https://www.youtube.com/watch?v=HHMdcBpC8MQ>, Mar. 16, 2018, 5 pages.
Ting, "Giphy Cam (iOS) | Ting Download", Available online at: https://www.youtube.com/watch?v=mykfBpyD3gg, Oct. 2, 2015, 3 pages.
Tsuchihashi et al., "Generation of Caricatures by Automatic Selection of Templates for Shapes and Placement of Facial Parts", Technical Report of the Institute of Image Information and Television Engineers, Japan, The Institute of Image Information and Television Engineers, vol. 33, No. 11, pp. 77-80., Feb. 8, 2009, 7 pages.
Twins Tornado, "New Tutorial: Add Facial Expressions to your Game Characters!", Available online at: https://www.youtube.com/watch?v=wKSjByNyaKA, Mar. 14, 2014, 4 pages.
Vidstube, "Bitmoji Clockface on Fitbit Versa Sense/Versa 3/Versa 2", Available online at: <https://www.youtube.com/watch?v=4V_xDnSLeHE>, Retrieved on Dec. 3, 2020, Jun. 30, 2019, 1 page.
Woolsey Amanda, "How to Customize the Clock on the Apple Watch", Available online at: <https://www.youtube.com/watch?v=t-3Bckdd9B4>, Retrieved on Dec. 11, 2020, Apr. 25, 2015, 1 page.
Yom Mama, "SnapChat Tutorial for Beginners!", Available Online at: <https://www.youtube.com/watch?v=zUmj039NNOU>, See especially 6:55-7:22, Jun. 6, 2016, 3 pages.
Zhang et al., "Facial Expression Retargeting from Human to Avatar Made Easy", IEEE Transactions on Visualization and Computer Graphics, Aug. 2020, 14 pages.
Zhao et al., "An Event-related Potential Comparison of Facial Expression Processing between Cartoon and Real Faces", Online available at: https://www.biorxiv.org/content/10.1101/333898v2, Jun. 18, 2018, 31 pages.

(56) References Cited

OTHER PUBLICATIONS

ZY News, "Generate Cartoon Face within Three Seconds, you are the New-generation Expression Emperor", Online available at: <http://inews.ifeng.com/48551936/news.shtml>, Apr. 22, 2016, 3 pages.
Applicant Initiated Interview Summary received for U.S. Appl. No. 17/031,671, mailed on Jun. 13, 2022, 7 pages.
Decision on Appeal received for Korean Patent Application No. 10-2021-7002582, mailed on May 13, 2022, 29 pages (2 pages of English Translation and 27 pages of Official Copy).
Office Action received for Korean Patent Application No. 10-2020-0123852, mailed on Jun. 9, 2022, 10 pages (4 pages of English Translation and 6 pages of Official Copy).
Office Action received for Korean Patent Application No. 10-2020-0123857, mailed on Jun. 9, 2022, 12 pages (5 pages of English Translation and 7 pages of Official Copy).
Office Action received for Korean Patent Application No. 10-2020-0123887, mailed on Jun. 9, 2022, 5 pages (2 pages of English Translation and 3 pages of Official Copy).
Applicant-Initiated Interview Summary received for U.S. Appl. No. 17/370,505, mailed on Oct. 17, 2022, 4 pages.
Brief Communication Regarding Oral Proceedings received for European Patent Application No. 19181242.9, mailed on Oct. 5, 2022, 4 pages.
Corrected Notice of Allowance received for U.S. Appl. No. 17/220,752, mailed on Oct. 14, 2022, 2 pages.
Decision to Refuse received for Japanese Patent Application No. 2020-159824, mailed on Sep. 30, 2022, 6 pages (3 pages of English Translation and 3 pages of Official Copy).
Notice of Acceptance received for Australian Patent Application No. 2022215297, mailed on Sep. 26, 2022, 3 pages.
Notice of Acceptance received for Australian Patent Application No. 2022220279, mailed on Sep. 27, 2022, 3 pages.
Notice of Allowance received for Japanese Patent Application No. 2021-092483, mailed on Sep. 30, 2022, 4 pages (1 page of English Translation and 3 pages of Official Copy).
Office Action received for Australian Patent Application No. 2021254574, mailed on Oct. 15, 2022, 3 pages.
Office Action received for Japanese Patent Application No. 2021-166686, mailed on Oct. 3, 2022, 3 pages (2 pages of English Translation and 1 page of Official Copy).
Advisory Action received for U.S. Appl. No. 16/583,706, mailed on Mar. 21, 2022, 3 pages.
Applicant Initiated Interview Summary received for U.S. Appl. No. 17/031,671, mailed on Nov. 8, 2021, 5 pages.
Applicant-Initiated Interview Summary received for U.S. Appl. No. 16/259,771, mailed on Apr. 18, 2022, 2 pages.
Applicant-Initiated Interview Summary received for U.S. Appl. No. 16/582,500, mailed on Dec. 27, 2021, 8 pages.
Applicant-Initiated Interview Summary received for U.S. Appl. No. 16/833,436, mailed on Jan. 27, 2022, 2 pages.
Applicant-Initiated Interview Summary received for U.S. Appl. No. 17/031,765, mailed on Dec. 15, 2021, 4 pages.
Applicant-Initiated Interview Summary received for U.S. Appl. No. 17/093,408, mailed on Mar. 1, 2022, 3 pages.
Applicant-Initiated Interview Summary received for U.S. Appl. No. 17/373,163, mailed on Apr. 11, 2022, 2 pages.
Corrected Notice of Allowance received for U.S. Appl. No. 16/599,433, mailed on Oct. 14, 2021, 3 pages.
Corrected Notice of Allowance received for U.S. Appl. No. 17/091,460, mailed on Feb. 16, 2022, 6 pages.
Corrected Notice of Allowance received for U.S. Appl. No. 17/091,460, mailed on Feb. 25, 2022, 6 pages.
Decision on Appeal received for U.S. Appl. No. 15/714,887, mailed on Feb. 18, 2022, 14 pages.
Decision to Grant received for European Patent Application No. 20168021.2, mailed on Feb. 3, 2022, 2 pages.
Decision to Grant received for Japanese Patent Application No. 2018-182607, mailed on Apr. 13, 2022, 3 pages (1 page of English Translation and 2 pages of Official Copy).

Decision to Refuse received for European Patent Application No. 19204230.7, mailed on Feb. 4, 2022, 15 pages.
Examiner's Pre-Review Report received for Japanese Patent Application No. 2019-563560, mailed on Dec. 27, 2021, 4 pages (2 pages of English Translation and 2 pages of Official Copy).
Extended European Search Report received for European Patent Application No. 21166287.9, mailed on Nov. 5, 2021, 10 pages.
Final Office Action received for U.S. Appl. No. 16/582,500, mailed on Apr. 29, 2022, 23 pages.
Final Office Action received for U.S. Appl. No. 16/583,706, mailed on Nov. 18, 2021, 39 pages.
Final Office Action received for U.S. Appl. No. 17/031,765, mailed on Oct. 29, 2021, 34 pages.
Ilovex, ""Stripe Generator", a tool that makes it easy to create striped materials", Online available at: https://www.ilovex.co.jp/blog/system/webconsulting/stripe-generator.html, May 2, 2012, 3 pages (Official Copy Only) {See Communication under 37 CFR § 1.98(a) (3)}.
Intention to Grant received for European Patent Application No. 19181242.9, mailed on Oct. 28, 2021, 16 pages.
International Preliminary Report on Patentability received for PCT Patent Application No. PCT/US2020/025913, mailed on Nov. 18, 2021, 11 pages.
International Search Report and Written Opinion received for PCT Patent Application No. PCT/US2021/031096, mailed on Oct. 13, 2021, 16 pages.
Invitation to Pay Additional Fees received for PCT Patent Application No. PCT/US2021/031096, mailed on Aug. 19, 2021, 8 pages.
Minutes of the Oral Proceedings received for European Patent Application No. 19204230.7, mailed on Feb. 2, 2022, 9 pages.
Modestneko, "How to Use Facerig", Available Online at: https://www.youtube.com/watch?v=e25_nuRNIOM, Mar. 31, 2019, 4 pages.
Non-Final Office Action received for U.S. Appl. No. 16/259,771, mailed on Jan. 25, 2022, 20 pages.
Non-Final Office Action received for U.S. Appl. No. 17/031,671, mailed on Apr. 1, 2022, 32 pages.
Non-Final Office Action received for U.S. Appl. No. 17/031,765, mailed on Mar. 29, 2022, 33 pages.
Non-Final Office Action received for U.S. Appl. No. 17/093,408, mailed on Dec. 8, 2021, 37 pages.
Non-Final Office Action received for U.S. Appl. No. 17/220,752, mailed on Apr. 15, 2022, 21 pages.
Non-Final Office Action received for U.S. Appl. No. 17/373,163, mailed on Jan. 27, 2022, 14 pages.
Notice of Acceptance received for Australian Patent Application No. 2020294208, mailed on Mar. 2, 2022, 3 pages.
Notice of Acceptance received for Australian Patent Application No. 2021201681, mailed on Feb. 3, 2022, 3 pages.
Notice of Allowance received for Japanese Patent Application No. 2020-120086, mailed on Nov. 15, 2021, 5 pages (2 pages English Translation and 3 pages of Official Copy).
Notice of Allowance received for Japanese Patent Application No. 2020-159825, mailed on Mar. 25, 2022, 5 pages (1 page of English Translation and 4 pages of Official Copy).
Notice of Allowance received for Korean Patent Application No. 10-2021-7015473, mailed on Feb. 24, 2022, 5 pages (1 page of English Translation and 4 pages of Official Copy).
Notice of Allowance received for Korean Patent Application No. 10-2021-7023617, mailed on Dec. 21, 2021, 6 pages (2 pages of English Translation and 4 pages of Official Copy).
Notice of Allowance received for Korean Patent Application No. 10-2021-7038284, mailed on Feb. 25, 2022, 5 pages (1 page of English Translation and 4 pages of Official Copy).
Notice of Allowance received for Korean Patent Application No. 10-2022-7002829, mailed on Feb. 12, 2022, 6 pages (1 page of English Translation and 5 pages of Official Copy).
Notice of Allowance received for U.S. Appl. No. 17/091,460, mailed on Apr. 28, 2022, 9 pages.
Notice of Allowance received for U.S. Appl. No. 17/091,460, mailed on Feb. 4, 2022, 10 pages.
Office Action received for Australian Patent Application No. 2020239749, mailed on Jan. 21, 2022, 4 pages.

(56) References Cited

OTHER PUBLICATIONS

Office Action received for Australian Patent Application No. 2020294208, mailed on Dec. 17, 2021, 2 pages.
Office Action received for Australian Patent Application No. 2021201295, mailed on Jan. 14, 2022, 3 pages.
Office Action received for Australian Patent Application No. 2021201681, mailed on Nov. 11, 2021, 4 pages.
Office Action received for Chinese Patent Application No. 201780053143.0, mailed on Dec. 16, 2021, 19 pages (10 pages of English Translation and 9 pages of Official Copy).
Office Action received for Chinese Patent Application No. 201880000798.6, mailed on Dec. 30, 2021, 10 pages (5 pages of English Translation and 5 pages of Official Copy).
Office Action received for Chinese Patent Application No. 201910315328.5, mailed on Nov. 30, 2021, 21 pages (10 pages of English Translation and 11 pages of Official Copy).
Office Action received for Chinese Patent Application No. 201910691872.X, mailed on Nov. 10, 2021, 16 pages (9 pages of English Translation and 7 pages of Official Copy).
Office Action received for Chinese Patent Application No. 201911219517.9, mailed on Jan. 19, 2022, 11 pages (6 pages of English Translation and 5 pages of Official Copy).
Office Action received for Chinese Patent Application No. 202110820692.4, mailed on Mar. 15, 2022, 18 pages (9 pages of English Translation and 9 pages of Official Copy).
Office Action received for Danish Patent Application No. PA202070624, mailed on Feb. 4, 2022, 4 pages.
Office Action received for Danish Patent Application No. PA202070625, mailed on Feb. 8, 2022, 2 pages.
Office Action received for European Patent Application No. 18703184.4, mailed on Dec. 14, 2021, 4 pages.
Office Action received for European Patent Application No. 19186042.8, mailed on Dec. 2, 2021, 5 pages.
Office Action received for Japanese Patent Application No. 2020-159823, mailed on Dec. 23, 2021, 8 pages (4 pages of English Translation and 4 pages of Official Copy).
Office Action received for Japanese Patent Application No. 2020-159824, mailed on Dec. 17, 2021, 13 pages (7 pages of English Translation and 6 pages of Official Copy).
Office Action received for Japanese Patent Application No. 2020-159825, mailed on Dec. 10, 2021, 4 pages (2 pages of English Translation and 2 pages of Official Copy).
Office Action received for Japanese Patent Application No. 2021-001028, mailed on Jan. 31, 2022, 10 pages (5 pages of English Translation and 5 pages of Official Copy).
Office Action received for Japanese Patent Application No. 2021-092483, mailed on Apr. 1, 2022, 8 pages (4 pages of English Translation and 4 pages of Official Copy).
Office Action received for Korean Patent Application No. 10-2019-7033799, mailed on Nov. 23, 2021, 6 pages (3 pages of English Translation and 3 pages of Official Copy).
Office Action received for Korean Patent Application No. 10-2021-7002582, mailed on Oct. 29, 2021, 6 pages (3 pages of English Translation and 3 pages of Official Copy).
Office Action received for Korean Patent Application No. 10-2022-7004578, mailed on Mar. 22, 2022, 11 pages (5 pages of English Translation and 6 pages of Official Copy).
Record of Oral Hearing received for U.S. Appl. No. 15/714,887, mailed on Feb. 15, 2022, 16 pages.
Theunlockr, "Galaxy Watch Complete Walkthrough: The Best Watch They've Made So Far", Available online at: https://www.youtube.com/watch?v=xiEClfe1SN4, Sep. 11, 2018, 27 pages.
Final Office Action received for U.S. Appl. No. 17/031,765, mailed on Sep. 12, 2022, 37 pages.
Lein et al., "Patternizer", Available online at: https://patternizer.com/, Apr. 2016, 5 pages.
Notice of Allowance received for Japanese Patent Application No. 2019-215503, mailed on Aug. 26, 2022, 3 pages (1 page of English Translation and 2 pages of Official Copy).
Notice of Allowance received for U.S. Appl. No. 16/833,436, mailed on Sep. 8, 2022, 8 pages.
Notice of Allowance received for U.S. Appl. No. 17/220,752, mailed on Sep. 7, 2022, 8 pages.
Final Office Action received for U.S. Appl. No. 17/093,408, mailed on May 18, 2022, 41 pages.
Notice of Acceptance received for Australian Patent Application No. 2021201295, mailed on May 10, 2022, 3 pages.
Notice of Allowance received for U.S. Appl. No. 17/373,163, mailed on May 11, 2022, 8 pages.
Office Action received for Chinese Patent Application No. 201780053143.0, mailed on Mar. 30, 2022, 12 pages (5 pages of English Translation and 7 pages of Official Copy).
Office Action received for European Patent Application No. 20191533.7, mailed on May 12, 2022, 5 pages.
Office Action received for Korean Patent Application No. 10-2022-7003364, mailed on Apr. 22, 2022, 14 pages (6 pages of English Translation and 8 pages of Official Copy).
Applicant-Initiated Interview Summary received for U.S. Appl. No. 16/582,500, mailed on Jul. 1, 2022, 6 pages.
Applicant-Initiated Interview Summary received for U.S. Appl. No. 17/093,408, mailed on Jul. 1, 2022, 3 pages.
Corrected Notice of Allowance received for U.S. Appl. No. 17/373,163, mailed on Jun. 27, 2022, 5 pages.
Non-Final Office Action received for U.S. Appl. No. 17/370,505, mailed on Jul. 6, 2022, 14 pages.
Notice of Allowance received for Korean Patent Application No. 10-2022-7017766, mailed on Jun. 14, 2022, 6 pages (2 pages of English Translation and 4 pages of Official Copy).
Notice of Allowance received for Korean Patent Application No. 10-2022-7017767, mailed on Jun. 14, 2022, 6 pages (2 pages of English Translation and 4 pages of Official Copy).
Office Action received for Australian Patent Application No. 2021202254, mailed on Jun. 20, 2022, 2 pages.
Applicant-Initiated Interview Summary received for U.S. Appl. No. 17/220,752, mailed on Jul. 22, 2022, 3 pages.
Decision on Appeal received for Korean Patent Application No. 10-2019-7033799, mailed on Jul. 19, 2022, 23 pages (3 pages of English Translation and 20 pages of Official Copy).
Intention to Grant received for Danish Patent Application No. PA202070623, mailed on Jul. 20, 2022, 2 pages.
Notice of Allowance received for U.S. Appl. No. 17/373,163, mailed on Jul. 27, 2022, 8 pages.
Non-Final Office Action received for U.S. Appl. No. 16/582,500, mailed on Sep. 23, 2022, 23 pages.
Non-Final Office Action received for U.S. Appl. No. 17/093,408, mailed on Sep. 14, 2022, 46 pages.
Notice of Allowance received for Danish Patent Application No. PA202070623, mailed on Sep. 20, 2022, 2 pages.
Notice of Allowance received for Japanese Patent Application No. 2021-001028, mailed on Sep. 9, 2022, 4 pages (1 page of English Translation and 3 pages of Official Copy).
Office Action received for Australian Patent Application No. 2020269590, mailed on Sep. 16, 2022, 2 pages.
Office Action received for Australian Patent Application No. 2021250944, mailed on Sep. 16, 2022, 3 pages.
Office Action received for Danish Patent Application No. PA202070625, mailed on Sep. 23, 2022, 4 pages.
Office Action received for Korean Patent Application No. 10-2022-7029803, mailed on Sep. 3, 2022, 5 pages (2 pages of English Translation and 3 pages of Official Copy).
Reallusion, "CrazyTalk 8 Tutorial—Customizing Eyes and Teeth", Online available at: https://www.youtube.com/watch?v=A9LgNB1PoMY, Dec. 23, 2015, 21 pages.
Applicant Initiated Interview Summary received for U.S. Appl. No. 17/031,671, mailed on Aug. 2, 2021, 5 pages.
Applicant-Initiated Interview Summary received for U.S. Appl. No. 16/583,706, mailed on Aug. 9, 2021, 5 pages.
Applicant-Initiated Interview Summary received for U.S. Appl. No. 17/031,654, mailed on Feb. 1, 2021, 2 pages.
Applicant-Initiated Interview Summary received for U.S. Appl. No. 17/031,765, mailed on Sep. 22, 2021, 5 pages.

(56) References Cited

OTHER PUBLICATIONS

Corrected Notice of Allowance received for U.S. Appl. No. 16/599,433, mailed on Aug. 13, 2021, 5 pages.
Decision on Appeal received for U.S. Appl. No. 16/259,771, mailed on Aug. 19, 2021, 12 pages.
Decision to Grant received for Japanese Patent Application No. 2019-563408, mailed on Aug. 25, 2021, 3 pages (1 page of English Translation and 2 pages of Official Copy).
Decision to Grant received for Japanese Patent Application No. 2020-193703, mailed on Aug. 10, 2021, 3 pages (1 page of English Translation and 2 pages of Official Copy).
Examiner's Answer to Appeal Brief received for U.S. Appl. No. 15/714,887, mailed on Aug. 27, 2021, 23 pages.
Examiner's Pre-Review Report received for Japanese Patent Application No. 2019-215503, mailed on Aug. 20, 2021, 15 pages (8 pages of English Translation and 7 pages of Official Copy).
Final Office Action received for U.S. Appl. No. 16/833,436, mailed on Sep. 21, 2021, 29 pages.
Final Office Action received for U.S. Appl. No. 17/031,671, mailed on Sep. 7, 2021, 27 pages.
Intention to Grant received for European Patent Application No. 20168021.2, mailed on Sep. 20, 2021, 8 pages.
International Preliminary Report on Patentability received for PCT Patent Application No. PCT/US2020/014176, mailed on Jul. 29, 2021, 9 pages.
International Search Report and Written Opinion received for PCT Patent Application No. PCT/US2021/031212, mailed on Sep. 21, 2021, 21 pages.
Invitation to Pay Additional Fees received for PCT Patent Application No. PCT/US2021/031212, mailed on Jul. 28, 2021, 19 pages.
Non-Final Office Action received for U.S. Appl. No. 16/582,500, mailed on Sep. 17, 2021, 18 pages.
Non-Final Office Action received for U.S. Appl. No. 17/031,654, mailed on Nov. 19, 2020, 12 pages.
Non-Final Office Action received for U.S. Appl. No. 17/031,671, mailed on Apr. 30, 2021, 27 pages.
Non-Final Office Action received for U.S. Appl. No. 17/031,765, mailed on Jun. 28, 2021, 32 pages.
Non-Final Office Action received for U.S. Appl. No. 17/091,460, mailed on Sep. 10, 2021, 10 pages.
Notice of Acceptance received for Australian Patent Application No. 2018270420, mailed on Jul. 21, 2021, 3 pages.
Notice of Acceptance received for Australian Patent Application No. 2020201721, mailed on Jul. 6, 2021, 3 pages.
Notice of Allowance received for Korean Patent Application No. 10-2019-7033634, mailed on Aug. 20, 2021, 4 pages (1 page of English Translation and 3 pages of Official Copy).
Notice of Allowance received for Korean Patent Application No. 10-2021-7019525, mailed on Jul. 13, 2021, 5 pages (1 page of English Translation and 4 pages of Official Copy).
Notice of Allowance received for U.S. Appl. No. 16/599,433, mailed on Oct. 4, 2021, 13 pages.
Notice of Allowance received for U.S. Appl. No. 17/031,654, mailed on Feb. 10, 2021, 9 pages.
Notice of Allowance received for U.S. Appl. No. 17/031,654, mailed on May 27, 2021, 8 pages.
Office Action received for Australian Patent Application No. 2020239749, mailed on Jul. 16, 2021, 5 pages.
Office Action received for Chinese Patent Application No. 201780053143.0, mailed on Sep. 3, 2021, 24 pages (15 pages of English Translation and 9 pages of Official Copy).
Office Action received for Chinese Patent Application No. 201880000798.6, mailed on Jul. 2, 2021, 15 pages (8 pages of English Translation and 7 pages of Official Copy).
Office Action received for Chinese Patent Application No. 201910691865.X, mailed on Aug. 4, 2021, 10 pages (6 pages of English Translation and 4 pages of Official Copy).
Office Action received for Chinese Patent Application No. 201910691872.X, mailed on Jun. 23, 2021, 10 pages (5 pages of English Translation and 5 pages of Official Copy).
Office Action received for Chinese Patent Application No. 202010330318.1, mailed on Jul. 13, 2021, 12 pages (6 pages of English Translation and 6 pages of Official Copy).
Office Action received for Danish Patent Application No. PA201970531, mailed on Aug. 13, 2021, 3 pages.
Office Action received for Danish Patent Application No. PA202070623, mailed on Aug. 24, 2021, 3 pages.
Office Action received for Danish Patent Application No. PA202070624, mailed on Jun. 16, 2021, 5 pages.
Office Action received for Danish Patent Application No. PA202070625, mailed on Jun. 16, 2021, 3 pages.
Office Action received for Indian Patent Application No. 201814036472, mailed on Jul. 8, 2021, 8 pages.
Office Action received for Indian Patent Application No. 201917046737, mailed on Aug. 9, 2021, 8 pages.
Office Action received for Japanese Patent Application No. 2018-182607, mailed on Sep. 8, 2021, 7 pages (4 pages of English Translation and 3 pages of Official Copy).
Office Action received for Korean Patent Application No. 10-2021-7015473, mailed on Aug. 25, 2021, 5 pages (2 page of English Translation and 3 pages of Official Copy).
Record of Oral Hearing received for U.S. Appl. No. 16/259,771, mailed on Aug. 4, 2021, 15 pages.
Result of Consultation received for European Patent Application No. 19211833.9, mailed on Jul. 15, 2021, 3 pages.
Search Report and Opinion received for Danish Patent Application No. PA202070623, mailed on Dec. 21, 2020, 9 pages.
Search Report and Opinion received for Danish Patent Application No. PA202070624, mailed on Dec. 10, 2020, 10 pages.
Search Report and Opinion received for Danish Patent Application No. PA202070625, mailed on Dec. 17, 2020, 9 pages.
Space-O Digicom Private Limited, "Tongue Piercing Booth—The Barbell Tongue Rings & Oral Piercings App", May 30, 2017, 5 pages.
Final Office Action received for U.S. Appl. No. 16/259,771, mailed on Aug. 12, 2022, 25 pages.
Notice of Allowance received for Chinese Patent Application No. 201910315328.5, mailed on Aug. 24, 2022, 4 pages (1 page of English Translation and 3 pages of Official Copy).
Office Action received for Japanese Patent Application No. 2020-159823, mailed on Aug. 15, 2022, 6 pages (3 pages of English Translation and 3 pages of Official Copy).
Applicant-Initiated Interview Summary received for U.S. Appl. No. 17/031,765, mailed on May 23, 2022, 5 pages.
Extended European Search Report received for European Patent Application No. 22154034.7, mailed on May 11, 2022, 14 pages.
Notice of Acceptance received for Australian Patent Application No. 2020239749, mailed on May 27, 2022, 3 pages.
Notice of Allowance received for Korean Patent Application No. 10-2022-7016421, mailed on May 25, 2022, 6 pages (2 pages of English Translation and 4 pages of Official Copy).
Notice of Allowance received for U.S. Appl. No. 17/091,460, mailed on May 23, 2022, 9 pages.
Office Action received for Danish Patent Application No. PA202070623, mailed on May 23, 2022, 3 pages.
Summons to Attend Oral Proceedings received for European Patent Application No. 19181242.9, mailed on May 19, 2022, 7 pages.
Corrected Notice of Allowance received for U.S. Appl. No. 17/373,163, mailed on Jul. 15, 2022, 5 pages.
Notice of Allowance received for Chinese Patent Application No. 201911219517.9, mailed on Jul. 4, 2022, 6 pages (3 pages of English Translation and 3 pages of Official Copy).
Notice of Allowance received for U.S. Appl. No. 16/833,436, mailed on Jul. 7, 2022, 8 pages.
Office Action received for European Patent Application No. 18703184.4, mailed on Jul. 13, 2022, 4 pages.
Office Action received for Japanese Patent Application No. 2019-563560, mailed on Jul. 4, 2022, 34 pages (15 pages of English Translation and 19 pages of Official Copy).
Supplemental Notice of Allowance received for U.S. Appl. No. 16/833,436, mailed on Jul. 14, 2022, 2 pages.
Applicant-Initiated Interview Summary received for U.S. Appl. No. 16/582,500, mailed on Oct. 28, 2022, 6 pages.

(56) References Cited

OTHER PUBLICATIONS

Corrected Notice of Allowance received for U.S. Appl. No. 17/525,664, mailed on Nov. 3, 2022, 2 pages.
Notice of Allowance received for Japanese Patent Application No. 2021-566102, mailed on Oct. 28, 2022, 5 pages (1 page of English Translation and 4 pages of Official Copy).
Notice of Allowance received for U.S. Appl. No. 17/525,664, mailed on Oct. 27, 2022, 11 pages.
Office Action received for Japanese Patent Application No. 2021-153573, mailed on Oct. 17, 2022, 4 pages (2 pages of English Translation and 2 pages of Official Copy).
Advisory Action received for U.S. Appl. No. 17/031,765, mailed on Dec. 12, 2022, 7 pages.
Applicant-Initiated Interview Summary received for U.S. Appl. No. 17/031,671, mailed on Dec. 9, 2022, 5 pages.
Notice of Acceptance received for Australian Patent Application No. 2021254574, mailed on Dec. 14, 2022, 3 pages.
Notice of Allowance received for Korean Patent Application No. 10-2020-0123887, mailed on Nov. 28, 2022, 7 pages (2 pages of English Translation and 5 pages of Official Copy).
Office Action received for Korean Patent Application No. 10-2022-7009437, mailed on Nov. 30, 2022, 6 pages (2 pages of English Translation and 4 pages of Official Copy).
International Preliminary Report on Patentability received for PCT Patent Application No. PCT/US2021/031096, mailed on Nov. 24, 2022, 11 pages.
International Preliminary Report on Patentability received for PCT Patent Application No. PCT/US2021/031212, mailed on Nov. 24, 2022, 16 pages.
Notice of Allowance received for Chinese Patent Application No. 202110820692.4, mailed on Nov. 16, 2022, 2 pages (1 page of English Translation and 1 page of Official Copy).
Notice of Allowance received for Korean Patent Application No. 10-2020-0123852, mailed on Nov. 28, 2022, 7 pages (2 pages of English Translation and 5 pages of Official Copy).
Office Action received for Japanese Patent Application No. 2021-173713, mailed on Nov. 16, 2022, 9 pages (5 pages of English Translation and 4 pages of Official Copy).
Final Office Action received for U.S. Appl. No. 16/582,500, mailed on Feb. 3, 2023, 24 pages.
IGN, "Create a Sim", The Sims 4 Wiki Guide, Available Online at: https://www.ign.conn/wikis/the-sinns-4/Create_a_Sinn, Jun. 27, 2018, 17 pages.
Notice of Allowance received for U.S. Appl. No. 17/370,505, mailed on Feb. 2, 2023, 8 pages.
Notice of Allowance received for U.S. Appl. No. 17/525,664, mailed on Feb. 14, 2023, 10 pages.
Office Action received for Indian Patent Application No. 202215026505, mailed on Feb. 8, 2023, 9 pages.
Office Action received for Japanese Patent Application No. 2021-168243, mailed on Feb. 6, 2023, 8 pages (4 pages of English Translation and 4 pages of Official Copy).
Office Action received for Korean Patent Application No. 10-2022-7004578, mailed on Jan. 27, 2023, 8 pages (4 pages of English Translation and 4 pages of Official Copy).
Corrected Notice of Allowance received for U.S. Appl. No. 17/370,505, mailed on Mar. 8, 2023, 5 pages.
Corrected Notice of Allowance received for U.S. Appl. No. 17/525,664, mailed on Feb. 23, 2023, 2 pages.
Final Office Action received for U.S. Appl. No. 16/583,706, mailed on Feb. 17, 2023, 38 pages.
Final Office Action received for U.S. Appl. No. 17/093,408, mailed on Mar. 2, 2023, 51 pages.
Intention to Grant received for European Patent Application No. 21166287.9, mailed on Feb. 23, 2023, 9 pages.
Notice of Allowance received for Japanese Patent Application No. 2021-153573, mailed on Feb. 17, 2023, 4 pages (1 page of English Translation and 3 pages of Official Copy).
Notice of Allowance received for Korean Patent Application No. 10-2020-0123857, mailed on Feb. 21, 2023, 6 pages (1 page of English Translation and 5 pages of Official Copy).
Notice of Allowance received for U.S. Appl. No. 17/941,962, mailed on Mar. 10, 2023, 11 pages.
Office Action received for Australian Patent Application No. 2022200965, mailed on Feb. 14, 2023, 4 pages.
Office Action received for Indian Patent Application No. 202015008746, mailed on Mar. 6, 2023, 7 pages.
Pre-Appeal Review Report received for Japanese Patent Application No. 2020-159823, mailed on Jan. 12, 2023, 4 pages (2 pages of English Translation and 2 pages of Official Copy).
Applicant-Initiated Interview Summary received for U.S. Appl. No. 17/031,765, mailed on Nov. 16, 2022, 5 pages.
Final Office Action received for U.S. Appl. No. 17/031,671, mailed on Nov. 15, 2022, 27 pages.
Intention to Grant received for European Patent Application No. 19181242.9, mailed on Nov. 17, 2022, 9 pages.
Notice of Acceptance received for Australian Patent Application No. 2020269590, mailed on Nov. 8, 2022, 3 pages.
Notice of Acceptance received for Australian Patent Application No. 2021202254, mailed on Nov. 16, 2022, 3 pages.
Notice of Acceptance received for Australian Patent Application No. 2021250944, mailed on Nov. 14, 2022, 3 pages.
Office Action received for Australian Patent Application No. 2022203285, mailed on Jan. 18, 2023, 3 pages.
Office Action received for Chinese Patent Application No. 201780053143.0, mailed on Nov. 30, 2022, 13 pages (6 pages of English Translation and 7 pages of Official Copy).
Office Action received for Japanese Patent Application No. 2019-563560, mailed on Jan. 20, 2023, 56 pages (25 pages of English Translation and 31 pages of Official Copy).
Applicant-Initiated Interview Summary received for U.S. Appl. No. 17/093,408, mailed on Jan. 5, 2023, 3 pages.
Office Action received for Chinese Patent Application No. 201780058426.4, mailed on Dec. 2, 2022, 11 pages (5 pages of English Translation and 6 pages of Official Copy).
Office Action received for Korean Patent Application No. 10-2020-0123857, mailed on Dec. 16, 2022, 8 pages (4 pages of English Translation and 4 pages of Official Copy).
Office Action received for Korean Patent Application No. 10-2022-7003364, mailed on Dec. 26, 2022, 8 pages (3 pages of English Translation and 5 pages of Official Copy).
Office Action received for European Patent Application No. 20704768.9, mailed on Mar. 24, 2023, 8 pages.
Office Action received for Chinese Patent Application No. 202080009772.5, mailed on Feb. 15, 2025, 24 pages (13 pages of English Translation and 11 pages of Official Copy).
Summons to Attend Oral Proceedings received for European Patent Application No. 20704768.9, mailed on Mar. 17, 2025, 9 pages.
Notice of Allowance received for Korean Patent Application No. 10-2023-7042778, mailed on Jun. 26, 2025, 7 pages (2 pages of English Translation and 5 pages of Official Copy).
Notice of Allowance received for Chinese Patent Application No. 202411117608.2, mailed on Jul. 1, 2025, 4 pages (1 page of English Translation and 3 pages of Official Copy).
Notice of Allowance received for Japanese Patent Application No. 2022-194369, mailed on Jul. 7, 2025, 3 pages (1 page of English Translation and 2 pages of Official Copy).
Corrected Notice of Allowance received for U.S. Appl. No. 18/737,710, mailed on Jul. 1, 2025, 2 pages.
Final Office Action received for U.S. Appl. No. 18/671,070, mailed on Jul. 1, 2025, 15 pages.
Non-Final Office Action received for U.S. Appl. No. 18/893,427, mailed on Jul. 7, 2025, 13 pages.
Notice of Allowance received for Korean Patent Application No. 10-2023-7037034, mailed on May 28, 2025, 7 pages (2 pages of English Translation and 5 pages of Official Copy).
Notice of Allowance received for U.S. Appl. No. 18/737,710, mailed on Jun. 20, 2025, 8 pages.
Advisory Action received for U.S. Appl. No. 17/031,765, mailed on Nov. 13, 2023, 5 pages.

(56) References Cited

OTHER PUBLICATIONS

Advisory Action received for U.S. Appl. No. 17/093,408, mailed on Jun. 5, 2023, 4 pages.
Applicant Initiated Interview Summary received for U.S. Appl. No. 17/725,311, mailed on Jun. 30, 2023, 5 pages.
Applicant-Initiated Interview Summary received for U.S. Appl. No. 16/582,500, mailed on Apr. 14, 2023, 4 pages.
Applicant-Initiated Interview Summary received for U.S. Appl. No. 16/582,500, mailed on Aug. 1, 2023, 2 pages.
Applicant-Initiated Interview Summary received for U.S. Appl. No. 16/582,500, mailed on Feb. 20, 2024, 3 pages.
Applicant-Initiated Interview Summary received for U.S. Appl. No. 16/582,500, mailed on May 4, 2023, 3 pages.
Applicant-Initiated Interview Summary received for U.S. Appl. No. 17/031,671, mailed on May 23, 2023, 3 pages.
Applicant-Initiated Interview Summary received for U.S. Appl. No. 17/031,765, mailed on Apr. 17, 2023, 4 pages.
Applicant-Initiated Interview Summary received for U.S. Appl. No. 17/031,765, mailed on May 3, 2023, 6 pages.
Applicant-Initiated Interview Summary received for U.S. Appl. No. 17/031,765, mailed on Oct. 31, 2023, 5 pages.
Applicant-Initiated Interview Summary received for U.S. Appl. No. 17/093,408, mailed on May 10, 2023, 3 pages.
Applicant-Initiated Interview Summary received for U.S. Appl. No. 17/093,408, mailed on May 25, 2023, 2 pages.
Applicant-Initiated Interview Summary received for U.S. Appl. No. 17/725,311, mailed on Jan. 16, 2024, 6 pages.
Applicant-Initiated Interview Summary received for U.S. Appl. No. 17/941,962, mailed on May 30, 2023, 2 pages.
Applicant-Initiated Interview Summary received for U.S. Appl. No. 18/138,634, mailed on Feb. 9, 2024, 4 pages.
Applicant-Initiated Interview Summary received for U.S. Appl. No. 18/197,242, mailed on Feb. 22, 2024, 2 pages.
Applicant-Initiated Interview Summary received for U.S. Appl. No. 18/241,802, mailed on Jul. 17, 2024, 6 pages.
Applicant-Initiated Interview Summary received for U.S. Appl. No. 18/375,309, mailed on Feb. 28, 2025, 4 pages.
Applicant-Initiated Interview Summary received for U.S. Appl. No. 18/375,309, mailed on Sep. 27, 2024, 2 pages.
Applicant-Initiated Interview Summary received for U.S. Appl. No. 18/671,070, mailed on Jun. 11, 2025, 4 pages.
Applicant-Initiated Interview Summary received for U.S. Appl. No. 18/737,710, mailed on May 22, 2025, 3 pages.
Board Decision received for Chinese Patent Application No. 201911199054.4, mailed on Sep. 25, 2024, 40 pages (17 pages of English Translation and 23 pages of Official Copy).
Board Opinion received for Chinese Patent Application No. 201911199054.4, mailed on May 10, 2024, 24 pages (13 pages of English Translation and 11 pages of Official Copy).
Brief Communication Regarding Oral Proceedings received for European Patent Application No. 20191533.7, mailed on Dec. 12, 2024, 1 page.
Brief Communication Regarding Oral Proceedings received for European Patent Application No. 20191533.7, mailed on Jul. 17, 2024, 1 page.
Chun et al., "3D face pose estimation by a robust real time tracking of facial features", Multimedia Tools and Applications, Kluwer Academic Publishers, Boston, US vol. 75, No. 23, Available online at 10.1007/S11042-014-2356-9, Nov. 18, 2014, pp. 15693-15708.
Chun et al., "Real-Time Face Pose Tracking and Facial Expression Synthesizing for the Animation of 3D Avatar", Technologies For E-Learning and Digital Entertainment, Springer Berlin Heidelberg, Jun. 11, 2007, pp. 191-201.
Communication for Board of Appeal received for European Patent Application No. 19204230.7, mailed on Feb. 16, 2024, 1 page.
Communication for Board of Appeal received for European Patent Application No. 19204230.7, mailed on Jun. 18, 2024, 15 pages.
Communication for Board of Appeal received for European Patent Application No. 19724959.2, mailed on Sep. 27, 2023, 14 pages.
Corrected Notice of Allowance received for U.S. Appl. No. 16/583,706, mailed on Aug. 20, 2024, 2 pages.
Corrected Notice of Allowance received for U.S. Appl. No. 16/583,706, mailed on Dec. 12, 2024, 2 pages.
Corrected Notice of Allowance received for U.S. Appl. No. 16/583,706, mailed on Nov. 5, 2024, 2 pages.
Corrected Notice of Allowance received for U.S. Appl. No. 16/583,706, mailed on Oct. 24, 2024, 5 pages.
Corrected Notice of Allowance received for U.S. Appl. No. 17/031,671, mailed on Mar. 19, 2025, 3 pages.
Corrected Notice of Allowance received for U.S. Appl. No. 17/093,408, mailed on Sep. 13, 2023, 2 pages.
Corrected Notice of Allowance received for U.S. Appl. No. 17/093,408, mailed on Sep. 20, 2023, 3 pages.
Corrected Notice of Allowance received for U.S. Appl. No. 17/370,505, mailed on Apr. 4, 2023, 5 pages.
Corrected Notice of Allowance received for U.S. Appl. No. 17/370,505, mailed on Apr. 28, 2023, 5 pages.
Corrected Notice of Allowance received for U.S. Appl. No. 17/525,664, mailed on Apr. 11, 2023, 2 pages.
Corrected Notice of Allowance received for U.S. Appl. No. 17/525,664, mailed on May 17, 2023, 2 pages.
Corrected Notice of Allowance received for U.S. Appl. No. 17/725,311, mailed on Jul. 31, 2024, 2 pages.
Corrected Notice of Allowance received for U.S. Appl. No. 17/725,311, mailed on Mar. 28, 2024, 2 pages.
Corrected Notice of Allowance received for U.S. Appl. No. 17/941,962, mailed on Apr. 14, 2023, 6 pages.
Corrected Notice of Allowance received for U.S. Appl. No. 17/941,962, mailed on Aug. 3, 2023, 2 pages.
Corrected Notice of Allowance received for U.S. Appl. No. 18/071,434, mailed on Apr. 24, 2024, 2 pages.
Corrected Notice of Allowance received for U.S. Appl. No. 18/071,434, mailed on Mar. 21, 2024, 2 pages.
Corrected Notice of Allowance received for U.S. Appl. No. 18/071,434, mailed on May 29, 2024, 2 pages.
Corrected Notice of Allowance received for U.S. Appl. No. 18/138,634, mailed on May 2, 2024, 5 pages.
Corrected Notice of Allowance received for U.S. Appl. No. 18/138,634, mailed on May 20, 2024, 5 pages.
Corrected Notice of Allowance received for U.S. Appl. No. 18/197,242, mailed on Apr. 4, 2024, 2 pages.
Corrected Notice of Allowance received for U.S. Appl. No. 18/197,242, mailed on Jul. 22, 2024, 2 pages.
Corrected Notice of Allowance received for U.S. Appl. No. 18/197,242, mailed on Mar. 18, 2024, 2 pages.
Corrected Notice of Allowance received for U.S. Appl. No. 18/197,242, mailed on Mar. 27, 2024, 2 pages.
Corrected Notice of Allowance received for U.S. Appl. No. 18/197,242, mailed on May 15, 2024, 2 pages.
Corrected Notice of Allowance received for U.S. Appl. No. 18/197,242, mailed on Nov. 6, 2024, 2 pages.
Corrected Notice of Allowance received for U.S. Appl. No. 18/220,715, mailed on Apr. 8, 2024, 2 pages.
Corrected Notice of Allowance received for U.S. Appl. No. 18/220,715, mailed on Apr. 25, 2024, 2 pages.
Corrected Notice of Allowance received for U.S. Appl. No. 18/220,715, mailed on Jul. 23, 2024, 2 pages.
Corrected Notice of Allowance received for U.S. Appl. No. 18/220,715, mailed on Jun. 24, 2024, 2 pages.
Corrected Notice of Allowance received for U.S. Appl. No. 18/230,465, mailed on Nov. 5, 2024, 2 pages.
Corrected Notice of Allowance received for U.S. Appl. No. 18/230,465, mailed on Oct. 9, 2024, 2 pages.
Corrected Notice of Allowance received for U.S. Appl. No. 18/230,465, mailed on Oct. 17, 2024, 2 pages.
Corrected Notice of Allowance received for U.S. Appl. No. 18/230,465, mailed on Oct. 24, 2024, 2 pages.
Corrected Notice of Allowance received for U.S. Appl. No. 18/241,802, mailed on Mar. 28, 2025, 9 pages.
Corrected Notice of Allowance received for U.S. Appl. No. 18/241,802, mailed on Oct. 22, 2024, 9 pages.

(56) References Cited

OTHER PUBLICATIONS

Corrected Notice of Allowance received for U.S. Appl. No. 18/378,470, mailed on Jan. 23, 2025, 2 pages.
Corrected Notice of Allowance received for U.S. Appl. No. 18/378,470, mailed on May 29, 2025, 2 pages.
Corrected Notice of Allowance received for U.S. Appl. No. 18/677,585, mailed on Apr. 7, 2025, 5 pages.
Corrected Notice of Allowance received for U.S. Appl. No. 18/677,585, mailed on Mar. 31, 2025, 5 pages.
Corrected Notice of Allowance received for U.S. Appl. No. 18/677,585, mailed on May 7, 2025, 5 pages.
Decision on Appeal received for Japanese Patent Application No. 2021-173713, mailed on Nov. 5, 2024, 8 pages (1 page of English Translation and 7 pages of Official Copy).
Decision on Appeal received for Korean Patent Application No. 10-2022-7004578, mailed on Oct. 31, 2023, 26 pages (5 pages of English Translation and 21 pages of Official Copy).
Decision on Appeal received for U.S. Appl. No. 16/259,771, mailed on Feb. 8, 2024, 18 pages.
Decision on Appeal received for U.S. Appl. No. 16/583,706, mailed on May 9, 2024, 13 pages.
Decision on Appeal received for U.S. Appl. No. 17/031,671, mailed on Nov. 1, 2024, 24 pages.
Decision to Grant received for European Patent Application No. 18703184.4, mailed on Nov. 21, 2024, 4 pages.
Decision to Grant received for European Patent Application No. 18732519.6, mailed on Mar. 28, 2024, 4 pages.
Decision to Grant received for European Patent Application No. 19181242.9, mailed on Mar. 23, 2023, 3 pages.
Decision to Grant received for European Patent Application No. 20722020.3, mailed on Mar. 21, 2024, 4 pages.
Decision to Grant received for European Patent Application No. 21728746.5, mailed on Feb. 6, 2025, 4 pages.
Decision to Grant received for European Patent Application No. 23198442.8, mailed on Jul. 11, 2024, 4 pages.
Decision to Grant received for Japanese Patent Application No. 2021-166686, mailed on Apr. 20, 2023, 2 pages (1 page of English Translation and 1 page of Official Copy).
Decision to Grant received for Japanese Patent Application No. 2023-083816, mailed on Aug. 9, 2023, 2 pages (1 page of English Translation and 1 page of Official Copy).
Decision to Grant received for Japanese Patent Application No. 2023-146062, mailed on Nov. 13, 2023, 2 pages (1 page of English Translation and 1 page of Official Copy).
Decision to Grant received for Japanese Patent Application No. 2023-169627, mailed on Nov. 5, 2024, 3 pages (1 page of English Translation and 2 pages of Official Copy).
Decision to Refuse received for European Patent Application No. 17853657.9, mailed on Feb. 2, 2024, 17 pages.
Decision to Refuse received for European Patent Application No. 19212057.4, mailed on Feb. 5, 2024, 18 pages.
Decision to Refuse received for European Patent Application No. 20191533.7, mailed on Jan. 13, 2025, 10 pages.
Decision to Refuse received for Japanese Patent Application No. 2021-168243, mailed on Aug. 14, 2023, 7 pages (3 pages of English Translation and 4 pages of Official Copy).
Droid Life, "20+ Galaxy S9, S9+ Tips and Tricks", Available Online at: https://www.youtube.com/watch?v=sso0mYTfV6w, Mar. 22, 2018, pp. 1-33.
Examiner-Initiated Interview Summary received for U.S. Appl. No. 17/031,671, mailed on Jan. 6, 2025, 2 pages.
Examiner's Answer to Appeal Brief received for U.S. Appl. No. 16/259,771, mailed on May 26, 2023, 23 pages.
Examiner's Answer to Appeal Brief received for U.S. Appl. No. 16/583,706, mailed on Aug. 1, 2023, 29 pages.
Examiner's Answer to Appeal Brief received for U.S. Appl. No. 17/031,671, mailed on Dec. 8, 2023, 16 pages.
Extended European Search Report received for European Patent Application No. 23168077.8, mailed on Jul. 11, 2023, 12 pages.
Extended European Search Report received for European Patent Application No. 23198442.8, mailed on Dec. 12, 2023, 5 pages.
Extended European Search Report received for European Patent Application No. 24165004.3, mailed on Jul. 5, 2024, 8 pages.
European Search Report received for European Patent Application No. 24183038.9, mailed on Oct. 4, 2024, 9 pages.
European Search Report received for European Patent Application No. 24183089.2, mailed on Sep. 30, 2024, 7 pages.
European Search Report received for European Patent Application No. 24215123.1, mailed on Apr. 8, 2025, 9 pages.
Final Office Action received for U.S. Appl. No. 17/031,765, mailed on Sep. 1, 2023, 37 pages.
Final Office Action received for U.S. Appl. No. 17/725,311, mailed on Oct. 13, 2023, 66 pages.
Final Office Action received for U.S. Appl. No. 18/375,309, mailed on Dec. 4, 2024, 18 pages.
Gauging Gadgets, "How to Customize Watch Faces—Garmin Venu Tutorial", Online Available at: https://www.youtube.com/watch?v=dxajKKulaP0, Jan. 7, 2020, 14 pages.
"How to create a character for beginners in FF14 and recommended races", Available online at: https://ff14startup.net/character-making-99/, Sep. 20, 2016, 16 pages (Official Copy only). {See Communication under Rule 37 CFR § 1.98(a) (3)}.
Intention To Grant received for European Patent Application No. 18703184.4, mailed on Jul. 24, 2024, 12 pages.
Intention To Grant received for European Patent Application No. 18732519.6, mailed on Dec. 15, 2023, 10 pages.
Intention to Grant received for European Patent Application No. 20722020.3, mailed on Jun. 7, 2023, 10 pages.
Intention to Grant received for European Patent Application No. 20722020.3, mailed on Nov. 22, 2023, 10 pages.
Intention to Grant received for European Patent Application No. 21728746.5, mailed on Dec. 6, 2024, 8 pages.
Intention to Grant received for European Patent Application No. 21728746.5, mailed on Jul. 12, 2024, 10 pages.
Intention to Grant received for European Patent Application No. 22154034.7, mailed on Feb. 26, 2025, 9 pages.
Intention to Grant received for European Patent Application No. 22154034.7, mailed on Jun. 12, 2025, 8 pages.
Intention to Grant received for European Patent Application No. 23168077.8, mailed on Apr. 7, 2025, 9 pages.
Intention to Grant received for European Patent Application No. 23198442.8, mailed on Mar. 18, 2024, 9 pages.
Intention to Grant received for European Patent Application No. 24165004.3, mailed on Jun. 5, 2025, 9 pages.
International Preliminary Report on Patentability received for PCT Patent Application No. PCT/US2023/031979, mailed on Mar. 20, 2025, 11 pages.
International Search Report and Written Opinion received for PCT Patent Application No. PCT/US2023/031979, mailed on Mar. 12, 2024, 16 pages.
Invitation to Pay Additional Fees and Partial International Search Report received for PCT Patent Application No. PCT/US2023/031979, mailed on Jan. 19, 2024, 9 pages.
Invitation to Pay Search Fees received for European Patent Application No. 21727979.3, mailed on Jul. 10, 2024, 4 pages.
Itumbledsea, "iOS Tutorials: How to add an avatar to a contact", available online at: https://www.sspai.com/post/26600, Sep. 7, 2014, 14 pages (7 pages of English Translation and 7 pages of Official Copy).
Kafai et al., "Your Second Selves: Player-Designed Avatars", Games and Culture, May 23, 2010, 21 pages.
Maruberi, "[App Introduction] #3 Luxambra (Selecting the game to play with Hotman next after Maruberi)", Available online at: https://www.youtube.com/watch?v=e4ukNZ-1OrY, Jun. 22, 2014, 2 pages (Official Copy only). {See Communication under Rule 37 CFR § 1.98(a) (3)}.
Minutes of the Oral Proceedings received for European Patent Application No. 19212057.4, mailed on Jan. 31, 2024, 6 pages.
Minutes of the Oral Proceedings received for European Patent Application No. 20191533.7, mailed on Jan. 9, 2025, 6 pages.
Non-Final Office Action received for U.S. Appl. No. 16/582,500, mailed on Oct. 13, 2023, 25 pages.

(56) References Cited

OTHER PUBLICATIONS

Non-Final Office Action received for U.S. Appl. No. 17/031,671, mailed on Mar. 17, 2023, 34 pages.
Non-Final Office Action received for U.S. Appl. No. 17/031,765, mailed on Mar. 28, 2023, 31 pages.
Non-Final Office Action received for U.S. Appl. No. 17/725,311, mailed on May 10, 2023, 54 pages.
Non-Final Office Action received for U.S. Appl. No. 18/071,434, mailed on Sep. 22, 2023, 27 pages.
Non-Final Office Action received for U.S. Appl. No. 18/138,634, mailed on Jan. 16, 2024, 14 pages.
Non-Final Office Action received for U.S. Appl. No. 18/197,242, mailed on Dec. 7, 2023, 24 pages.
Non-Final Office Action received for U.S. Appl. No. 18/230,465, mailed on Aug. 15, 2024, 37 pages.
Non-Final Office Action received for U.S. Appl. No. 18/241,802, mailed on May 17, 2024, 57 pages.
Non-Final Office Action received for U.S. Appl. No. 18/375,309, mailed on Apr. 23, 2025, 21 pages.
Non-Final Office Action received for U.S. Appl. No. 18/375,309, mailed on Jul. 29, 2024, 19 pages.
Non-Final Office Action received for U.S. Appl. No. 18/407,241, mailed on Oct. 1, 2024, 9 pages.
Non-Final Office Action received for U.S. Appl. No. 18/671,070, mailed on Mar. 11, 2025, 14 pages.
Non-Final Office Action received for U.S. Appl. No. 18/677,585, mailed on Dec. 27, 2024, 14 pages.
Non-Final Office Action received for U.S. Appl. No. 18/737,710, mailed on Mar. 14, 2025, 39 pages.
Notice of Acceptance received for Australian Patent Application No. 2022200965, mailed on May 11, 2023, 3 pages.
Notice of Acceptance received for Australian Patent Application No. 2022203285, mailed on Jun. 16, 2023, 3 pages.
Notice of Acceptance received for Australian Patent Application No. 20232000039, mailed on Aug. 31, 2023, 3 pages.
Notice of Acceptance received for Australian Patent Application No. 2023200797, mailed on May 21, 2024, 3 pages.
Notice of Acceptance received for Australian Patent Application No. 2023200867, mailed on Sep. 13, 2023, 3 pages.
Notice of Acceptance received for Australian Patent Application No. 2023201250, mailed on Nov. 21, 2023, 3 pages.
Notice of Acceptance received for Australian Patent Application No. 2023219926, mailed on Apr. 7, 2025, 3 pages.
Notice of Acceptance received for Australian Patent Application No. 2023233200, mailed on Oct. 17, 2023, 3 pages.
Notice of Acceptance received for Australian Patent Application No. 2023282284, mailed Jul. 18, 2024, 3 pages.
Notice of Acceptance received for Australian Patent Application No. 2024200460, mailed Mar. 20, 2025, 3 pages.
Notice of Acceptance received for Australian Patent Application No. 2024201007, mailed Apr. 7, 2025, 3 pages.
Notice of Allowance received for Chinese Patent Application No. 201780058426.4, mailed on Jun. 30, 2023, 2 pages (1 page of English Translation and 1 page of Official Copy).
Notice of Allowance received for Chinese Patent Application No. 201880004632.1, mailed on Mar. 20, 2025, 4 pages (1 page of English Translation and 3 pages of Official Copy).
Notice of Allowance received for Chinese Patent Application No. 202110530629.7, mailed on Oct. 28, 2024, 2 pages (1 page of English Translation and 1 page of Official Copy).
Notice of Allowance received for Chinese Patent Application No. 202110912648.6, mailed on May 30, 2025, 2 pages (1 page of English Translation and 1 page of Official Copy).
Notice of Allowance received for Chinese Patent Application No. 202310124087.2, mailed on Jan. 25, 2024, 4 pages (1 page of English Translation and 3 pages of Official Copy).
Notice of Allowance received for Japanese Patent Application No. 2020-159823, mailed on Jul. 24, 2023, 23 pages (1 page of English Translation and 22 pages of Official Copy).
Notice of Allowance received for Japanese Patent Application No. 2021-168243, mailed on Apr. 30, 2024, 4 pages (1 page of English Translation and 3 pages of Official Copy).
Notice of Allowance received for Japanese Patent Application No. 2022-170806, mailed on Aug. 9, 2024, 4 pages (1 page of English Translation and 3 pages of Official Copy).
Notice of Allowance received for Japanese Patent Application No. 2022-186563, mailed on Mar. 1, 2024, 4 pages (1 page of English Translation and 3 pages of Official Copy).
Notice of Allowance received for Japanese Patent Application No. 2023-043407, mailed on Jul. 26, 2024, 4 pages (1 page of English Translation and 3 pages of Official Copy).
Notice of Allowance received for Japanese Patent Application No. 2023-211453, mailed on Mar. 14, 2025, 4 pages (1 page of English Translation and 3 pages of Official Copy).
Notice of Allowance received for Japanese Patent Application No. 2024-144411, mailed on Jan. 6, 2025, 4 pages (1 page of English Translation and 3 pages of Official Copy).
Notice of Allowance received for Korean Patent Application No. 10-2020-0123852, mailed on Mar. 9, 2023, 7 pages (2 page of English Translation and 5 pages of Official Copy).
Notice of Allowance received for Korean Patent Application No. 10-2021-7036424, mailed on Sep. 11, 2023, 7 pages (2 page of English Translation and 5 pages of Official Copy).
Notice of Allowance received for Korean Patent Application No. 10-2022-7003364, mailed on Jul. 28, 2023, 7 pages (2 page of English Translation and 5 pages of Official Copy).
Notice of Allowance received for Korean Patent Application No. 10-2022-7009437, mailed on Jun. 22, 2023, 7 pages (2 page of English Translation and 5 pages of Official Copy).
Notice of Allowance received for Korean Patent Application No. 10-2022-7029729, mailed on Nov. 9, 2023, 8 pages (2 pages of English Translation and 6 pages of Official Copy).
Notice of Allowance received for Korean Patent Application No. 10-2022-7029803, mailed on Mar. 23, 2023, 8 pages (2 pages of English Translation and 6 pages of Official Copy).
Notice of Allowance received for Korean Patent Application No. 10-2023-0064928, mailed on Sep. 22, 2023, 7 pages (2 pages of English Translation and 5 pages of Official Copy).
Notice of Allowance received for Korean Patent Application No. 10-2023-0189466, mailed on Feb. 17, 2025, 10 pages (2 pages of English Translation and 8 pages of Official Copy).
Notice of Allowance received for Korean Patent Application No. 10-2023-0189466, mailed on Jul. 22, 2024, 8 pages (2 pages of English Translation and 6 pages of Official Copy).
Notice of Allowance received for Korean Patent Application No. 10-2023-0189466, mailed on Nov. 5, 2024, 10 pages (2 pages of English Translation and 8 pages of Official Copy).
Notice of Allowance received for Korean Patent Application No. 10-2023-7021441, mailed on Jul. 6, 2023, 8 pages (2 pages of English Translation and 6 pages of Official Copy).
Notice of Allowance received for Korean Patent Application No. 10-2023-7025821, mailed on Mar. 10, 2025, 7 pages (2 pages of English Translation and 5 pages of Official Copy).
Notice of Allowance received for Korean Patent Application No. 10-2023-7032383, mailed on Aug. 29, 2024, 10 pages (2 pages of English Translation and 8 pages of Official Copy).
Notice of Allowance received for Korean Patent Application No. 10-2023-7033560, mailed on Mar. 6, 2025, 8 pages (2 pages of English Translation and 6 pages of Official Copy).
Notice of Allowance received for Korean Patent Application No. 10-2023-7042778, mailed on Feb. 17, 2025, 7 pages (2 pages of English Translation and 5 pages of Official Copy).
Notice of Allowance received for Korean Patent Application No. 10-2024-7004853, mailed on Nov. 14, 2024, 8 pages (2 pages of English Translation and 6 pages of Official Copy).
Notice of Allowance received for Korean Patent Application No. 10-2024-7023682, mailed on Feb. 3, 2025, 8 pages (2 pages of English Translation and 6 pages of Official Copy).
Notice of Allowance received for U.S. Appl. No. 16/583,706, mailed on Aug. 7, 2024, 5 pages.
Notice of Allowance received for U.S. Appl. No. 16/583,706, mailed on Nov. 27, 2024, 5 pages.

(56) References Cited

OTHER PUBLICATIONS

Notice of Allowance received for U.S. Appl. No. 17/031,671, mailed on Jan. 29, 2025, 37 pages.
Notice of Allowance received for U.S. Appl. No. 17/031,765, mailed on Apr. 2, 2024, 34 pages.
Notice of Allowance received for U.S. Appl. No. 17/093,408, mailed on Aug. 30, 2023, 59 pages.
Notice of Allowance received for U.S. Appl. No. 17/525,664, mailed on Apr. 26, 2023, 10 pages.
Notice of Allowance received for U.S. Appl. No. 17/725,311, mailed on Feb. 14, 2024, 8 pages.
Notice of Allowance received for U.S. Appl. No. 17/725,311, mailed on May 1, 2024, 5 pages.
Notice of Allowance received for U.S. Appl. No. 17/736,925, mailed on Apr. 24, 2023, 10 pages.
Notice of Allowance received for U.S. Appl. No. 17/736,925, mailed on Aug. 3, 2023, 9 pages.
Notice of Allowance received for U.S. Appl. No. 17/941,962, mailed on Jul. 3, 2023, 9 pages.
Notice of Allowance received for U.S. Appl. No. 17/941,962, mailed on May 3, 2023, 10 pages.
Notice of Allowance received for U.S. Appl. No. 17/971,456, mailed on Jun. 26, 2023, 9 pages.
Notice of Allowance received for U.S. Appl. No. 18/071,434, mailed on Jan. 31, 2024, 10 pages.
Notice of Allowance received for U.S. Appl. No. 18/071,434, mailed on May 20, 2024, 9 pages.
Notice of Allowance received for U.S. Appl. No. 18/138,634, mailed on Apr. 18, 2024, 9 pages.
Notice of Allowance received for U.S. Appl. No. 18/197,242, mailed on Jul. 10, 2024, 12 pages.
Notice of Allowance received for U.S. Appl. No. 18/197,242, mailed on Mar. 6, 2024, 11 pages.
Notice of Allowance received for U.S. Appl. No. 18/197,242, mailed on Oct. 17, 2024, 12 pages.
Notice of Allowance received for U.S. Appl. No. 18/220,715, mailed on Jun. 13, 2024, 10 pages.
Notice of Allowance received for U.S. Appl. No. 18/220,715, mailed on Mar. 7, 2024, 11 pages.
Notice of Allowance received for U.S. Appl. No. 18/230,465, mailed on Sep. 16, 2024, 5 pages.
Notice of Allowance received for U.S. Appl. No. 18/241,802, mailed on Dec. 4, 2024, 12 pages.
Notice of Allowance received for U.S. Appl. No. 18/241,802, mailed on Oct. 8, 2024, 11 pages.
Notice of Allowance received for U.S. Appl. No. 18/378,470, mailed on Jan. 15, 2025, 40 pages.
Notice of Allowance received for U.S. Appl. No. 18/378,470, mailed on May 20, 2025, 41 pages.
Notice of Allowance received for U.S. Appl. No. 18/407,241, mailed on Nov. 14, 2024, 8 pages.
Notice of Allowance received for U.S. Appl. No. 18/677,585, mailed on Mar. 5, 2025, 9 pages.
Notice of Allowance received for U.S. Appl. No. 18/677,585, mailed on May 19, 2025, 8 pages.
Notice of Hearing received for Indian Patent Application No. 201814036470, mailed on Feb. 7, 2024, 4 pages.
Notice of Hearing received for Indian Patent Application No. 201814036472, mailed on May 9, 2024, 2 pages.
Office Action received for Australian Patent Application No. 2022203285, mailed on Apr. 20, 2023, 4 pages.
Office Action received for Australian Patent Application No. 2023200039, mailed on Jul. 4, 2023, 2 pages.
Office Action received for Australian Patent Application No. 2023200797, mailed on Jan. 23, 2024, 5 pages.
Office Action received for Australian Patent Application No. 2023200867, mailed on Jul. 21, 2023, 3 pages.
Office Action received for Australian Patent Application No. 2023201250, mailed on Sep. 11, 2023, 3 pages.
Office Action received for Australian Patent Application No. 2023219926, mailed on Aug. 24, 2024, 5 pages.
Office Action received for Australian Patent Application No. 2023219926, mailed on Dec. 3, 2024, 4 pages.
Office Action received for Australian Patent Application No. 2023282240, mailed on Dec. 6, 2024, 2 pages.
Office Action received for Australian Patent Application No. 2023282240, mailed on Feb. 4, 2025, 3 pages.
Office Action received for Australian Patent Application No. 2023282240, mailed on May 21, 2025, 3 pages.
Office Action received for Australian Patent Application No. 2023282284, mailed on Jan. 19, 2024, 6 pages.
Office Action received for Australian Patent Application No. 2024200460, mailed on Nov. 14, 2024, 3 pages.
Office Action received for Australian Patent Application No. 2024201007, mailed on Feb. 7, 2025, 2 pages.
Office Action received for Chinese Patent Application No. 201880000798.6, mailed on Mar. 18, 2025, 14 pages (6 pages of English Translation and 8 pages of Official Copy).
Office Action received for Chinese Patent Application No. 201880004632.1, mailed on Apr. 3, 2024, 13 pages (7 pages of English Translation and 6 pages of Official Copy).
Office Action received for Chinese Patent Application No. 201880004632.1, mailed on Jan. 6, 2025, 2 pages (1 page of English Translation and 1 page of Official Copy).
Office Action received for Chinese Patent Application No. 201880004632.1, mailed on Jan. 31, 2024, 7 pages (3 pages of English Translation and 4 pages of Official Copy).
Office Action received for Chinese Patent Application No. 201880004632.1, mailed on Jul. 16, 2024, 11 pages (5 pages of English Translation and 6 pages of Official Copy).
Office Action received for Chinese Patent Application No. 201910691865.X, mailed on Apr. 14, 2025, 14 pages (5 pages of English Translation and 9 pages of Official Copy).
Office Action received for Chinese Patent Application No. 201910691872.X, mailed on May 15, 2025, 18 pages (10 pages of English Translation and 8 pages of Official Copy).
Office Action received for Chinese Patent Application No. 202010330318.1, mailed on Mar. 6, 2025, 27 pages (15 pages of English Translation and 12 pages of Official Copy).
Office Action received for Chinese Patent Application No. 202080009772.5, mailed on Apr. 30, 2025, 23 pages (14 pages of English Translation and 9 pages of Official Copy).
Office Action received for Chinese Patent Application No. 202080009772.5, mailed on Aug. 17, 2024, 28 pages (15 pages of English Translation and 13 pages of Official Copy).
Office Action received for Chinese Patent Application No. 202110530629.7, mailed on Mar. 14, 2024, 13 pages (6 pages of English Translation and 7 pages of Official Copy).
Office Action received for Chinese Patent Application No. 202110912648.6, mailed on Dec. 19, 2024, 19 pages (10 pages of English Translation and 9 pages of Official Copy).
Office Action received for Chinese Patent Application No. 202310124087.2, mailed on Sep. 9, 2023, 24 pages (13 pages of English Translation and 11 pages of Official Copy).
Office Action received for European Patent Application No. 19186042.8, mailed on Feb. 13, 2025, 7 pages.
Office Action received for European Patent Application No. 19186042.8, mailed on Jul. 18, 2024, 8 pages.
Office Action received for European Patent Application No. 19186042.8, mailed on Nov. 13, 2024, 7 pages.
Office Action received for European Patent Application No. 19186042.8, mailed on Oct. 10, 2023, 6 pages.
Office Action received for European Patent Application No. 19211833.9, mailed on Aug. 23, 2024, 5 pages.
Office Action received for European Patent Application No. 21727979.3, mailed on Sep. 26, 2024, 11 pages.
Office Action received for European Patent Application No. 21728746.5, mailed on Aug. 21, 2023, 4 pages.
Office Action received for European Patent Application No. 21728746.5, mailed on Jan. 11, 2024, 4 pages.
Office Action received for European Patent Application No. 22154034.7, mailed on Feb. 19, 2024, 8 pages.

(56) References Cited

OTHER PUBLICATIONS

Office Action received for European Patent Application No. 22154034.7, mailed on May 26, 2023, 10 pages.
Office Action received for European Patent Application No. 22154034.7, mailed on Oct. 11, 2024, 8 pages.
Office Action received for European Patent Application No. 23168077.8, mailed on Apr. 25, 2024, 7 pages.
Office Action received for European Patent Application No. 23168077.8, mailed on Nov. 21, 2024, 8 pages.
Office Action received for European Patent Application No. 24165004.3, mailed on Dec. 5, 2024, 5 pages.
Office Action received for Indian Patent Application No. 202015008747, mailed on Mar. 15, 2023, 10 pages.
Office Action received for Indian Patent Application No. 202118051150, mailed on Nov. 24, 2023, 5 pages.
Office Action received for Indian Patent Application No. 202215026045, mailed on Mar. 31, 2023, 8 pages.
Office Action received for Indian Patent Application No. 202218005498, mailed on May 31, 2024, 6 pages.
Office Action received for Indian Patent Application No. 202315036344, mailed on May 22, 2025, 8 pages.
Office Action received for Japanese Patent Application No. 2021-168243, mailed on Mar. 8, 2024, 4 pages (2 pages of English Translation and 2 pages of Official Copy).
Office Action received for Japanese Patent Application No. 2021-173713, mailed on Jun. 15, 2023, 4 pages (2 pages of English Translation and 2 pages of Official Copy).
Office Action received for Japanese Patent Application No. 2021-173713, mailed on Jun. 18, 2024, 4 pages (2 pages of English Translation and 2 pages of Official Copy).
Office Action received for Japanese Patent Application No. 2022-163568, mailed on Dec. 22, 2023, 8 pages (4 pages of English Translation and 4 pages of Official Copy).
Office Action received for Japanese Patent Application No. 2022-163568, mailed on Jun. 3, 2024, 8 pages (4 pages of English Translation and 4 pages of Official Copy).
Office Action received for Japanese Patent Application No. 2022-170806, mailed on May 13, 2024, 4 pages (2 pages of English Translation and 2 pages of Official Copy).
Office Action received for Japanese Patent Application No. 2022-170806, mailed on Nov. 17, 2023, 14 pages (7 pages of English Translation and 7 pages of Official Copy).
Office Action received for Japanese Patent Application No. 2022-194369, mailed on Mar. 15, 2024, 11 pages (5 pages of English Translation and 6 pages of Official Copy).
Office Action received for Japanese Patent Application No. 2022-194369, mailed on Sep. 20, 2024, 5 pages (2 pages of English Translation and 3 pages of Official Copy).
Office Action received for Japanese Patent Application No. 2023-169627, mailed on Jul. 29, 2024, 4 pages (2 pages of English Translation and 2 pages of Official Copy).
Office Action received for Japanese Patent Application No. 2023-210355, mailed on Feb. 4, 2025, 6 pages (3 pages of English Translation and 3 pages of Official Copy).
Office Action received for Japanese Patent Application No. 2023-211453, mailed on Dec. 6, 2024, 6 pages (3 pages of English Translation and 3 pages of Official Copy).
Office Action received for Japanese Patent Application No. 2024-054487, mailed on Mar. 28, 2025, 8 pages (4 pages of English Translation and 4 pages of Official Copy).
Office Action received for Japanese Patent Application No. 2024-144411, mailed on Nov. 25, 2024, 4 pages (2 pages of English Translation and 2 pages of Official Copy).
Office Action received for Korean Patent Application No. 10-2022-7004578, mailed on May 11, 2023, 8 pages (4 pages of English Translation and 4 pages of Official Copy).
Office Action received for Korean Patent Application No. 10-2023-0064928, mailed on Jun. 9, 2023, 6 pages (2 pages of English Translation and 4 pages of Official Copy).
Office Action received for Korean Patent Application No. 10-2023-7025821, mailed on Mar. 12, 2024, 11 pages (5 pages of English Translation and 6 pages of Official Copy).
Office Action received for Korean Patent Application No. 10-2023-7025821, mailed on Nov. 11, 2024, 7 pages (3 pages of English Translation and 4 pages of Official Copy).
Office Action received for Korean Patent Application No. 10-2023-7032383, mailed on Feb. 5, 2024, 16 pages (7 pages of English Translation and 9 pages of Official Copy).
Office Action received for Korean Patent Application No. 10-2023-7037034, mailed on Jul. 22, 2024, 23 pages (11 pages of English Translation and 12 pages of Official Copy).
Office Action received for Korean Patent Application No. 10-2023-7042778, mailed on Aug. 5, 2024, 12 pages (5 pages of English Translation and 7 pages of Official Copy).
Office Action received for Korean Patent Application No. 10-2024-7004853, mailed on Mar. 4, 2024, 6 pages (2 pages of English Translation and 4 pages of Official Copy).
Office Action received for Korean Patent Application No. 10-2024-7023682, mailed on Aug. 5, 2024, 6 pages (2 pages of English Translation and 4 pages of Official Copy).
Pre-Appeal Review Report received for Japanese Patent Application No. 2021-173713, mailed on Nov. 10, 2023, 4 pages (2 pages of English Translation and 2 pages of Official Copy).
Record of Oral Hearing received for U.S. Appl. No. 16/259,771, mailed on Feb. 4, 2024, 15 pages.
Record of Oral Hearing received for U.S. Appl. No. 16/583,706, mailed on Mar. 5, 2024, 13 pages.
Record of Oral Hearing received for U.S. Appl. No. 17/031,671, mailed on Aug. 27, 2024, 17 pages.
Result of Consultation received for European Patent Application No. 20191533.7, mailed on Dec. 16, 2024, 4 pages.
Result of Consultation received for European Patent Application No. 20191533.7, mailed on Jul. 9, 2024, 4 pages.
Result of Consultation received for European Patent Application No. 20191533.7, mailed on Jul. 18, 2024, 4 pages.
Result of Consultation received for European Patent Application No. 24165004.3, mailed on Feb. 4, 2025, 3 pages.
Rozario Hamlin, "How to Edit Photos on iPhone & iPad", Online Available at:https://osxdaily.com/2020/01/23/how-to-edit-photos-on-iphone-ipad/, Jan. 23, 2020, 10 pages.
Spencerwoo, "The first impression is very important when chatting. How to make an avatar that can be remembered at first sight?", available online at:https://www.sspai.com/post/53240, Mar. 13, 2019, 31 pages (16 pages of English Translation and 15 pages of Official Copy).
Summons To Attend Oral Proceedings received for European Patent Application No. 17853657.9, mailed on May 2, 2023, 8 pages.
Summons To Attend Oral Proceedings received for European Patent Application No. 19212057.4, mailed on Apr. 19, 2023, 9 pages.
Summons To Attend Oral Proceedings received for European Patent Application No. 20191533.7, mailed on Feb. 13, 2024, 7 pages.
Summons To Attend Oral Proceedings received for European Patent Application No. 20191533.7, mailed on Jul. 25, 2024, 12 pages.
Summons To Oral Proceedings received for European Patent Application No. 19204230.7, mailed on Feb. 19, 2024, 2 pages.
Summons To Oral Proceedings received for European Patent Application No. 19724959.2, mailed on Jul. 14, 2023, 6 pages.
Supplemental Notice of Allowance received for U.S. Appl. No. 17/031,671, mailed on Feb. 12, 2025, 4 pages.
Supplemental Notice of Allowance received for U.S. Appl. No. 17/031,671, mailed on Feb. 27, 2025, 3 pages.
Supplemental Notice of Allowance received for U.S. Appl. No. 17/031,765, mailed on Apr. 9, 2024, 2 pages.
Supplemental Notice of Allowance received for U.S. Appl. No. 17/031,765, mailed on Apr. 19, 2024, 3 pages.
Supplemental Notice of Allowance received for U.S. Appl. No. 17/031,765, mailed on May 2, 2024, 3 pages.
Supplemental Notice of Allowance received for U.S. Appl. No. 17/971,456, mailed on Dec. 4, 2023, 2 pages.
Supplemental Notice of Allowance received for U.S. Appl. No. 17/971,456, mailed on Oct. 16, 2023, 5 pages.

(56) References Cited

OTHER PUBLICATIONS

VS Media, "Selfie Camera App B612 and "Snow" Collaborate with Doraemon The Movie: Nobita's Antartic Adventure", Online available at: https://vsmedia.info/2017/03/03/b612_snow_doraemon, Mar. 3, 2017, 2 pages (Official Copy Only). {See Communication under Rule 37 CFR § 1.98(a) (3)}.
Wpshopmart, "Top 20 Creative Animated Login Form In HTML & CSS", https://youtu.be/TDqT-7BnkD8?si=-R69GDvfR_IGrh2H, Dec. 6, 2019, 3 pages.

\* cited by examiner

VIRTUAL AVATAR ANIMATION BASED ON FACIAL FEATURE MOVEMENT

CROSS-REFERENCE TO RELATED APPLICATIONS

This application is continuation of U.S. patent application Ser. No. 16/663,062, entitled "Virtual Avatar Animation Based on Facial Feature Movement," filed Oct. 24, 2019, which claims the benefit of U.S. Provisional Application No. 62/794,496, entitled "Virtual Avatar Animation Based on Facial Feature Movement," filed Jan. 18, 2019, the content of each of which are hereby incorporated by reference in their entireties for all purposes.

FIELD

The present disclosure relates generally to computer user interfaces, and more specifically to techniques for displaying visual effects.

BACKGROUND

Visual effects are used to enhance a user's experience when capturing and viewing media using electronic devices. Visual effects can alter the appearance of image data or can represent an idealized or completely fictional representation of an environment captured in an image.

BRIEF SUMMARY

Some techniques for displaying visual effects using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for displaying visual effects. Such methods and interfaces optionally complement or replace other methods for displaying visual effects. Such methods and interfaces reduce the cognitive burden on a user and produce a more efficient human-machine interface. For battery-operated computing devices, such methods and interfaces conserve power and increase the time between battery charges.

A method is described. The method is performed at an electronic device having one or more cameras and a display apparatus. The method comprises: displaying, via the display apparatus, a virtual avatar having a plurality of avatar features that change appearance in response to detected changes in pose of a face in a field of view of the one or more cameras, the plurality of avatar features including: a first avatar feature; a second avatar feature different from the first avatar feature; and a third avatar feature different from the first and second avatar features; while the face is detected in the field of view of the one or more cameras, the face including a plurality of detected facial features including a first facial feature and a second facial feature different from the first facial feature, detecting movement of one or more facial features of the face; and in response to detecting the movement of the one or more facial features: in accordance with a determination that the detected movement of the one or more facial features includes movement of the first facial feature in a first direction: moving the first avatar feature in the first direction based on the detected movement of the first facial feature in the first direction; and moving the second avatar feature and the third avatar feature in a second direction different from the first direction and based on the detected movement of the first facial feature in the first direction; and in accordance with a determination that the detected movement of the one or more facial features includes movement of the second facial feature: moving the second avatar feature based on at least one of a direction and a magnitude of movement of the second facial feature.

A non-transitory computer-readable storage medium is described. The non-transitory computer-readable storage medium stores one or more programs configured to be executed by one or more processors of an electronic device with one or more cameras and a display apparatus, the one or more programs including instructions for: displaying, via the display apparatus, a virtual avatar having a plurality of avatar features that change appearance in response to detected changes in pose of a face in a field of view of the one or more cameras, the plurality of avatar features including: a first avatar feature; a second avatar feature different from the first avatar feature; and a third avatar feature different from the first and second avatar features; while the face is detected in the field of view of the one or more cameras, the face including a plurality of detected facial features including a first facial feature and a second facial feature different from the first facial feature, detecting movement of one or more facial features of the face; and in response to detecting the movement of the one or more facial features: in accordance with a determination that the detected movement of the one or more facial features includes movement of the first facial feature in a first direction: moving the first avatar feature in the first direction based on the detected movement of the first facial feature in the first direction; and moving the second avatar feature and the third avatar feature in a second direction different from the first direction and based on the detected movement of the first facial feature in the first direction; and in accordance with a determination that the detected movement of the one or more facial features includes movement of the second facial feature: moving the second avatar feature based on at least one of a direction and a magnitude of movement of the second facial feature.

A transitory computer-readable storage medium is described. The transitory computer-readable storage medium stores one or more programs configured to be executed by one or more processors of an electronic device with one or more cameras and a display apparatus, the one or more programs including instructions for: displaying, via the display apparatus, a virtual avatar having a plurality of avatar features that change appearance in response to detected changes in pose of a face in a field of view of the one or more cameras, the plurality of avatar features including: a first avatar feature; a second avatar feature different from the first avatar feature; and a third avatar feature different from the first and second avatar features; while the face is detected in the field of view of the one or more cameras, the face including a plurality of detected facial features including a first facial feature and a second facial feature different from the first facial feature, detecting movement of one or more facial features of the face; and in response to detecting the movement of the one or more facial features: in accordance with a determination that the detected movement of the one or more facial features includes movement of the first facial feature in a first direction: moving the first avatar feature in the first direction based on the detected movement of the first facial feature in the first direction; and moving the second avatar feature and the third avatar feature in a second direction different from the first direction and based on the detected movement of the first facial feature in the first direction; and in accordance with a determination that the detected movement of the one or more facial features includes movement of the second facial feature: moving the second avatar feature based on at least one of a direction and a magnitude of movement of the second facial feature.

An electronic device is described. The electronic device comprises: a display apparatus; one or more cameras; one or more processors; and memory storing one or more programs configured to be executed by the one or more processors, the one or more programs including instructions for: displaying, via the display apparatus, a virtual avatar having a plurality of avatar features that change appearance in response to detected changes in pose of a face in a field of view of the one or more cameras, the plurality of avatar features including: a first avatar feature; a second avatar feature different from the first avatar feature; and a third avatar feature different from the first and second avatar features; while the face is detected in the field of view of the one or more cameras, the face including a plurality of detected facial features including a first facial feature and a second facial feature different from the first facial feature, detecting movement of one or more facial features of the face; and in response to detecting the movement of the one or more facial features: in accordance with a determination that the detected movement of the one or more facial features includes movement of the first facial feature in a first direction: moving the first avatar feature in the first direction based on the detected movement of the first facial feature in the first direction; and moving the second avatar feature and the third avatar feature in a second direction different from the first direction and based on the detected movement of the first facial feature in the first direction; and in accordance with a determination that the detected movement of the one or more facial features includes movement of the second facial feature: moving the second avatar feature based on at least one of a direction and a magnitude of movement of the second facial feature.

An electronic device is described. The electronic device comprises: a display apparatus; one or more cameras; means for displaying, via the display apparatus, a virtual avatar having a plurality of avatar features that change appearance in response to detected changes in pose of a face in a field of view of the one or more cameras, the plurality of avatar features including: a first avatar feature; a second avatar feature different from the first avatar feature; and a third avatar feature different from the first and second avatar features; means for, while the face is detected in the field of view of the one or more cameras, the face including a plurality of detected facial features including a first facial feature and a second facial feature different from the first facial feature, detecting movement of one or more facial features of the face; and means for, in response to detecting the movement of the one or more facial features: in accordance with a determination that the detected movement of the one or more facial features includes movement of the first facial feature in a first direction: moving the first avatar feature in the first direction based on the detected movement of the first facial feature in the first direction; and moving the second avatar feature and the third avatar feature in a second direction different from the first direction and based on the detected movement of the first facial feature in the first direction; and means for, in accordance with a determination that the detected movement of the one or more facial features includes movement of the second facial feature: moving the second avatar feature based on at least one of a direction and a magnitude of movement of the second facial feature.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for displaying visual effects, thereby increasing the effectiveness, efficiency, and user satisfaction with such devices. Such methods and interfaces may complement or replace other methods for displaying visual effects.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
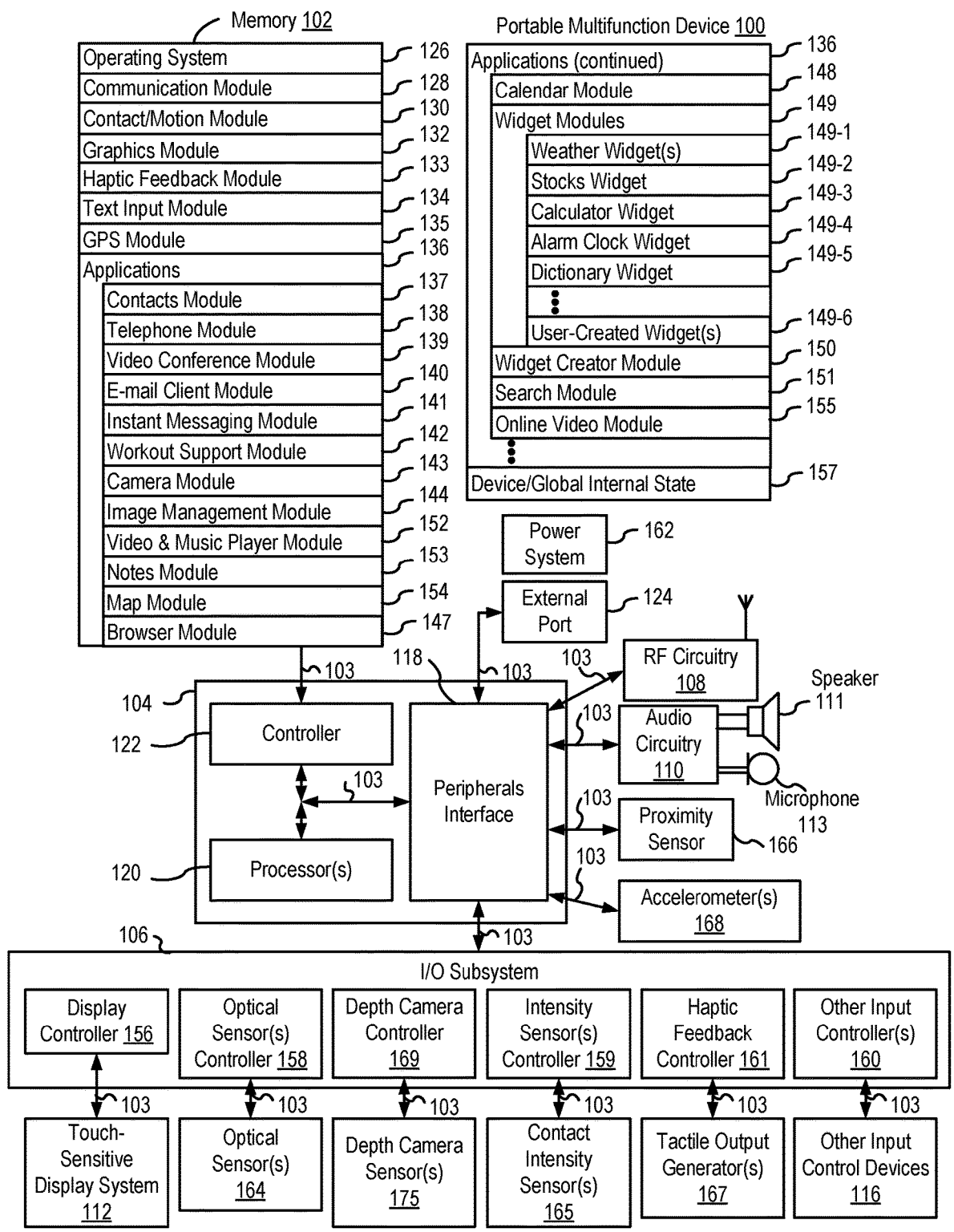
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for displaying visual effects. For example, while programs already exist for displaying visual effects, these programs are inefficient and difficult to use compared to the techniques below, which allow a user to displaying visual effects in various applications. Such techniques can reduce the cognitive burden on a user who displays visual effects in an application, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for displaying visual effects. FIGS. 6A-6F illustrate exemplary user interfaces for displaying visual effects in accordance with some embodiments. FIG. 7 is a flow diagram illustrating methods for displaying visual effects in accordance with some embodiments. The user interfaces in FIGS. 6A-6F are used to illustrate the processes described below, including the processes in FIG. 7.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
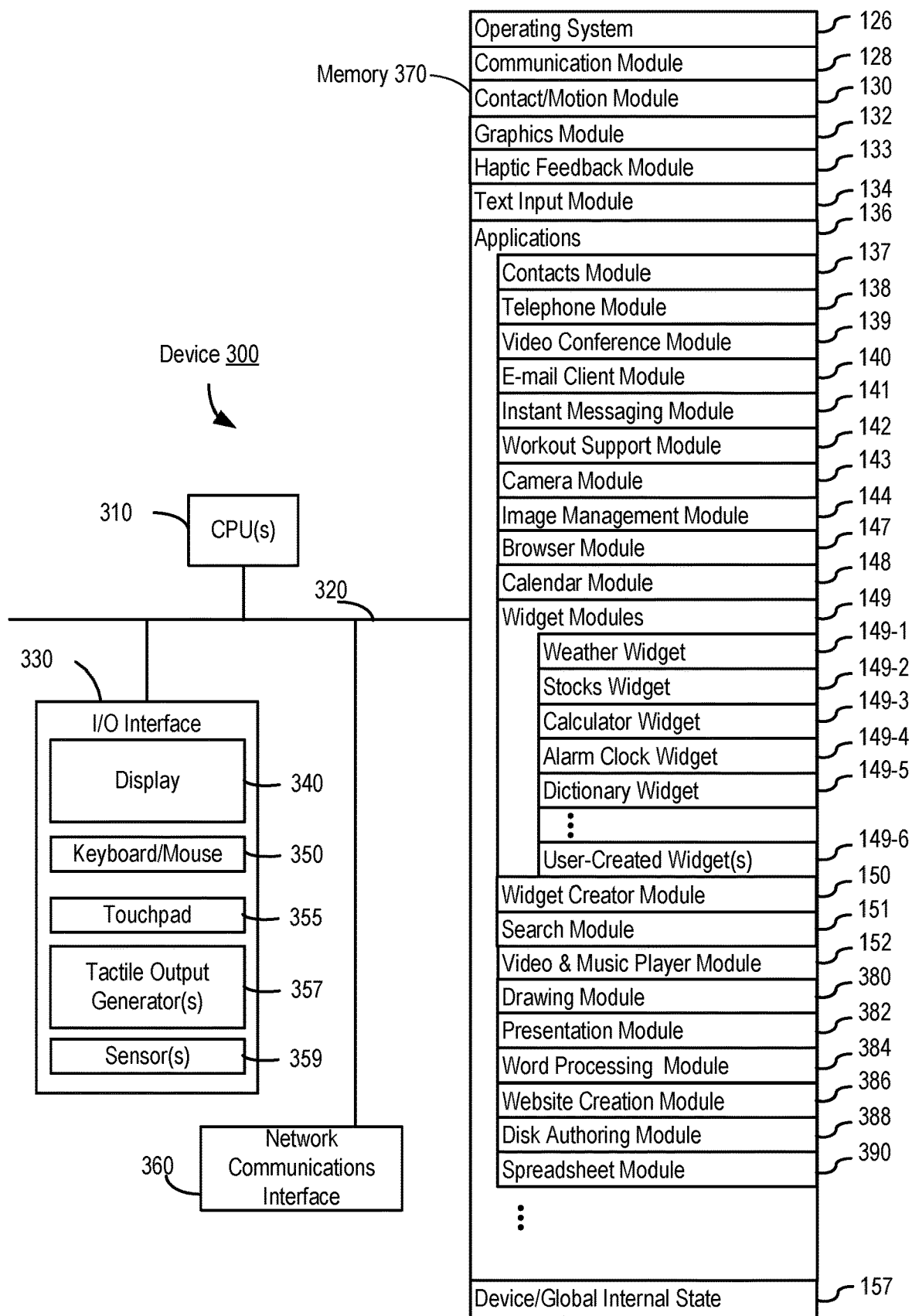
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
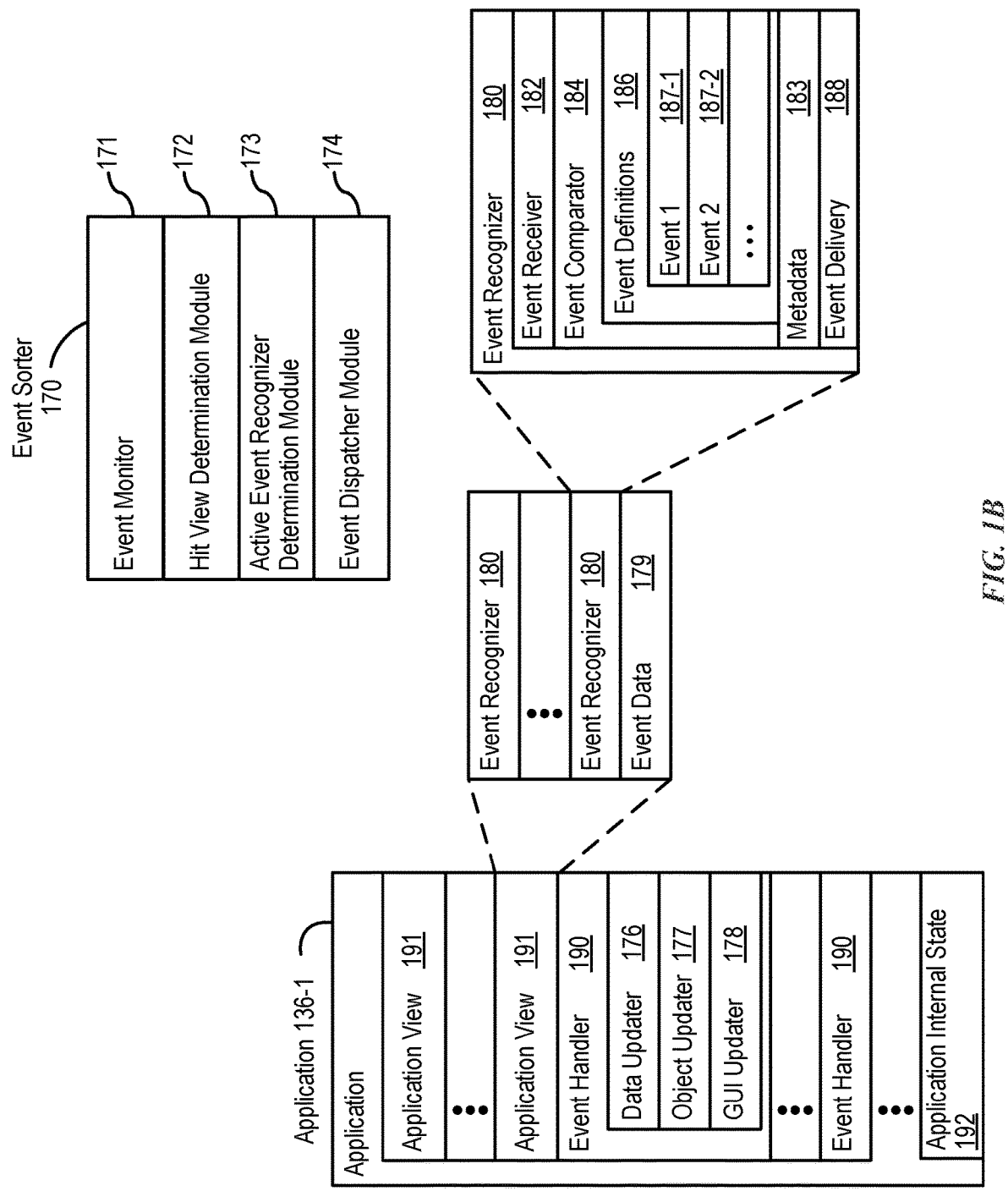
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
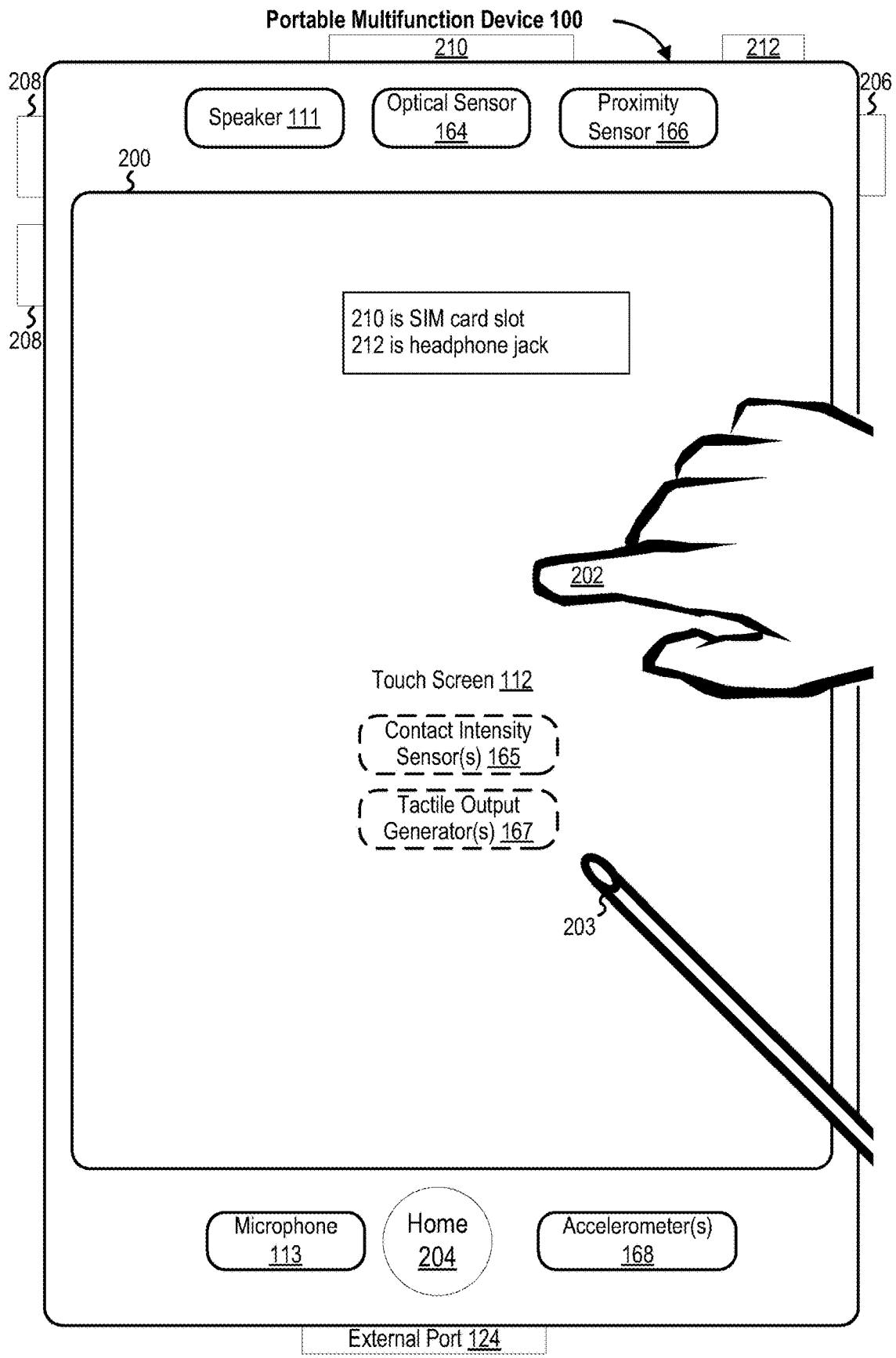
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
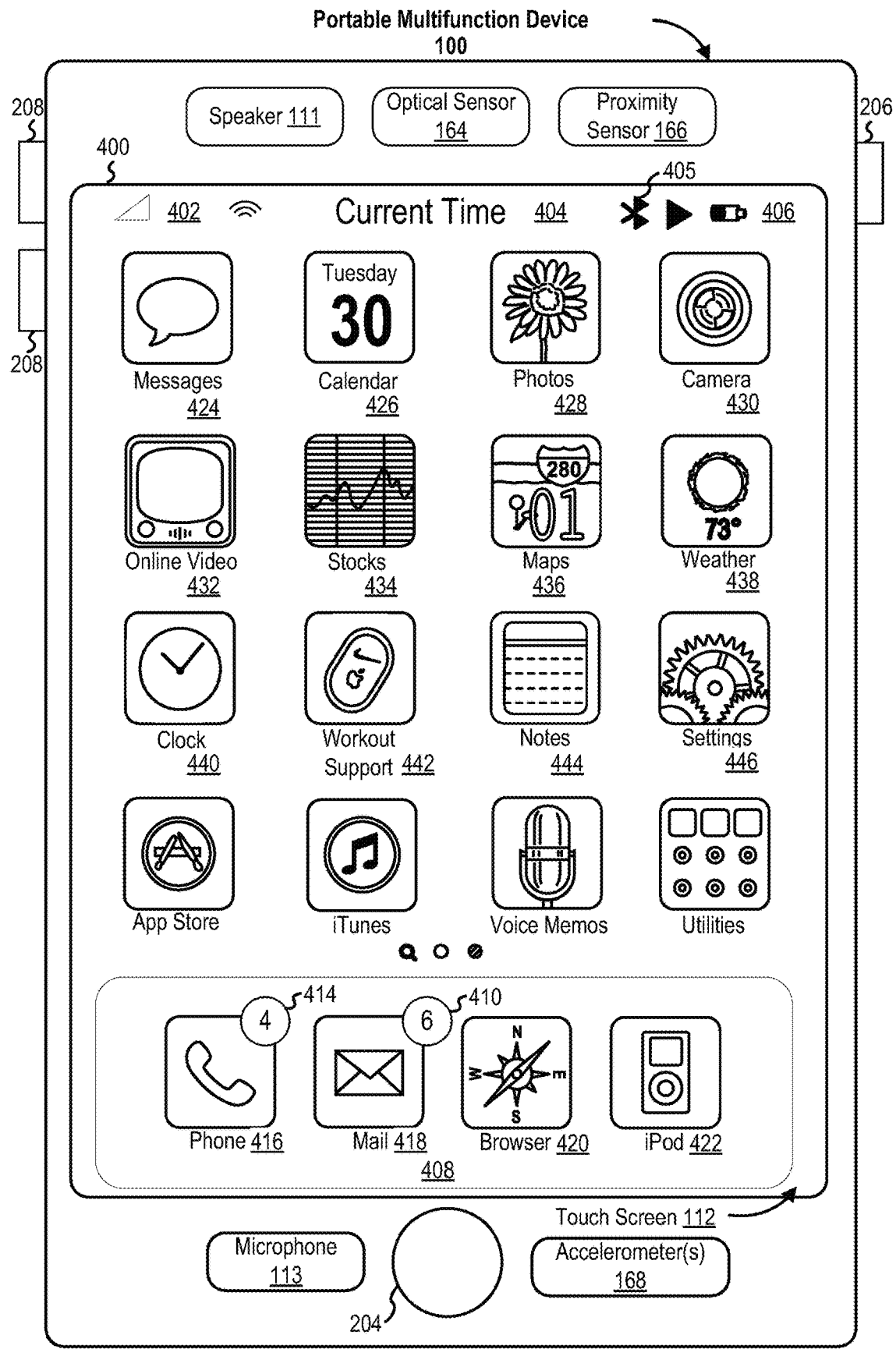
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"

Icon 436 for map module 154, labeled "Maps;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
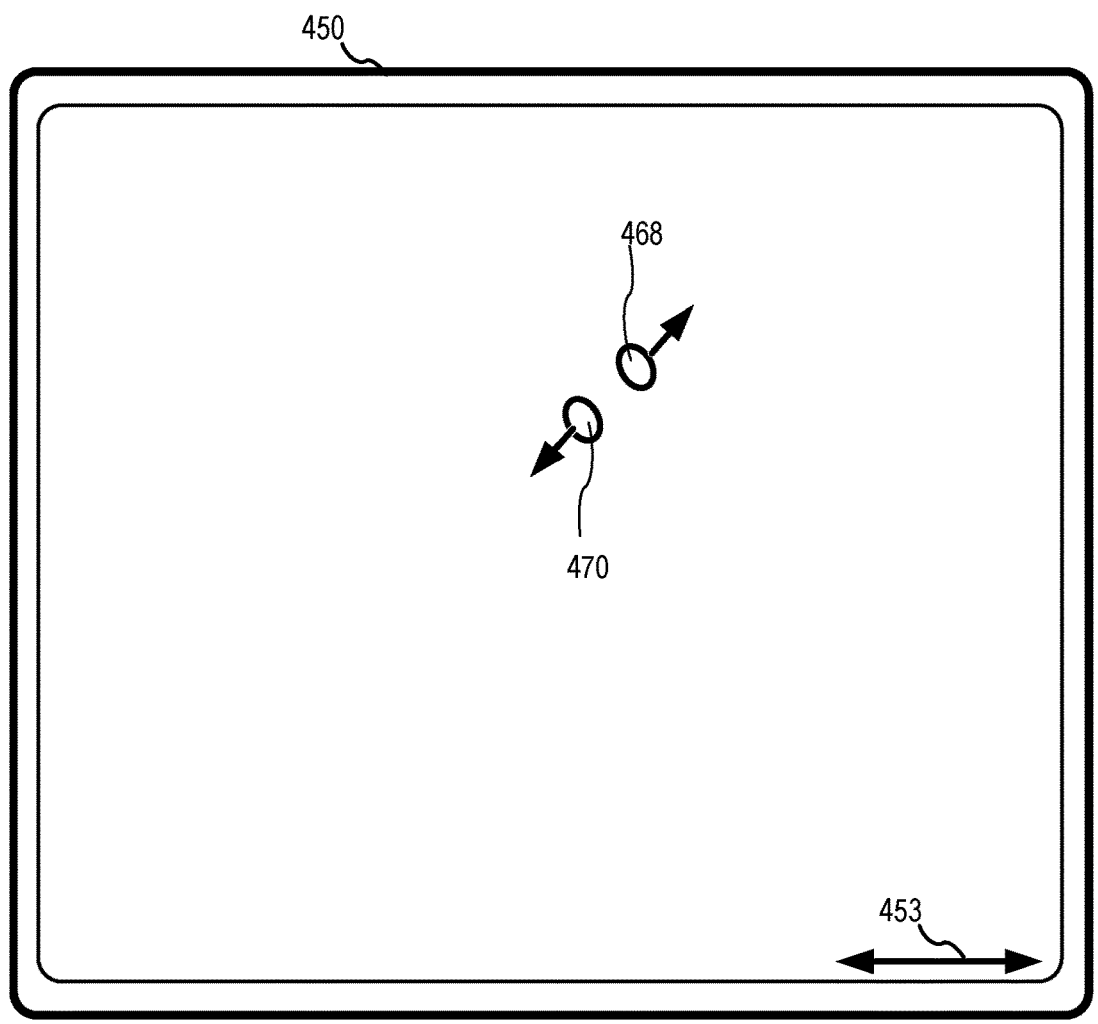
FIG. 4B illustrates an exemplary user interface for a multifunction device with a touch-sensitive surface that is separate from the display in accordance with some embodiments.
Figure 4B:
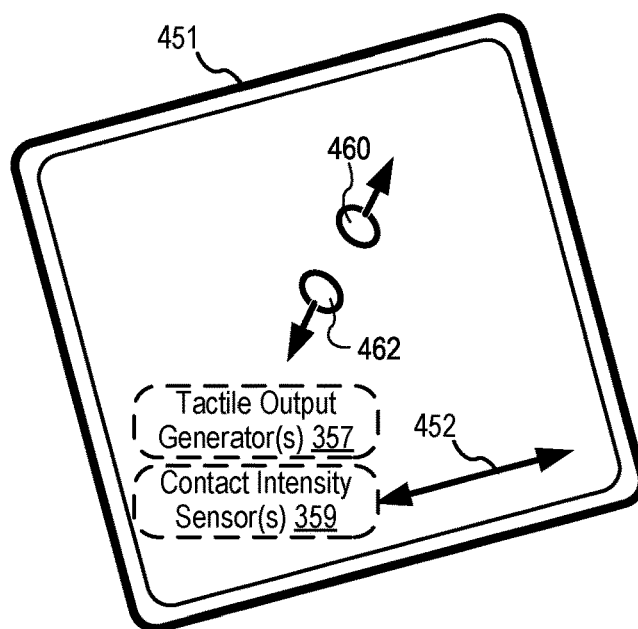

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
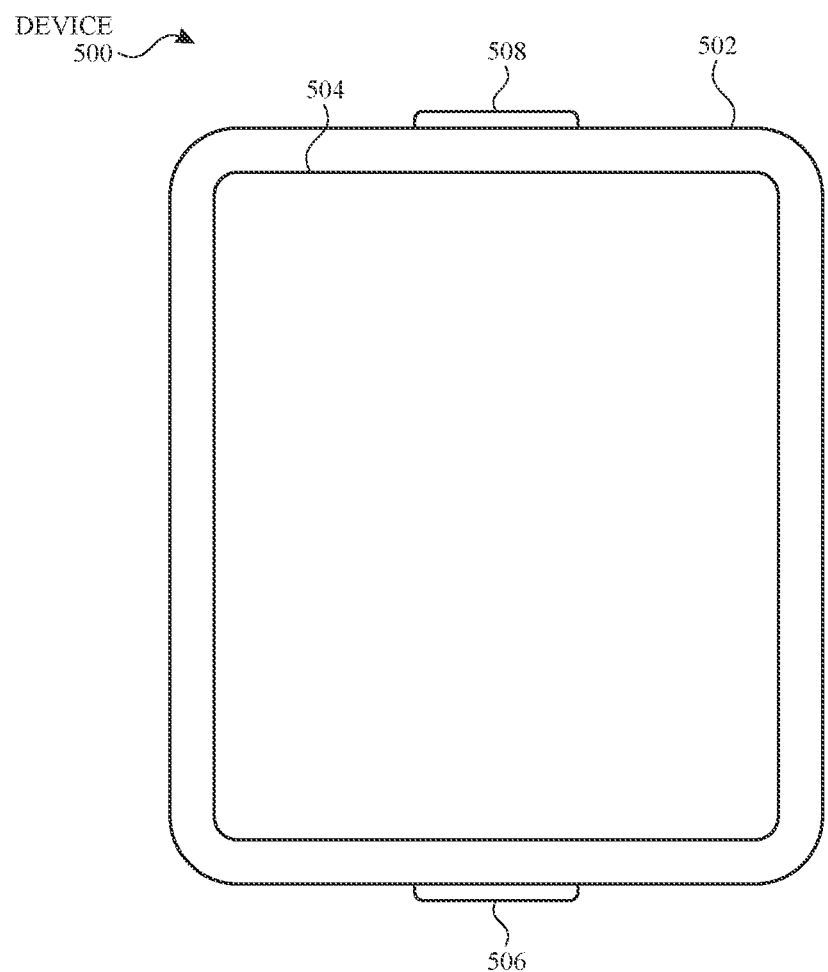
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
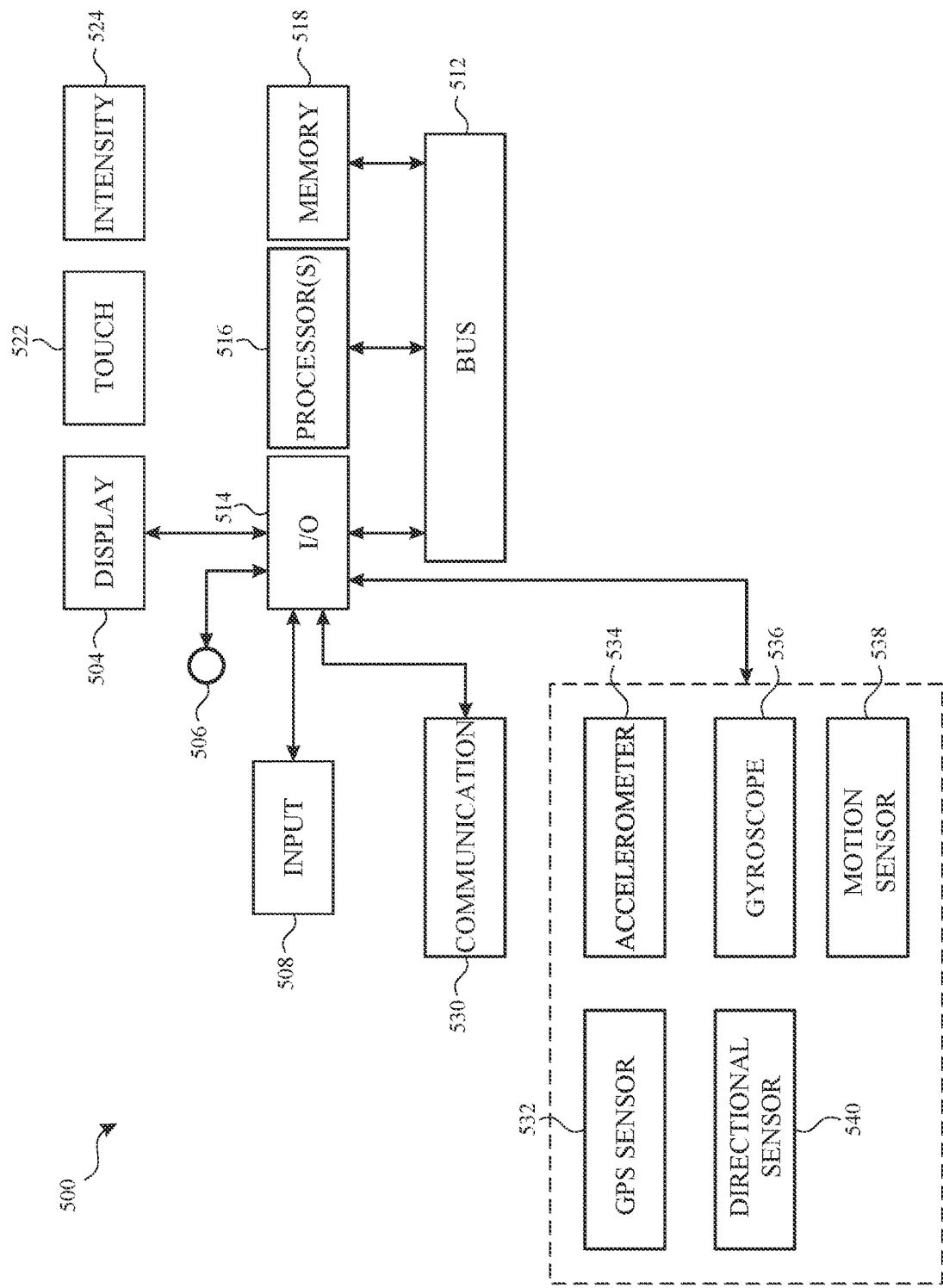
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700-718 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6F illustrate exemplary user interfaces for displaying visual effects, in accordance with some embodiments. The user interfaces in these figures are used to illustrate the processes described below, including the processes in FIG. 7.

Figure 6A:
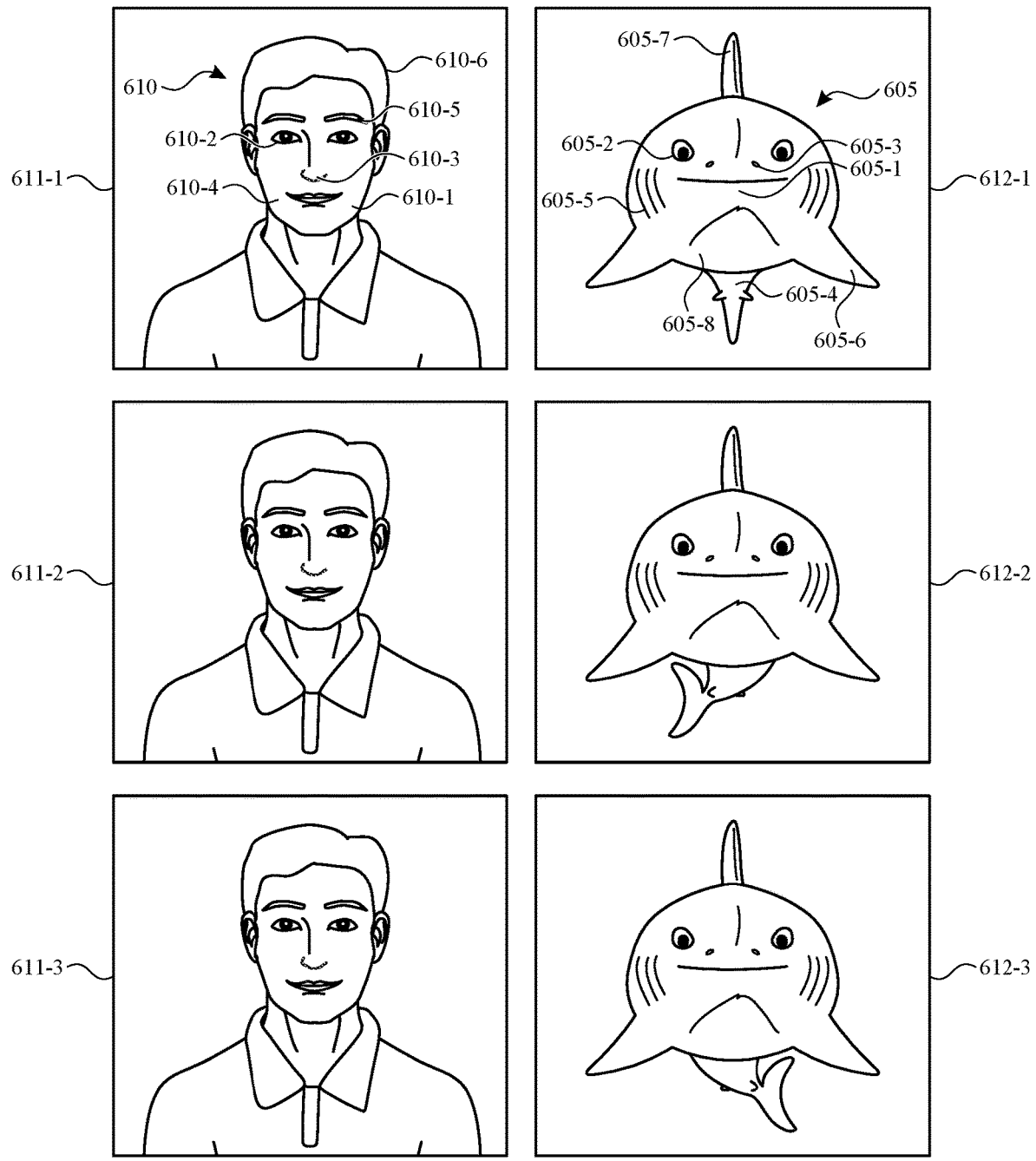
FIGS. 6A-6F illustrate exemplary user interfaces for displaying visual effects in accordance with some embodiments.
Figure 6B:
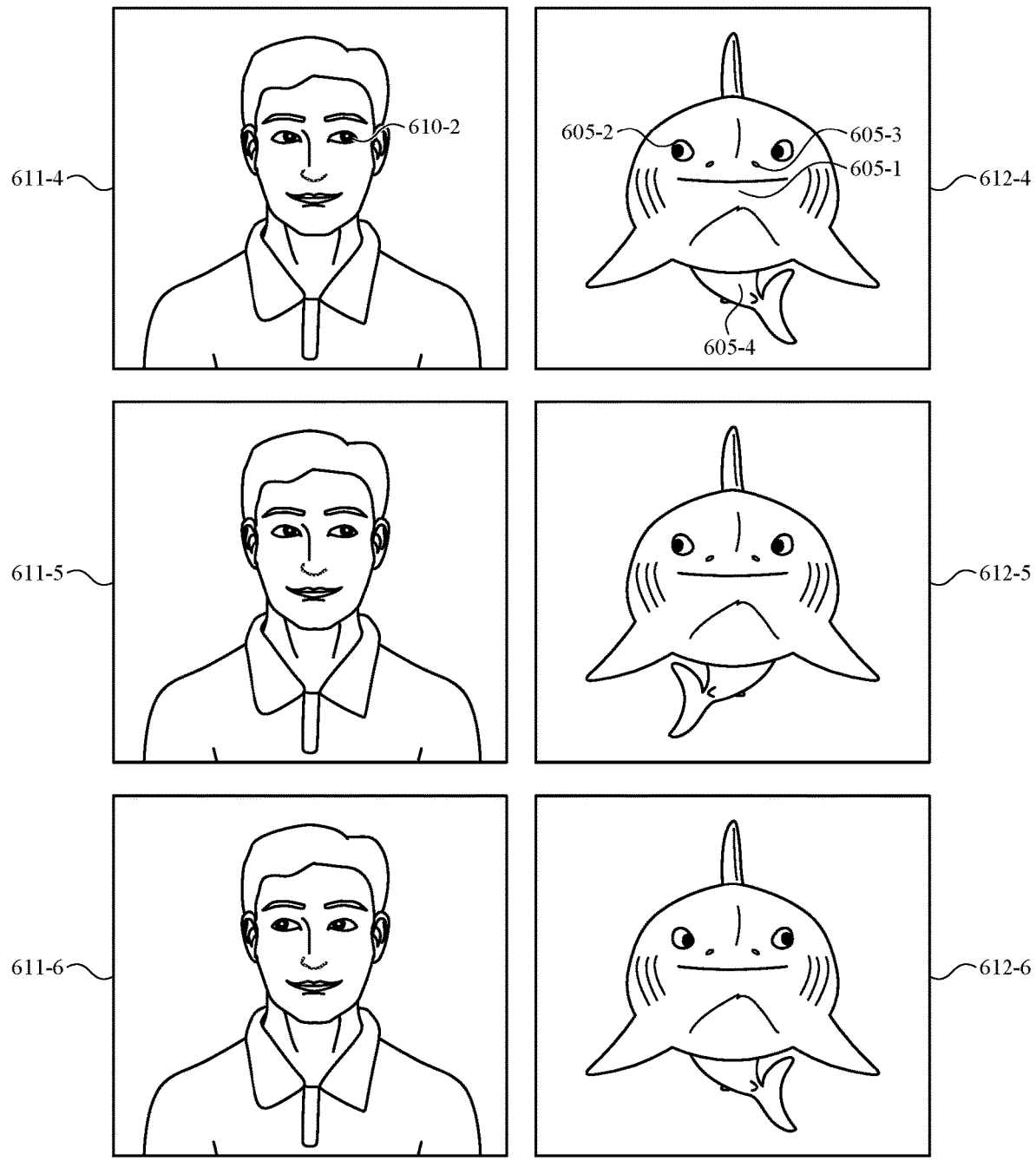
Figure 6C:
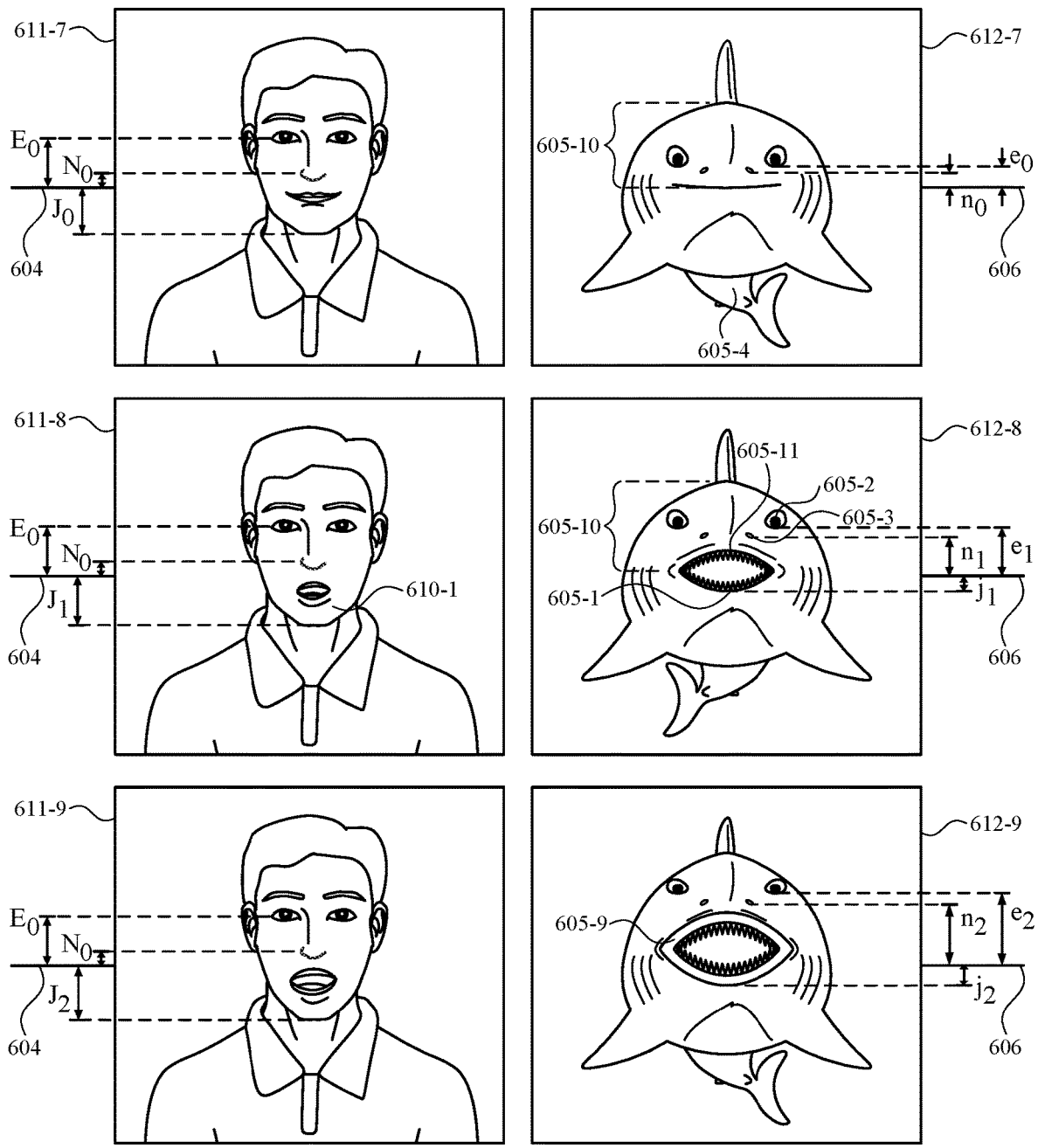
Figure 6D:
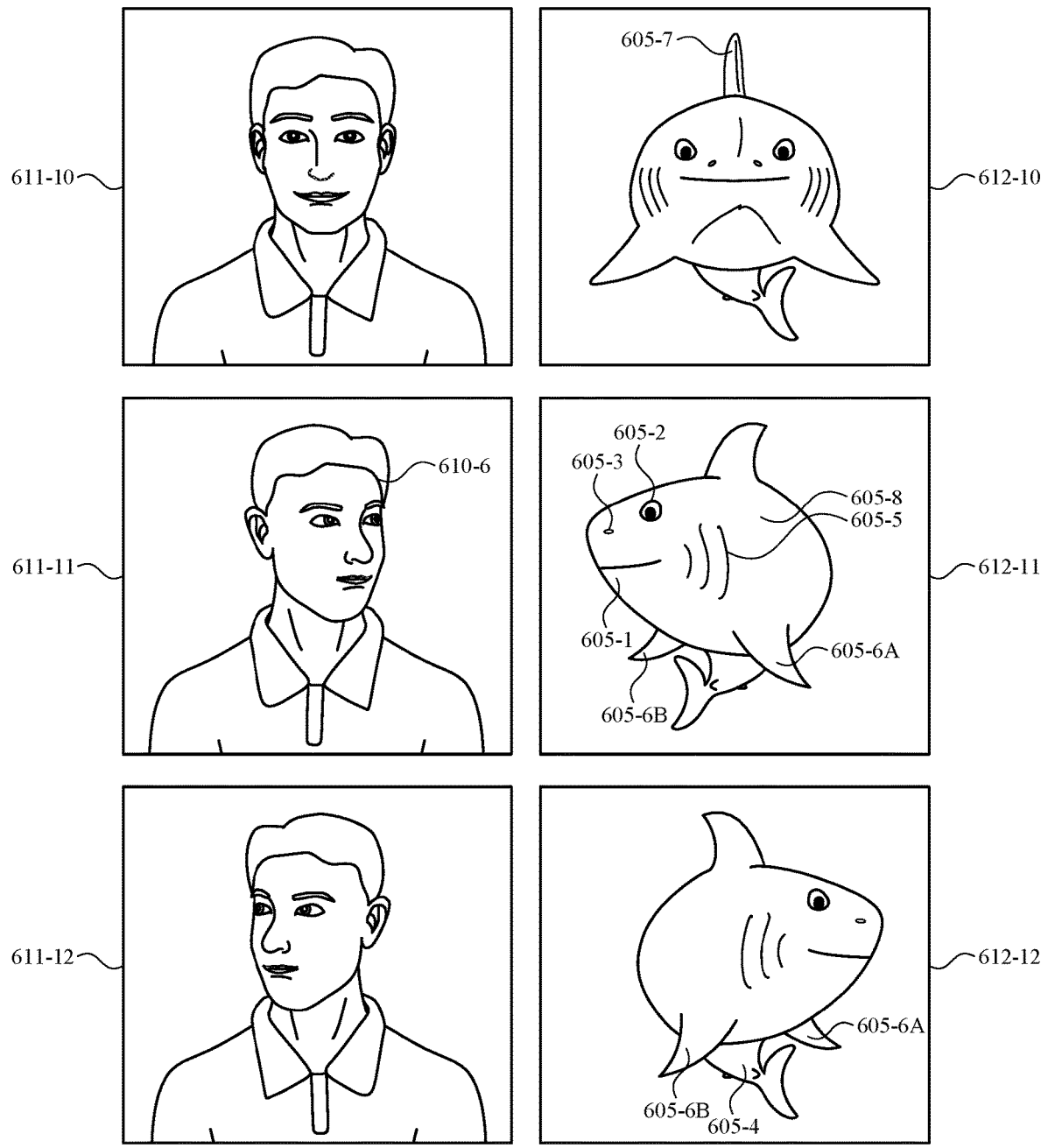
Figure 6E:
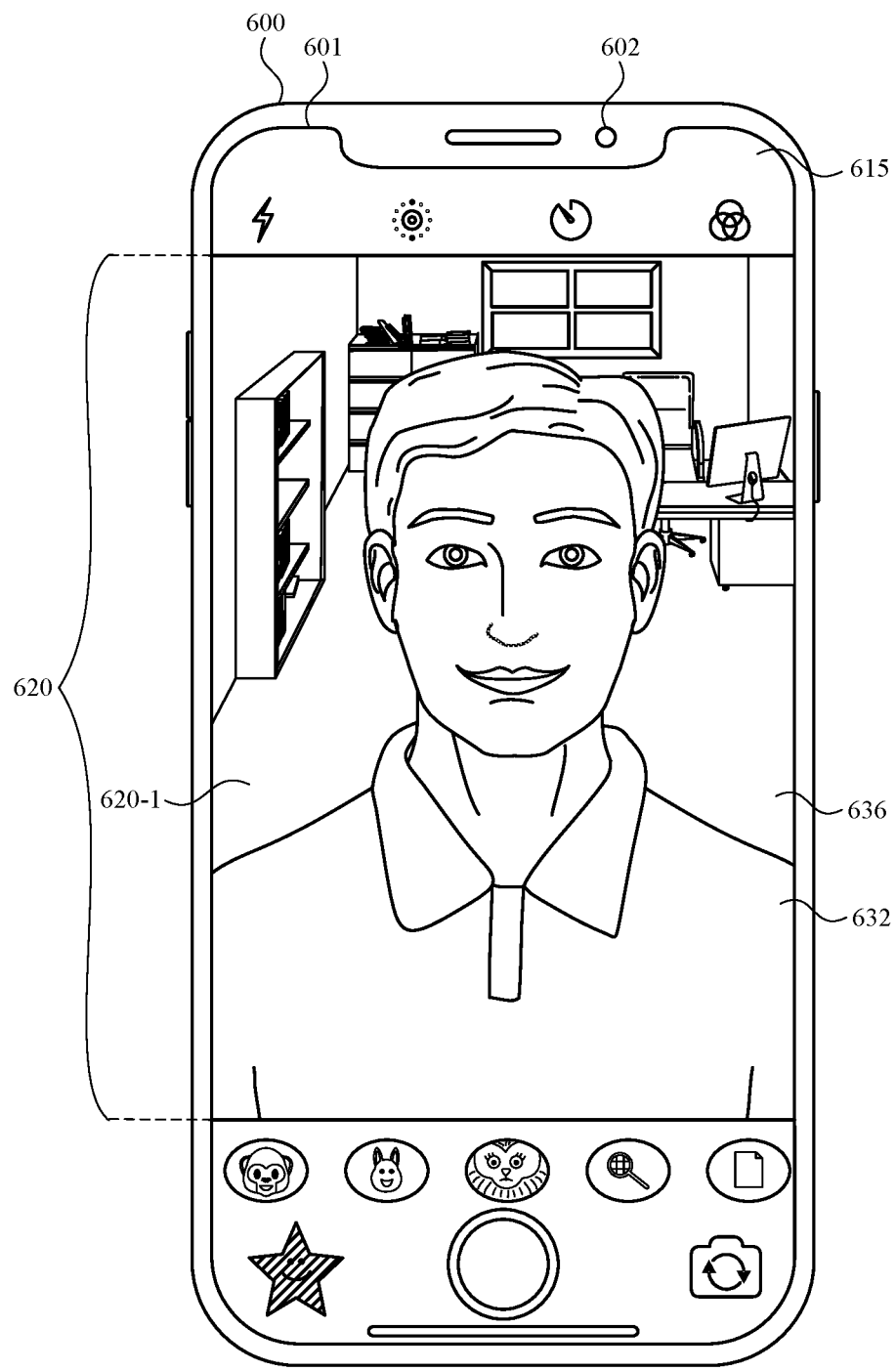
Figure 6F:
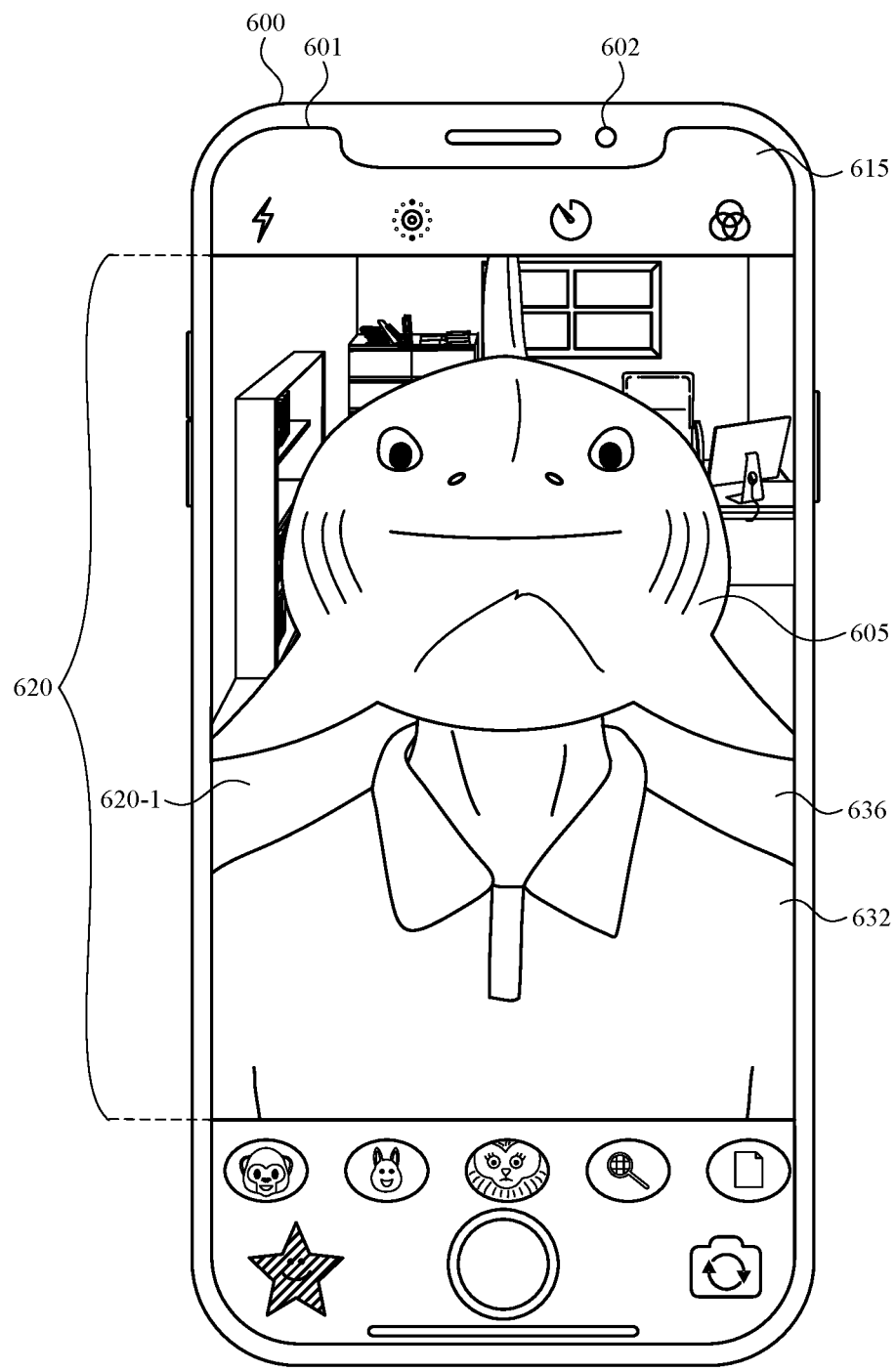
Figure 7:
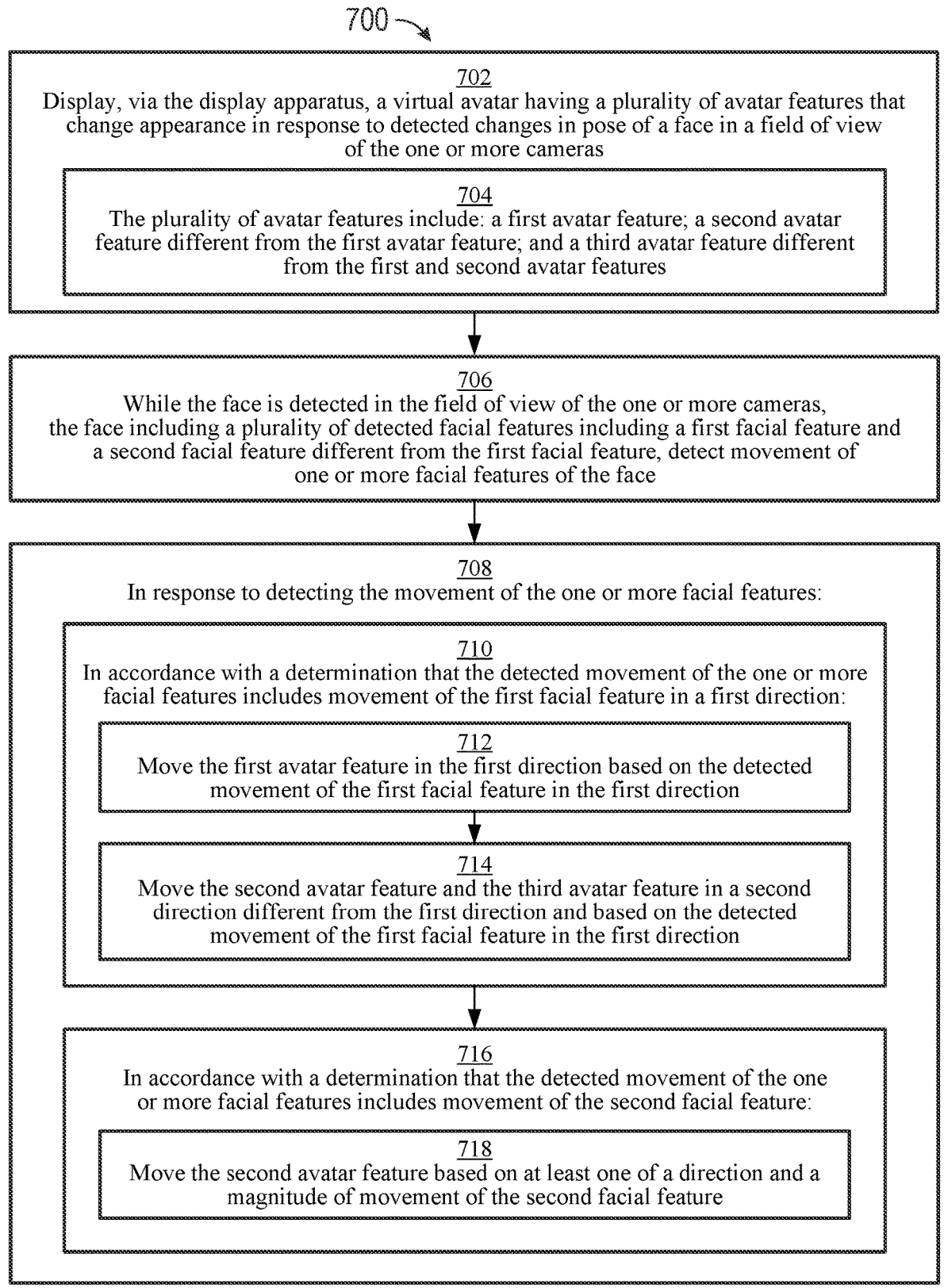
FIG. 7 is a flow diagram illustrating a method for displaying visual effects in accordance with some embodiments.

FIGS. 6A-6F illustrate exemplary user inputs and corresponding changes to an exemplary virtual avatar (e.g., shark avatar 605), which may be displayed on an electronic device, such as electronic device 600 shown in FIGS. 6E and 6F, and having display 601, which in some cases is a touch-sensitive display, and camera 602, which, at a minimum, includes an image sensor that is capable of capturing data representing a portion of the light spectrum (e.g., visible light, infrared light, or ultraviolet light). In some embodiments, camera 602 includes multiple image sensors and/or other types of sensors. In addition to capturing data representing sensed light, in some embodiments, camera 602 is capable of capturing other types of data, such as depth data. For example, in some embodiments, camera 602 also captures depth data using techniques based on speckle, time-of-flight, parallax, or focus. Image data that device 600 captures using camera 602 includes data corresponding to a portion of the light spectrum for a scene within the field of view of the camera. Additionally, in some embodiments, the captured image data also includes depth data for the light data. In some other embodiments, the captured image data contains data sufficient to determine or generate depth data for the data for the portion of the light spectrum. In some embodiments, electronic device 600 includes one or more elements and/or features of devices 100, 300, and 500.

In some examples, electronic device 600 includes a depth camera, such as an infrared camera, a thermographic camera, or a combination thereof. In some examples, the device further includes a light-emitting device (e.g., light projector), such an IR flood light, a structured light projector, or a combination thereof. The light-emitting device is, optionally, used to illuminate the subject during capture of the image by a visible light camera and a depth camera (e.g., an IR camera) and the information from the depth camera and the visible light camera are used to determine a depth map of different portions of subject captured by the visible light camera. In some embodiments, a depth map (e.g., depth map image) contains information (e.g., values) that relates to the distance of objects in a scene from a viewpoint (e.g., a camera). In one embodiment of a depth map, each depth pixel defines the position in the viewpoint's Z-axis where its corresponding two-dimensional pixel is located. In some examples, a depth map is composed of pixels wherein each pixel is defined by a value (e.g., 0-255). For example, the "0" value represents pixels that are located at the most distant place in a "three dimensional" scene, and the "255" value represents pixels that are located closest to a viewpoint (e.g., camera) in the "three dimensional" scene. In other examples, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction. In some embodiments, the lighting effects described herein are displayed using disparity information from two cameras (e.g., two visual light cameras) for rear facing images and using depth information from a depth camera combined with image data from a visual light camera for front facing images (e.g., selfie images). In some embodiments, the same user interface is used when the two visual light cameras are used to determine the depth information and when the depth camera is used to determine the depth information, providing the user with a consistent experience, even when using dramatically different technologies to determine the information that is used when generating the lighting effects. In some embodiments, while displaying the camera user interface with one of the lighting effects applied, the device detects selection of a camera switching affordance and switches from the front facing cameras (e.g., a depth camera and a visible light camera) to the rear-facing cameras (e.g., two visible light cameras that are spaced apart from each other) (or vice versa) while maintaining display of the user interface controls for applying the lighting effect and replacing display of the field of view of the front facing cameras to the field of view of the rear facing cameras (or vice versa).

In some embodiments, a virtual avatar is a representation of the user that can be graphically depicted. In some embodiments, the virtual avatar is non-photorealistic (e.g., cartoonish). In some embodiments, the avatar is an anthropomorphic construct such as a stylized animal (e.g., shark) or a stylization of a normally inanimate object. In some embodiments, the virtual avatar includes an avatar face having one or more avatar features (e.g., avatar facial features). In some embodiments, the avatar features correspond (e.g., are mapped) to one or more physical features of a user's face such that detected movement of the user's physical feature(s) affects the avatar feature (e.g., affects the graphical representation of the features).

In some embodiments, a user is able to manipulate characteristics or features of a virtual avatar using a camera sensor (e.g., camera 602) (e.g., camera module 143, optical sensor 164, depth camera sensor 175). As a user's physical features (such as facial features) and position (such as head position, head rotation, or head tilt) changes, the electronic device detects the changes and, in response, modifies the displayed image of the virtual avatar (e.g., to reflect the changes in the user's physical features and position). In some embodiments, the changes to the user's physical features and position are indicative of various expressions, emotions, context, tone, or other non-verbal communication. In some embodiments, the electronic device modifies the displayed image of the virtual avatar to represent these expressions, emotions, context, tone, or other non-verbal communication.

In some embodiments, a virtual avatar can be displayed in the context of various applications such as, for example, a messaging application, a camera application, a media viewer application (e.g., a photo application or other application for viewing multimedia content such as pictures and videos), and a video communication application. For example, in the context of a messaging application, a virtual avatar can be used to generate visual effects (e.g., multimedia content) including stickers, static virtual avatars, and animated virtual avatars, which can be communicated to users of the messaging application. As another example, in the context of a messaging application, camera application, media viewer application, or video communication application, a virtual avatar can be used to display various visual effects when displaying image data (e.g., image data captured by a camera (e.g., 602) of an electronic device (e.g., device 100, 300, 500, 600)). Details for generating and sending visual effects (e.g., including virtual avatars) in a messaging application, and displaying visual effects in a messaging application, camera application, media viewer application, and video communication application, are provided in US Patent Publication No. US 2018/0335927 and U.S. patent application Ser. No. 16/110,514, which are hereby incorporated by reference for all purposes.

The representations (e.g., user states 611-1 through 611-12) on the left side of FIGS. 6A-6D represent a user as detected by the electronic device when the user is within the field of view of one or more cameras (e.g., camera 602) (e.g., camera module 143, optical sensor 164, depth camera sensor 175) and/or other sensors (e.g., infrared sensors). In other words, the representations of the user are from the perspective of the camera (e.g., camera 602) (e.g., camera module 143, optical sensor 164, depth camera sensor 175), which may be positioned on the electronic device (e.g., device 100, 300, 500, 600) in some embodiments and, in other embodiments, may be positioned separate from the electronic device (e.g., an external camera or sensor passing data to the electronic device). In some embodiments, the borders of the representations on the left side of FIGS. 6A-6D represent the boundaries of the field of view of the one or more cameras (e.g., 602) (e.g., camera module 143, optical sensor 164, depth camera sensor 175) and/or other sensors (e.g., infrared sensors). In some embodiments, the representations of the user are displayed on a display (e.g., touch screen 112, display 340, display 450, display 504, display 601) of the electronic device as image data. In some embodiments, the image data is transmitted to an external electronic device for display. In some embodiments, the external electronic device includes one or more elements and/or features of devices 100, 300, 500, and 600. In some embodiments, the image data is collected and processed by the device (e.g., 100, 300, 500, 600), but is not immediately displayed on the device or transmitted to an external electronic device.

Each of the representations (e.g., avatar states 612-1 through 612-12) on the right side of FIGS. 6A-6D illustrate a virtual avatar (e.g., shark avatar 605) in a state that is presented (e.g., displayed after being modified) based on the corresponding detected state of the user (e.g., user states 611-1 through 611-12) located on the left side of the figure. In some embodiments, the virtual avatar is shown from the perspective of a user viewing the virtual avatar. In some embodiments, the virtual avatar is displayed on the display of the electronic device (e.g., touch screen 112, display 340, display 450, display 504, display 601). In some embodiments, the virtual avatar is transmitted to the external electronic device for display (e.g., with or without the image data of the user). In some embodiments, the representations on the right side of FIGS. 6A-6D represent a position of the virtual avatar within a display region (e.g., 620) of the display of the electronic device (e.g., touch screen 112, display 340, display 450, display 504, display 601), and the borders of the representations on the right side of FIGS. 6A-6D represent the boundaries of the display region that includes the virtual avatar. In some embodiments, the display region represented on the right side corresponds to an avatar display region (e.g., 620) of an application user interface (e.g., 615), such as a virtual avatar interface, message composition area, or message area (or a portion thereof) that may be presented in the context of, for example, a messaging application.

In some embodiments, the magnitude of a reaction of an avatar feature (e.g., a discrete element of the avatar that can be moved or modified discretely with respect to other avatar features) corresponds to a magnitude of a change in a physical feature of the user (e.g., a detected or tracked feature such as a user muscle, muscle group, or anatomical feature such as an eye or jaw). For example, the magnitude of the change in the physical feature is, in some embodiments, determined in accordance with a potential range of motion of the physical feature, wherein the magnitude is representative of a relative position of the physical feature within the range of motion (e.g., the predicted or modeled range of motion) of that physical feature. In such embodiments, the magnitude of the reaction of the avatar feature is similarly a relative position of the avatar feature within a range of motion of the avatar feature. In some embodiments, the magnitude of change is determined based on a comparison or measurement (e.g., a distance) of the starting position and ending position of the physical feature, through the change. In such embodiments, the change in the physical feature may be translated to a modification of the first avatar feature by applying the measured change in the physical feature to the avatar feature (e.g., directly or as a scaled or adjusted value).

In some embodiments, modifications to an avatar feature have both a magnitude component and a directional component, with the directional component of the modification in the avatar feature being based on a directional component of a change in one or more of the physical features (e.g., facial features of the user's face) to which the avatar feature reacts. In some embodiments, the direction of a reaction of an avatar feature corresponds (e.g., directly or inversely) to a relative direction of a change in a physical feature of the user, wherein the relative direction of the change in the physical feature is determined based on a direction of movement of the physical feature from an initial position (e.g., a neutral, resting position of the physical feature or, in some embodiments, a position of the physical feature that is initially detected by the device). In some embodiments, the direction of the reaction of the avatar feature corresponds directly (e.g., the physical feature moves up, the avatar feature also moves up) to the relative direction of the change in the physical feature. In other embodiments, the direction of the reaction of the avatar feature corresponds inversely (e.g., the physical feature moves up, the avatar feature moves down) to the relative direction of the change in the physical feature.

In some embodiments, the directional component of the change in the avatar feature is mirrored with respect to the directional component of the change in the physical feature. For example, when the physical feature (e.g., user's mouth) moves left, the avatar feature (e.g., avatar mouth) moves right. In some embodiments, the directional component of the change in the avatar feature is the same as the directional component of the change in the physical feature for movement along a vertical axis and mirrored for movement along a horizontal axis, similar to the effect seen when looking in a mirror. In some embodiments, a change in relative position of a physical feature (e.g., the user's iris or eyebrow) is in a direction determined from a neutral, resting position of the physical feature. For example, in some embodiments, the neutral, resting position of a user's iris is determined to be a particular position (e.g., centered) relative to the perimeter of the user's eyeball.

FIGS. 6A-6D illustrate user 610 in user states 611-1 through 611-12 and shark avatar 605 in avatar states 612-1 through 612-12. User 610 includes various detected physical features (e.g., facial features) including, for example, jaw 610-1, eyes 610-2, nose 610-3, cheeks 610-4, eyebrows 610-5, and head 610-6. In some embodiments, tracked physical features may include other facial features such as eyelids, lips, muscles, muscle groups, and so forth. Shark avatar 605 includes various shark avatar features including shark jaw 605-1, shark eyes 605-2, shark nose 605-3 (e.g., nostrils), shark tail 605-4, gills 605-5, pectoral fins 605-6, dorsal fin 605-7, torso 605-8, and gums 605-9. In some embodiments, various features of shark avatar 605 comprise a macro-feature of the shark, such as upper head portion 605-10 (see FIG. 6C). For example, in some embodiments, upper head portion 605-10 includes shark eyes 605-2, shark nose 605-3, and, optionally, upper jaw 605-11.

In the embodiments illustrated in FIGS. 6A-6D, the electronic device (e.g., 600) modifies shark avatar 605 based on one or more of: (1) behavioral characteristics that are used to define the shark avatar, and (2) changes detected in one or more physical features of user 610. Behavioral characteristics include modeled behavior of the virtual avatar that is determined for a specific avatar character. This modeled behavior can be dependent on detected changes in the physical features of the user (e.g., if detecting "X" change in user feature "Y," modify the avatar to do "Z") or independent of detected changes in the user (e.g., modify avatar to do "A" regardless of what changes are (or are not) detected in the user's physical features). In some embodiments, a behavioral characteristic that is independent of detected changes in the user is referred to herein as an "independent behavioral characteristic."

For example, in some embodiments, shark tail 605-4 is an avatar feature that moves (e.g., modified by the electronic device) based on an independent behavioral characteristic of shark avatar 605. Specifically, the independent behavioral characteristic is one in which shark tail 605-4 has a continuous side-to-side motion that simulates a shark's tail movement when swimming. The independence of this behavioral characteristic is demonstrated in FIGS. 6A-6D by illustrating embodiments in which shark tail 605-4 moves when no changes are detected in user 610 (e.g., FIG. 6A) and embodiments in which shark tail 605-4 continues to move when various changes are detected in user 610 (e.g., FIGS. 6B-6D). Thus, the electronic device modifies shark tail 605-4 to have a continuous side-to-side motion regardless of what changes are detected in user 610, when there are no detected changes in user 610, and even when user 610 is not detected at all (e.g., shark tail 605-4 continues moving even if face tracking fails).

In FIG. 6A, shark avatar 605 is shown having three displayed states (612-1, 612-2, and 612-3), with each of the three displayed states of shark avatar 605 corresponding, respectively, to three detected states of user 610 (611-1, 611-2, and 611-3). For example, the electronic device detects user 610 in a neutral pose in which user head 610-6 is facing forward, user jaw 610-1 is in a closed position, user eyes 610-2 and nose 610-3 are in a neutral, front-facing position (e.g., position of eyes and nose is not raised or turned to the side; eyes are looking forward and not up, down, or to the side), and user cheeks 610-4 and eyebrows 610-5 are in a neutral, resting position (e.g., cheeks are not puffed out and eyebrows are not raised or lowered). Based on the positions of these detected features of user 610, the electronic device displays shark avatar 605 having a neutral pose in which shark jaw 605-1 is closed; shark eyes 605-2 and nose 605-3 are in a neutral, front-facing position (e.g., position of eyes and nose is not raised or turned to the side; eyes are looking forward and not up, down, or to the side); gills 605-5, pectoral fins 605-6, dorsal fin 605-7, and torso 605-8 are in a neutral position (e.g., gills are not puffed out, all fins are relaxed and not rotated, lifted, curled, etc., and torso is not flexed to the side); and shark gums 605-9 are not displayed. This neutral pose of user 610 is maintained in user states 611-1 through 611-3, and the neutral pose of shark avatar 605 is maintained in avatar states 612-1 through 612-3. However, despite the neutral, constant pose of user 610 in user states 611-1 through 611-3, shark tail 605-4 is modified to have continuous movement as explained in greater detail below.

As discussed above, FIG. 6A illustrates an embodiment in which the electronic device (e.g., 600) detects no changes in user 610 (e.g., the electronic device does not detect any changes in user 610 in user states 611-1 through 611-3) and, therefore, maintains a constant appearance of the shark features that are mapped to the user's features (e.g., the electronic device forgoes modifying all shark avatar features except the tail, because there are no detected changes to user 610). The electronic device continues, however, to modify shark avatar 605 based on the independent behavioral characteristic in which shark tail 605-4 moves continuously from side-to-side (e.g., at a consistent frequency), as shown in avatar states 612-1 through 612-3. In this specific example, the electronic device displays shark avatar 605 having shark tail feature 605-4 that sways back and forth in avatar states 612-1 through 612-3, and no other changes are made to shark avatar 605 (shark avatar 605 maintains the neutral pose discussed above). The position of shark tail 605-4 in avatar states 612-1 through 612-3 (as well as avatar states 612-4 through 612-12) is an instant position of the tail for each respective avatar state. However, it should be understood that movement of shark tail 605-4 is continuous (e.g., a smooth animation of the tail moving side-to-side with an animated curving of the tail that simulates a shark's tail movement).

FIG. 6B illustrates an exemplary embodiment illustrating the electronic device (e.g., 600) modifying shark avatar 605 in response to detecting changes in facial features of user 610. Shark avatar 605 is shown having three displayed states (612-4, 612-5, and 612-6), with each of the three displayed states of shark avatar 605 corresponding, respectively, to three detected states of user 610 (611-4, 611-5, and 611-6). In each displayed state in FIG. 6B, the electronic device positions or modifies features of shark avatar 605 in response to detecting a position, or change in position, of one or more of the physical features, such as facial features, of user 610 detected in the respective states of the user shown in user states 611-4 through 611-6. In the embodiment shown in FIG. 6B, the electronic device detects user 610 in the same neutral position as shown in FIG. 6A, but with user eyes 610-2 shifted to the side. In response to detecting the changed position of user eyes 610-2, the electronic device modifies shark eyes 605-2 based on the changed position of user eyes 610-2.

For example, in user state 611-4, the electronic device detects user eyes 610-2 shifted to the right (e.g., from the perspective of the electronic device as shown in FIG. 6B) and modifies shark avatar 605 in avatar state 612-4 by shifting shark eyes 605-2 to the left (e.g., from the perspective of a user viewing shark avatar 605 as shown in FIG. 6B), effectively mirroring the movement of user eyes 610-2. In user state 611-5, the electronic device detects no changes from user state 611-4 and, therefore, maintains the position of shark avatar 605 in avatar state 612-5 (with the exception of shark tail 605-4, which continues to move independent of the detected changes to user 610). In user state 611-6, the electronic device detects user eyes 610-2 shifted to the left and modifies shark avatar 605 in avatar state 612-6 by shifting shark eyes 605-2 to the right to mirror movement of user eyes 610-2. In avatar states 612-4 through 612-6, the electronic device does not modify any other features of shark avatar 605 based on the detected change in user eyes 610-2. For example, shark jaw 605-1 remains in a closed position, and shark nose 605-3 remains in the neutral, front-facing position. Again, shark tail 605-4 continues moving, but the movement of the tail is not based on detected changes in user 610. In some embodiments, such as that shown in FIG. 6B, shark eyes 605-2 may be represented as an eyeball having an iris portion. In such embodiments, the shifting of shark eyes 605-2, in response to detected movement of user eyes 610-2, is a shift of the iris portion of the shark eye. In some embodiments, the shark eyes include only an eyeball that does not include a distinguished iris portion (e.g., the eyeball is solid black). In such embodiments, the shifting of the shark eyes is a shift of the entire eyeball.

FIG. 6C illustrates an exemplary embodiment illustrating the electronic device (e.g., 600) modifying shark avatar 605 in response to detecting changes in facial features of user 610. Shark avatar 605 is shown having three displayed states (612-7, 612-8, and 612-9), with each of the three displayed states of shark avatar 605 corresponding, respectively, to three detected states of user 610 (611-7, 611-8, and 611-9). In each displayed state in FIG. 6C, the electronic device positions or modifies features of shark avatar 605 in response to detecting a position, or change in position, of one or more of the physical features, such as facial features, of user 610 detected in the respective states of the user shown in user states 611-7 through 611-9. In the embodiment shown in FIG. 6C, the electronic device detects user 610 in the same neutral position as shown in FIG. 6A, but with user jaw 610-1 opening to various positions, while other features of user 610 (e.g., user eyes 610-2, user nose 610-3, and user head 610-6) remain stationary. In response to detecting the changed position of user jaw 610-1, the electronic device modifies shark jaw 605-1, shark eyes 605-2, and shark nose 605-3 based on the changed position of user jaw 610-1. As illustrated in avatar states 612-7 through 612-9, shark tail 605-4 continues moving independent of the detected changes to user 610.

In user state 611-7, the electronic device detects user 610 having a neutral position (e.g., the same neutral position shown in user state 611-1 of FIG. 6A). In response to detecting this neutral position of user 610, the electronic device displays shark avatar 605 (in avatar state 612-7) having the neutral position (e.g., the same neutral position shown in avatar state 612-1 of FIG. 6A, but with continued movement of shark tail 605-4). In the embodiments shown in FIG. 6C, vertical midpoint 604 and vertical midpoint 606 are shown as a vertical midpoints of user states 611-7 through 611-9 and avatar states 612-7 through 612-9, respectively. In user state 611-7, user jaw 610-1, user eyes 610-2, and user nose 610-3 have a vertical offset from vertical midpoint 604 that is represented by $J_0$, $E_0$, and $N_0$, respectively. In other words, $J_0$ represents a vertical distance between vertical midpoint 604 and an initial position of user jaw 610-1, $E_0$ represents a vertical distance between vertical midpoint 604 and the position of user eyes 610-2, and $N_0$ represents a vertical distance between vertical midpoint 604 and the position of user nose 610-3. In avatar state 612-7, shark eyes 605-2 and shark nose 605-3 have a vertical offset from vertical midpoint 606 that is represented by $e_0$ and $n_0$, respectively. In other words, $e_0$ represents a vertical distance between vertical midpoint 606 and an initial position of shark eyes 605-2, and no represents a vertical distance between vertical midpoint 606 and an initial position of shark nose 605-3.

In user state 611-8, the electronic device detects movement of user jaw 610-1 to an opened position and, in response, modifies shark avatar 605 in avatar state 612-8 by lowering shark jaw 605-1 (e.g., to match the lowered position of user jaw 610-1) and shifting the position of shark eyes 605-2 and shark nose 605-3 in an upward direction based on the movement of user jaw 610-1. The vertical offset of the downward shifted user jaw 610-1 is represented by $J_1$, which is increased (the absolute value of the vertical offset is increased) with respect to $J_0$. The positions of user eyes 610-2 and user nose 610-3 do not change and, therefore, maintain a vertical offset of $E_0$ and $N_0$, respectively. The vertical offset of the upward shifted shark eyes 605-2 and shark nose 605-3 is represented by $e_1$ and $n_1$, respectively, which are increased with respect to $e_0$ and $n_0$, respectively. The vertical offset of the lowered shark jaw 605-1 is represented by $j_1$, which is a vertical offset from vertical midpoint 606 that is in an opposite direction (e.g., downward) from vertical (e.g., upward) offsets $n_0$, $n_1$, $e_0$, and $e_1$. In some embodiments, vertical midpoint 606 also represents the original vertical position of shark jaw 605-1 (e.g., in avatar state 612-7, the vertical position of shark jaw 605-1 is equal to vertical midpoint 606). In some embodiments, the difference between $n_0$ and $n_1$ is equal to the difference between $e_0$ and $e_1$. In some embodiments, the difference between $n_0$ and $n_1$ is not equal to the difference between $e_0$ and $e_1$. In some embodiments, the difference between $n_0$ and $n_1$ is equal to $j_1$. In some embodiments, the difference between $e_0$ and $e_1$ is equal to $j_1$. In some embodiments, $J_J$ is equal to $j_1$. In some embodiments, $J_1$ is not equal to $j_1$ (e.g., $j_1$ is a scaled value of $J_1$). In some embodiments, the difference between $J_0$ and $J_1$ is equal to $j_1$. In some embodiments, the electronic device also modifies the shape of an upper head portion of shark avatar 605 to accommodate the shifted movement of shark eyes 605-2 and shark nose 605-3, as shown in the changes to upper head portion 605-10 of shark avatar 605 in avatar states 612-7 and 612-8. In some instances, modifying upper head portion 605-10 results in hiding varying amounts of dorsal fin 605-7, depending on the magnitude of the modification to upper head portion 605-10, as shown in avatar states 612-8 and 612-9. In some embodiments, the electronic device also modifies shark avatar 605 by moving upper jaw 605-11 (e.g., moving upper jaw in an upward direction based on the detected downward movement of user jaw 610-1).

In user state 611-9, the electronic device detects movement of user jaw 610-1 to an opened position that is greater than that shown in 611-8 and, in response, modifies shark avatar 605 in avatar state 612-9 by further lowering shark jaw 605-1 (e.g., to match the farther lowered position of user jaw 610-1 in user state 611-9) and further shifting the position of shark eyes 605-2 and shark nose 605-3 in an upward direction based on the additional movement of user jaw 610-1. The vertical offset of the lowered user jaw 610-1 is represented by $J_2$, which is increased with respect to $J_1$. The positions of user eyes 610-2 and user nose 610-3 do not change and, therefore, maintain a vertical offset of $E_0$ and $N_0$, respectively. The vertical offset of the shifted shark eyes 605-2 and shark nose 605-3 is represented by $e_2$ and $n_2$, respectively, which are increased with respect to $e_1$ and $n_1$, respectively. The vertical offset of the lowered shark jaw 605-1 is represented by $j_2$, which is increased (e.g., in a downward direction) with respect to $j_1$. In some embodiments, the difference between $n_1$ and $n_2$ is equal to the difference between $e_1$ and $e_2$. In some embodiments, the difference between $n_1$ and $n_2$ is not equal to the difference between $e_1$ and $e_2$. In some embodiments, the difference between $n_1$ and $n_2$ is equal to the difference between $j_1$ and $j_2$. In some embodiments, the difference between $e_1$ and $e_2$ is equal to the difference between $j_1$ and $j_2$. In some embodiments, the difference between $J_1$ and $J_2$ is equal to the difference between $j_1$ and $j_2$. In some embodiments, the electronic device also modifies the shape of an upper head portion of shark avatar 605 to accommodate the shifted movement of shark eyes 605-2 and shark nose 605-3, as shown in the changes to upper head portion 605-10 of shark avatar 605 in avatar states 612-7 and 612-8. In some embodiments, the electronic device also modifies shark avatar 605 by moving upper jaw 605-11 in an upward direction (e.g., compared to the position of upper jaw 605-11 in avatar state 612-8 and based on the detected downward movement of user jaw 610-1). In some embodiments, the electronic device modifies shark avatar 605 to display gums 605-9 as shown in avatar state 612-9 (e.g., in response to detecting movement of user jaw 610-1 beyond a threshold amount of downward movement (e.g., openness)). In some embodiments, in response to detecting user jaw 610-1 moving in a closing direction, the electronic device modifies shark avatar 605 by reversing the above-described movements of the avatar features (e.g., transitioning from the appearance in avatar state 612-9 to the appearance in avatar state 612-8; transitioning from the appearance in avatar state 612-8 to the appearance in avatar state 612-7).

In some embodiments, such as that shown in FIG. 6C, shark eyes 605-2 may be represented as an eyeball having an iris portion. In such embodiments, the shifting of shark eyes 605-2, in response to detected movement of user jaw 610-1, is a shift of the entire eyeball (including the iris portion), while maintaining a relative position of the iris portion in the eyeball. In some embodiments, the shark eyes include only an eyeball that does not include a distinguished iris portion (e.g., the eyeball is solid black). In such embodiments, the shifting of the shark eyes is a shift of the entire eyeball.

FIG. 6D illustrates an exemplary embodiment illustrating the electronic device (e.g., 600) modifying shark avatar 605 in response to detecting changes in facial features of user 610. Shark avatar 605 is shown having three displayed states (612-10, 612-11, and 612-12), with each of the three displayed states of shark avatar 605 corresponding, respectively, to three detected states of user 610 (611-10, 611-11, and 611-12). In each displayed state in FIG. 6D, the electronic device positions or modifies features of shark avatar 605 in response to detecting a position, or change in position, of one or more of the physical features, such as facial features, of user 610 detected in the respective states of the user shown in user states 611-10 through 611-12. In the embodiment shown in FIG. 6D, the electronic device detects user 610 in the same neutral position as shown in FIG. 6A, but with user head 610-6 turning to various positions. In response to detecting the changed position of user head 610-6, the electronic device modifies various features of shark avatar 605 based on the changed positions of user head 610-6. As illustrated in avatar states 612-10 through 612-12, shark tail 605-4 continues moving independent of the detected changes to user 610.

In user state 611-10, the electronic device detects user 610 having a neutral position (e.g., the same neutral position shown in user state 611-1 of FIG. 6A). In response to detecting this neutral position of user 610, the electronic device displays shark avatar 605 (in avatar state 612-10) having the neutral position (e.g., the same neutral position shown in avatar state 612-1 of FIG. 6A, but with continued movement of shark tail 605-4).

In user state 611-11, the electronic device detects a rightward rotation (e.g., from the perspective of the electronic device as shown in FIG. 6D) of user head 610-6 and, optionally, face (or various physical features comprising the face such as user jaw 610-1, user eyes 610-2, user nose 610-3, user cheeks 610-4, and user eyebrows 610-5). In response, the electronic device modifies shark avatar 605 by flexing shark torso 605-8 to the left (e.g., from the perspective of a user viewing shark avatar 605 as shown in FIG. 6D) and modifying the appearance of various avatar features based on the flexed position of shark avatar 605, as shown in avatar state 612-11. For example, the electronic device modifies shark torso 605-8 by flexing it to the left, effectively mirroring the rotation of user head 610-6. As shown in avatar state 612-11, the flexing of shark torso 605-8 includes rotating the position of the torso and attached features such as shark jaw 605-1, shark eyes 605-2, shark nose 605-3, gills 605-5, pectoral fins 605-6, and dorsal fin 605-7. Because shark torso 605-8 is flexed (e.g., rotated without affecting the displayed shark tail 605-4), various shark avatar features are hidden from view and, thus, the electronic device omits these features from shark avatar 605. For example, a portion of shark jaw 605-1 that was previously displayed in avatar state 612-10 is not displayed in avatar state 612-11. Similarly, only one shark eye 605-2, a portion of shark nose 605-3 (e.g., one nostril), a portion of pectoral fin 605-6B, and one set of gills 605-5 are displayed in avatar state 612-11. Conversely, portions of various shark features that were previously hidden from view are now displayed due to the rotation of shark torso 605-8. For example, a greater portion of shark torso 605-8, dorsal fin 605-7, and pectoral fin 605-6A is displayed due to the rotated position of shark torso 605-8.

In user state 611-12, the electronic device detects a leftward rotation (e.g., from the perspective of the electronic device as shown in FIG. 6D) of user head 610-6 and, optionally, face (or various physical features comprising the face such as user jaw 610-1, user eyes 610-2, user nose 610-3, user cheeks 610-4, and user eyebrows 610-5). In response, the electronic device modifies shark avatar 605 by flexing shark torso 605-8 to the right (e.g., from the perspective of a user viewing shark avatar 605 as shown in FIG. 6D) and modifying the appearance of various avatar features based on the flexed position of shark avatar 605, as shown in avatar state 612-12. It should be appreciated that the appearance of user 610 in user state 611-12 is a mirror image of the appearance of user 610 in user state 611-11. Therefore, the appearance of shark avatar 605 is modified in avatar state 612-12 to be a mirror image of the appearance of shark avatar 605 in avatar state 612-11. As illustrated in avatar states 612-10 through 612-12, shark tail 605-4 continues moving independent of the detected changes to user 610. That is, the flexing of shark torso 605-8 does not affect shark tail 605-4.

In the examples provided in FIGS. 6A-6D, the electronic device detects the user transitioning between various positions of the user's physical features, and then updates or modifies the virtual avatar (e.g., shark avatar) in accordance with the detected changes in the user's physical features. In these examples, the electronic device transitions display of the virtual avatar between various expressions and positions by maintaining characteristics of certain features of the virtual avatar and animating changes to other virtual avatar features. For example, as shown in FIG. 6B, the device maintains the position of shark jaw 605-1 while modifying other avatar features, such as shark eyes 605-2. It should be appreciated that while states of the avatar correspond to the respective detected states of the user (e.g., displayed avatar states 612-4 through 612-6 correspond to user states 611-4 through 611-6, respectively), the order of the detected user states (and resulting avatar states) is not limited to that shown in FIGS. 6A-6D. Accordingly, the user can change any physical features or assume any desired positions, and the electronic device modifies the virtual avatar in response to the detected changes, regardless of the order in which they occur.

For example, in addition to modifying the various avatar features as shown in FIG. 6C, the electronic device can further modify one or more of these features based on additional changes detected in user 610. For example, in response to detecting user 610 having the appearance shown in user state 611-8, the electronic device modifies shark avatar 605 to have the appearance shown in avatar state 612-8. If the electronic device then detects a rightward shift of user eyes 610-2 (e.g., similar to the eye shift shown in user state 611-4) while continuing to maintain the opened jaw position in user state 611-8, the electronic device modifies shark eyes 605-2 in avatar state 612-8 to have a leftward shift (e.g., the iris of shark avatar has a shift similar to that shown in avatar state 612-4), while maintaining the upward shifted position of shark eyes 605-2 and shark nose 605-3 and maintaining the position of the other avatar features (e.g., shark jaw 605-1, gills 605-5, fins 605-6 and 605-7, torso 605-8, upper head portion 605-10, and upper jaw 605-11) shown in avatar state 612-8.

In some embodiments, the electronic device can also modify shark avatar 605 in various manners other than those illustrated in FIGS. 6A-6D. For example, in response to detecting upward or downward movement of user eyebrows 610-5, the electronic device can modify pectoral fins 605-5 to move (e.g., curl) in an upward or downward direction based on the detected upward or downward movement of user eyebrows 610-5. As another example, the electronic device can modify gills 605-5 to expand and compress (similar to movement of a shark's gills when breathing) in response to detecting user cheeks 610-4 expanding (e.g., puffing out when filled with air) and returning to a neutral position (e.g., when the user lets the air out of their cheeks). As yet another example, in some embodiments, in response to detecting a translational movement of the position of user 610 in the field of view of the camera (e.g., 602) (e.g., the position of user 610 moves up, down, left, or right in the field of view of the camera), the electronic device modifies the displayed position of shark avatar 605 in the display region to mirror the movement of the position of user 610 in the field of view of the camera. For example, if the electronic device detects the user shifted downward in the field of view, the electronic device shifts the position of shark avatar 605 downward in the display region. In some embodiments, the electronic device fixes or anchors the position of shark avatar 605 such that the position of shark avatar 605 in the display region does not change in response to detected translational movement of the position of user 610.

FIGS. 6E and 6F depict an example embodiment in which device 600, having display 601 and camera 602, enables display of shark avatar 605 in a camera application user interface 615. Camera application interface 615 includes image display region 620, which displays a representation of image data such as, for example, streamed image data (e.g., a live camera preview, live camera recording, or live video communications session) representing objects positioned within a field-of-view of a camera (e.g., a rear-facing camera or camera 602), or a media item such as, for example, a photograph or a video recording. It should be appreciated that device 600 may display shark avatar 605 similarly in the context of various other applications such as, for example, a messaging application, a media viewer application, or a video communication application. Therefore, the display of shark avatar 605, as discussed with respect to FIGS. 6A-6F, should be understood to apply similarly to a virtual avatar displayed in the context of these other applications. For the sake of brevity, details of the display of the virtual avatar in these various other application is not discussed herein.

In the embodiment illustrated in FIG. 6E, image display region 620 shows live camera preview 620-1 from camera 602, showing a representation of subject 632 positioned in the field-of-view of camera 602 and background 636 displayed behind subject 632. In the embodiments discussed herein, subject 632 corresponds to user 610 discussed in FIGS. 6A-6D. As discussed herein, image data captured using camera 602 includes, in some embodiments, depth data that can be used to determine a depth of objects in the field-of-view of camera 602. In some embodiments, device 600 parses objects (e.g., in image data) based on a detected depth of those objects, and uses this determination to apply the visual effects (e.g., virtual avatars) discussed herein. For example, device 600 can categorize subject 632 as being in the foreground of the live camera preview 620-1 and objects positioned behind the user as being in the background of the live camera preview 620-1. These background objects are referred to generally herein as background 636.

In FIG. 6E, device 600 displays live camera preview 620-1 without shark avatar 605 (e.g., device 600 is operating in a mode in which visual effects have not been enabled, or the virtual avatar has not been selected for applying to the representation of subject 632). In FIG. 6F, however, device 600 displays live camera preview 620-1 with shark avatar 605 displayed over a portion (e.g., head) of the representation of subject 632 (e.g., visual effects have been enabled, or the virtual avatar has been selected for applying to the representation of subject 632). Specifically, shark avatar 605 is transposed onto the face of the subject in the image display region, while other portions of the image in image display region 620 (such as a background or other portions of the user, such as their body) remain displayed. A user (e.g., subject 632) positioned in the field-of-view of camera 602 can control visual aspects of shark avatar 605 by changing the pose (e.g., rotation or orientation) of their face, including moving various facial features (e.g., winking, sticking out their tongue, smiling, etc.), as discussed in greater detail with respect to FIGS. 6A-6D.

In some embodiments, portions of shark avatar 605 are conditionally displayed based on a simulated position (e.g., depth) of the avatar portions relative to a depth and/or position of the subject in the field of view of camera 602. For example, in FIG. 6F, device 600 omits shark tail 605-4 from shark avatar 605, because shark tail 605-4 is positioned behind the representation of subject 632, and therefore, is not visible to a user viewing display 601. In some embodiments, portions of shark tail 605-4 can be displayed if the simulated relative position of the tail changes such that the tail becomes visible based on an updated relative position of the tail with respect to the representation of the subject 632. For example, if the user turns their head to the side and the resulting flexing of shark torso 605-8 results in a position change that reveals a portion of shark tail 605-4, then shark tail 605-4 may be displayed. In such instances, the continual motion of shark tail 605-4 is maintained, even if it results in intermittent visibility of the tail (e.g., caused by the continuous tail motion).

FIG. 7 is a flow diagram illustrating a method for displaying visual effects using an electronic device in accordance with some embodiments. Method 700 is performed at a device (e.g., 100, 300, 500, 600) with one or more cameras (e.g., 602) and a display (e.g., 601). Some operations in method 700 are, optionally, combined, the orders of some operations are, optionally, changed, and some operations are, optionally, omitted.

As described below, method 700 provides an intuitive way for displaying visual effects such as virtual avatars. The method reduces the cognitive burden on a user for generating, modifying, and controlling virtual avatars, thereby creating a more efficient human-machine interface. For battery-operated computing devices, enabling a user to control the virtual avatar faster and more efficiently conserves power and increases the time between battery charges.

The electronic device (e.g., 600) displays (702), via the display apparatus (e.g., 601), a virtual avatar (e.g., shark avatar 605) (e.g., a representation of the user that can be graphically depicted) having a plurality of avatar features (e.g., shark jaw 605-1, shark eyes 605-2, shark nose 605-3, shark tail 605-4, gills 605-5, pectoral fins 605-6, dorsal fin 605-7, shark torso 605-8, shark gums 605-9, upper head portion 605-10, upper jaw 605-11) (e.g., facial features (e.g., eyes, mouth, part of mouth (gums, tongue), teeth); e.g., a body part (e.g., fins, tail, gills); e.g., a macro feature (e.g., head, neck, body)) that change appearance in response to detected changes in pose (e.g., orientation, translation) (e.g., a change in a facial expression) of a face in a field of view of the one or more cameras (e.g., 602). In some embodiments, the virtual avatar includes an avatar face having one or more avatar features (e.g., avatar facial features). In some embodiments, the avatar features correspond (e.g., are mapped) to one or more physical features of a user's face such that detected movement of the user's physical feature (s) affects the avatar feature (e.g., affects the graphical representation of the features). In some embodiments, an avatar feature anatomically corresponds to a physical feature (e.g., the avatar feature is modelled based on one or more of the location, movement characteristics, size, color, and/or shape of the physical feature) (e.g., the avatar feature and physical feature are both eyebrows). In some embodiments, an avatar feature does not anatomically correspond (e.g., is anatomically distinct or anatomically corresponds to a different physical feature) to a physical feature (e.g., the avatar feature corresponds to a shark fin (e.g., 605-6) and the physical feature corresponds to a user's eyebrow (e.g., 610-5)). In some embodiments, the virtual avatar is non-photorealistic. In some embodiments, the avatar is an anthropomorphic construct such as stylized animal (e.g., shark).

In method 700, electronic device (e.g., 600) displays (704) the plurality of avatar features including: a first avatar feature (e.g., shark jaw 605-1) (e.g., a jaw; e.g., a lower jaw and, optionally, an upper jaw portion such as upper teeth and/or upper gums); a second avatar feature (e.g., shark eyes 605-2) (e.g., avatar eyes) different from the first avatar feature; and a third avatar feature (e.g., an avatar nose) (e.g., shark nose 605-3) different from the first and second avatar features. In some embodiments, the second and third avatar features form a first portion of the avatar such as a head portion (e.g., upper head portion 605-10) that does not include the first avatar feature (e.g., a lower jaw)).

In method 700, while the face is detected in the field of view of the one or more cameras (e.g., 602), the face including a plurality of detected facial features including a first facial feature (e.g., jaw 610-1 of user 610; e.g., a lower jaw that does not include the upper jaw, upper lip, upper teeth, upper gums, or nose) (e.g., the first facial feature corresponds (e.g., anatomically) to the first avatar feature) (e.g., the first avatar feature is a graphical representation of the first facial feature) (e.g., the first facial feature is a jaw of the user and the first avatar feature is jaw of the avatar) and a second facial feature (e.g., user eyes 610-2) (e.g., one or more of the user's eyes) (e.g., the second facial feature corresponds (e.g., anatomically) to the second avatar feature) (e.g., the second avatar feature is a graphical representation of the second facial feature) (e.g., the second facial feature is one or more of the user's eyes and the second avatar feature is one or more avatar eyes) different from the first facial feature, the electronic device (e.g., 600) detects (706) movement of one or more facial features of the face.

In some embodiments, in response to detecting the movement of the one or more facial features, and in accordance with a determination that the detected movement of the one or more facial features includes movement of the first facial feature (e.g., user jaw 610-1) in a third direction (e.g., the second direction; e.g., a direction different from (e.g., opposite from) the first direction; e.g., movement of the first facial feature in an upward direction such as upward movement of a jaw based on closing of a mouth), the electronic device (e.g., 600) moves the second avatar feature (e.g., shark eyes 605-2) and the third avatar feature (e.g., shark nose 605-3) in a fourth direction different (e.g., opposite) from the third direction and based on (e.g., based on a magnitude of) the detected movement of the first facial feature in the third direction. Moving the second avatar feature and the third avatar feature in the fourth direction different from the third direction and based on the detected movement of the first facial feature in the third direction provides the user with feedback indicating that movement of the first facial feature in various directions will cause the device to modify the respective second and third avatar features in different various directions than those in which the first facial feature moves. This provides a control scheme for operating a virtual avatar on a display of an electronic device, wherein the system detects and processes input in the form of changes to facial features of a user (and the magnitude and/or direction of those changes), including the first facial feature that does not correspond to the second and third avatar features, and through an iterative feedback loop provides the desired output in the form of the appearance of the virtual avatar, while eliminating the need for manual handling of the user interface (e.g., providing touch inputs on the display). This provides improved visual feedback to the user regarding how to manipulate the display to control the virtual avatar using facial movements. This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation can be done in real time during, for example, a conversation such as a text conversation or a video conversation, whereas manual animation of an avatar would have to be done before the conversation started or after it had ended.

In some embodiments, further in accordance with the determination that the detected movement of the one or more facial features includes movement of the first facial feature (e.g., user jaw 610-1) in the third direction, the electronic device (e.g., 600) moves the first avatar feature (e.g., shark jaw 605-1) (e.g., avatar lower jaw) in the third direction based on (e.g., based on a magnitude of) the detected movement of the first facial feature in the third direction. Moving the first avatar feature in the third direction based on the detected movement of the first facial feature in the third direction provides the user with feedback indicating that further movement of the same first facial feature in various directions will cause the device to further modify the respective first avatar feature in the same various directions. This provides a control scheme for operating a virtual avatar on a display of an electronic device, wherein the system detects and processes input in the form of changes to facial features of a user (and the magnitude and/or direction of those changes), including the first facial feature, and through an iterative feedback loop provides the desired output in the form of the appearance of the virtual avatar, while eliminating the need for manual handling of the user interface (e.g., providing touch inputs on the display). This provides improved visual feedback to the user regarding how to manipulate the display to control the virtual avatar using facial movements. This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation can be done in real time during, for example, a conversation such as a text conversation or a video conversation, whereas manual animation of an avatar would have to be done before the conversation started or after it had ended.

In method 700, the electronic device (e.g., 600) performs (708) one or more of the items described below in response to detecting the movement of the one or more facial features.

In accordance with a determination (710) that the detected movement of the one or more facial features includes movement of the first facial feature (e.g., user jaw 610-1) in a first direction (e.g., movement of the first facial feature in a downward direction such as downward movement of a jaw based on opening of a mouth), the electronic device (e.g., 600) performs one or more of the steps discussed below with respect to elements 712 and 714 of method 700. In some embodiments, the detected movement of the first facial feature has both a directional component and a magnitude component. In some embodiments, modifications to an avatar feature have both a magnitude component and a directional component. In some embodiments, the directional component of the modification in the avatar feature is based on a directional component of a change in the one or more physical features (e.g., facial features of the user's face) that the avatar feature is reactive to. In some embodiments, the directional component of the change in the avatar feature is the same as the directional component of the change in the physical feature. For example, when the physical feature (e.g., jaw) moves down, the corresponding (e.g., reactive) avatar feature (e.g., avatar jaw) moves down. In some embodiments, the directional component of the change in the avatar feature is mirrored with respect to the directional component of the change in a corresponding physical feature (e.g., the physical feature for which the avatar feature is reactive to detected changes). For example, when the physical feature (e.g., a user's eye (e.g., iris)) moves left, the reactive avatar feature (e.g., avatar eye (e.g., iris)) moves right. In some embodiments, the directional component of the change in the avatar feature is the same as the directional component of the change in the corresponding physical feature for movement along a vertical axis and mirrored for movement along a horizontal axis, similar to the effect seen when looking in a mirror. In some embodiments, a change in relative position of a physical feature (e.g., the user's iris or eyebrow) is in a direction determined from a neutral, resting position of the physical feature. In some embodiments, the neutral, resting position of a user's iris is determined to be a particular position (e.g., centered) relative to the perimeter of the user's eyeball. In some embodiments, the direction of a reaction of an avatar feature corresponds (e.g., directly or inversely) to a relative direction of a change in a physical feature of the user. In some embodiments, the relative direction of the change in the physical feature is determined based on a direction of movement of the physical feature from a neutral, resting position of the physical feature. In some embodiments, the direction of the reaction of the avatar feature corresponds directly (e.g., the physical feature moves up, the avatar feature moves up) to the relative direction of the change in the physical feature. In some embodiments, the direction of the reaction of the avatar feature corresponds inversely (e.g., the physical feature moves up, the avatar feature moves down) to the relative direction of the change in the physical feature.

In some embodiments, the first facial feature is a jaw (e.g., user jaw 610-1) (e.g., a lower jaw) of the user (e.g., user 610); the first avatar feature is an avatar jaw feature (e.g., shark jaw 605-1) (e.g., a lower avatar jaw); the second avatar feature is one or more avatar eyes (e.g., shark eyes 605-2); and the third avatar feature is an avatar nose (e.g., shark nose 605-3).

In response to detecting the movement of the one or more facial features, and in accordance with the determination that the detected movement of the one or more facial features includes movement of the first facial feature (e.g., user jaw 610-1) in the first direction, the electronic device (e.g., 600) moves (712) the first avatar feature (e.g., shark jaw 605-1) in the first direction based on (e.g., based on a magnitude) the detected movement of the first facial feature in the first direction (e.g., a position of the first avatar feature (e.g., avatar jaw) is determined based on the detected movement of the first facial feature (e.g., the user's jaw). Moving the first avatar feature in the first direction based on the detected movement of the first facial feature in the first direction provides the user with feedback indicating that further movement of the same first facial feature will cause the device to further modify the respective first avatar features in the first direction. This provides a control scheme for operating a virtual avatar on a display of an electronic device, wherein the system detects and processes input in the form of changes to facial features of a user (and the magnitude and/or direction of those changes), including the first facial feature, and through an iterative feedback loop provides the desired output in the form of the appearance of the virtual avatar, while eliminating the need for manual handling of the user interface (e.g., providing touch inputs on the display). This provides improved visual feedback to the user regarding how to manipulate the display to control the virtual avatar using facial movements. This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation can be done in real time during, for example, a conversation such as a text conversation or a video conversation, whereas manual animation of an avatar would have to be done before the conversation started or after it had ended.

In some embodiments, the direction of movement of the first avatar feature (e.g., shark jaw 605-1) is in a same direction (e.g., downward) as the detected movement of the first facial feature (e.g., user jaw 610-1). In some embodiments, the movement of the first avatar feature has a magnitude (e.g., an amount of movement) of movement in the same direction that is determined based on (e.g., based on a proportional amount of movement of the feature with respect to a range of motion available for the respective feature) the magnitude of movement of the first facial feature as the first facial feature moves in the first direction. In some embodiments, the magnitude of a change in an avatar feature corresponds to a magnitude of a change in a physical feature of the user. In some embodiments, the magnitude of the change in the physical feature is determined in accordance with a potential range of motion of the physical feature, wherein the magnitude is representative of a relative position of the physical feature within the range of motion (e.g., the predicted or modeled range of motion) of that physical feature. In such embodiments, the magnitude of the reaction (e.g., change in position) of the avatar feature is similarly a relative position of the avatar feature within a range of motion of the avatar feature. In some embodiments, the magnitude of change is determined based on a comparison or measurement (e.g., a distance) of the starting position and ending position of the physical feature, through the change. In such embodiments, the change in the physical feature (e.g., first facial feature) is translated to a modification of the first avatar feature by applying the measured change in the physical feature to the avatar feature (e.g., directly or as a scaled or adjusted value).

In some embodiments, moving the first avatar feature (e.g., shark jaw 605-1) in the first direction based on the detected movement of the first facial feature (e.g., user jaw 610-1) in the first direction includes: in accordance with a determination that the detected movement of the first facial feature is less than or equal to a second threshold amount of movement of the first facial feature (e.g., the detected movement (e.g., a degree of change in the position of the first facial feature) of the user's jaw is less than a threshold amount of movement (e.g., less than 75% of a range of openness (e.g., a maximum open position) of the user's mouth) (e.g., user state 611-8), moving the first avatar feature in the first direction (e.g., in a downward direction) by a first amount (e.g., a first magnitude of movement) determined based on the detected movement of the first facial feature (e.g., moving the lower avatar jaw portion downward in response to downward movement of the user's jaw) (e.g., avatar state 612-8). In some embodiments, when movement of the first facial feature (e.g., the user's jaw) is within a first range of movement (e.g., less than 75% of a maximum open position of the user's mouth), the first avatar feature is reactive to movement of the first facial feature (e.g., mirroring movement of the first facial feature). For example, when a user opens their mouth (e.g., downward movement of the user's lower jaw) by less than 75% of a maximum open position of the user's mouth (e.g., less than 75% of a maximum downward position of the user's lower jaw) (e.g., user state 611-8), an avatar lower jaw portion moves in the same downward direction as the user's lower jaw when opening (e.g., avatar state 612-8).

In some embodiments, moving the first avatar feature (e.g., shark jaw 605-1) in the first direction based on the detected movement of the first facial feature (e.g., user jaw 610-1) in the first direction further includes: in accordance with a determination that the detected movement of the first facial feature is greater than the second threshold amount of movement of the first facial feature: moving the first avatar feature in the first direction by a second amount of movement greater than the first amount of movement, and displaying a first subfeature (e.g., shark gums 605-9) (e.g., avatar gums) of the first avatar feature that was not displayed when the movement of the first facial feature was less than the second threshold amount of movement (e.g., in FIG. 6C, shark gums 605-9 are not displayed in avatar state 612-8, but are displayed in avatar state 612-9) (e.g., avatar gums are displayed on the avatar jaws when the detected movement of the first facial feature is greater than the threshold amount of movement). In some embodiments, when movement of the first facial feature (e.g., the user's jaw) is within a second range of movement (e.g., greater than 75% of a maximum open position of the user's mouth) (e.g., user state 611-9), the first avatar feature is reactive to movement of the first facial feature (e.g., mirroring movement of the first facial feature), and the avatar (e.g., shark avatar 605) is modified to introduce gums or additional teeth on the jaws of the avatar. For example, when a user opens their mouth by more than 75% of a maximum open position of the user's mouth (e.g., user state 611-9), the avatar jaw moves in the same downward direction as the user's lower jaw when opening, but the avatar jaws are modified to display the avatar's gums and/or additional teeth (e.g., avatar state 612-9). In some embodiments, the avatar's mouth has a first range of openness when the user's mouth is opened less than or equal to the threshold position, and has a second range of openness (greater than the first range of openness) when the user's mouth is opened greater than the threshold position. In some embodiments, the avatar is a shark, and this introduction of the gums on the avatar shark's jaws mimic a behavior in which a shark's jaws open wide (e.g., to attack prey) revealing additional parts of the shark's mouth.

Moving the first avatar feature in the first direction by the first or second amount determined based on the detected movement of the first facial feature compared to a threshold amount of movement for the first facial feature, and further displaying the first subfeature of the first avatar feature when the detected movement of the first facial feature is greater than the threshold amount of movement, provides the user with feedback indicating that different amounts of movement of the first facial feature will cause the device to modify the first avatar feature differently depending on whether the amount of movement of the first facial feature is above or below the threshold amount of movement. This provides a control scheme for operating a virtual avatar on a display of an electronic device, wherein the system detects and processes input in the form of changes to facial features of a user (and the magnitude and/or direction of those changes), including the first facial feature, and through an iterative feedback loop provides the desired output in the form of the appearance of the virtual avatar, while eliminating the need for manual handling of the user interface (e.g., providing touch inputs on the display). This provides improved visual feedback to the user regarding how to manipulate the display to control the virtual avatar using facial movements. This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation can be done in real time during, for example, a conversation such as a text conversation or a video conversation, whereas manual animation of an avatar would have to be done before the conversation started or after it had ended.

In response to detecting the movement of the one or more facial features, and in accordance with the determination that the detected movement of the one or more facial features includes movement of the first facial feature (e.g., user jaw 610-1) in the first direction, the electronic device (e.g., 600) moves (714) the second avatar feature (e.g., shark eyes 605-2) and the third avatar feature (e.g., shark nose 605-3) in a second direction different (e.g., opposite) from the first direction and based on (e.g., based on a magnitude of) the detected movement of the first facial feature in the first direction (e.g., a position of the second avatar feature (e.g., the avatar eyes) is determined based on the detected movement of the first facial feature (e.g., the user's jaw)). Moving the second avatar feature and the third avatar feature in the second direction different from the first direction and based on the detected movement of the first facial feature in the first direction provides the user with feedback indicating that further movement of the same first facial feature will cause the device to further modify the respective second and third avatar features in the second direction different from the first direction. This provides a control scheme for operating a virtual avatar on a display of an electronic device, wherein the system detects and processes input in the form of changes to facial features of a user (and the magnitude and/or direction of those changes), including the first facial feature that does not correspond to the second and third avatar features, and through an iterative feedback loop provides the desired output in the form of the appearance of the virtual avatar, while eliminating the need for manual handling of the user interface (e.g., providing touch inputs on the display). This provides improved visual feedback to the user regarding how to manipulate the display to control the virtual avatar using facial movements. This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation can be done in real time during, for example, a conversation such as a text conversation or a video conversation, whereas manual animation of an avatar would have to be done before the conversation started or after it had ended.

In some embodiments, the direction of movement of the second avatar feature (e.g., avatar eyes) (e.g., shark eyes 605-2) is in a substantially opposite direction from the detected movement of the first avatar feature (e.g., avatar jaw) (e.g., shark jaw 605-1), but has a magnitude (e.g., an amount) of movement in the opposite direction that is determined based on the magnitude of movement of the first facial feature as the first facial feature moves in the first direction (e.g., a position of the third avatar feature (e.g., the avatar nose) is determined based on the detected movement of the first facial feature (e.g., the user's jaw)). In some embodiments, the direction of movement of the third avatar feature (e.g., avatar nose) (e.g., shark nose 605-3) is in a substantially opposite direction from the detected movement of the first avatar feature (e.g., avatar jaw), but has a magnitude (e.g., an amount) of movement in the opposite direction that is determined based on the magnitude of movement of the first facial feature as the first facial feature moves in the first direction. In some embodiments, the positions of both the second and third avatar features move simultaneously in the second direction in response to detecting movement of the first facial feature in the first direction (e.g., as the user's jaw moves in a downward direction, the avatar eyes and avatar nose both move in an upward direction).

In response to detecting the movement of the one or more facial features, and in accordance with a determination (716) that the detected movement of the one or more facial features includes movement of the second facial feature (e.g., user eyes 610-2) (e.g., without detected movement of the first facial feature (e.g., user jaw 610-1)), the electronic device (e.g., 600) moves (718) the second avatar feature (e.g., shark eyes 605-2) (e.g., avatar eyes) based on at least one of a direction and a magnitude of movement of the second facial feature. Moving the second avatar feature based on at least one of the direction and the magnitude of movement of the second facial feature provides the user with feedback indicating that further movement of the same second facial feature will cause the device to further modify the respective second avatar feature based on at least one of the direction and magnitude of the further movement of the second facial feature. This provides a control scheme for operating a virtual avatar on a display of an electronic device, wherein the system detects and processes input in the form of changes to facial features of a user (and the magnitude and/or direction of those changes), including the second facial feature, and through an iterative feedback loop provides the desired output in the form of the appearance of the virtual avatar, while eliminating the need for manual handling of the user interface (e.g., providing touch inputs on the display). This provides improved visual feedback to the user regarding how to manipulate the display to control the virtual avatar using facial movements. This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation can be done in real time during, for example, a conversation such as a text conversation or a video conversation, whereas manual animation of an avatar would have to be done before the conversation started or after it had ended.

In some embodiments, method 700 further includes: in response to detecting the movement of the one or more facial features and in accordance with a determination that the detected movement of the one or more facial features includes movement of the second facial feature (e.g., user eyes 610-2) without more than a first threshold amount of movement of the first facial feature (e.g., user jaw 610-1) (e.g., without detected movement of the first facial feature; e.g., with a nominal amount of detected movement of the first facial feature) (e.g., see FIG. 6B), the electronic device (e.g., 600) moves the second avatar feature (e.g., avatar eyes) based on at least one of the direction and the magnitude of movement of the second facial feature; and foregoes moving the first and third avatar features (e.g., as shown in FIG. 6B). Moving the second avatar feature based on at least one of the direction and the magnitude of the movement of the second facial feature without more than the first threshold amount of movement of the first facial feature and foregoing movement of the first and third avatar features provides the user with feedback indicating that isolated movement of the second facial feature will cause the device to modify the second avatar feature without also modifying the first and third avatar features. This provides a control scheme for operating a virtual avatar on a display of an electronic device, wherein the system detects and processes input in the form of changes to facial features of a user (and the magnitude and/or direction of those changes), including the second facial feature (without a threshold amount of movement of the first facial feature), and through an iterative feedback loop provides the desired output in the form of the appearance of the virtual avatar, while eliminating the need for manual handling of the user interface (e.g., providing touch inputs on the display). This provides improved visual feedback to the user regarding how to manipulate the display to control the virtual avatar using facial movements. This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation can be done in real time during, for example, a conversation such as a text conversation or a video conversation, whereas manual animation of an avatar would have to be done before the conversation started or after it had ended.

In some embodiments, method 700 further includes: in response to detecting the movement of the one or more facial features and in accordance with a determination that the detected movement of the one or more facial features includes movement of the first facial feature (e.g., user jaw 610-1) (e.g., in the first direction) without more than a second threshold amount of movement of the second facial feature (e.g., user eyes 610-2) and a third facial feature (e.g., user nose 610-3) (e.g., the user's nose) (e.g., an affirmative determination that the second and third facial features do not move), the electronic device (e.g., 600) moves the second avatar feature (e.g., shark eyes 605-2) and the third avatar feature (e.g., shark nose 605-3) based on the detected movement of the first facial feature (e.g., moving the second avatar feature and the third avatar feature in a direction different (e.g., opposite) from the direction of movement of the first facial feature and based on (e.g., based on a magnitude of) the detected movement of the first facial feature). Moving the second and third avatar features based on the detected movement of the first facial feature without more than the second threshold amount of movement of the second facial feature and the third facial feature provides the user with feedback indicating that isolated movement of the first facial feature will cause the device to modify the second and third avatar features based on the movement of the first facial feature. This provides a control scheme for operating a virtual avatar on a display of an electronic device, wherein the system detects and processes input in the form of changes to facial features of a user (and the magnitude and/or direction of those changes), including the first facial feature (without a threshold amount of movement of the second and third facial features), and through an iterative feedback loop provides the desired output in the form of the appearance of the virtual avatar, while eliminating the need for manual handling of the user interface (e.g., providing touch inputs on the display). This provides improved visual feedback to the user regarding how to manipulate the display to control the virtual avatar using facial movements. This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation can be done in real time during, for example, a conversation such as a text conversation or a video conversation, whereas manual animation of an avatar would have to be done before the conversation started or after it had ended.

In some embodiments, method 700 further includes: in response to detecting the movement of the one or more facial features and in accordance with a determination that the detected movement of the one or more facial features includes movement of both the first and second facial features (e.g., user jaw 610-1, user eyes 610-2) (e.g., movement of both the user's jaw and one or more of the user's eyes), the electronic device (e.g., 600) moves the first avatar feature (e.g., shark jaw 605-1) (e.g., the avatar jaw) based on the detected movement of the first facial feature (e.g., based on a direction and/or magnitude of movement of the user's jaw) (e.g., without being based on movement of the second facial feature); and moves the second avatar feature (e.g., shark eyes 605-2) (e.g., one or more of the avatar's eyes) based on the detected movement of the first and second facial features (e.g., based on a direction and/or magnitude of movement of the user's eye(s) and based on a direction and/or magnitude of movement of the user's jaw). Moving the first avatar feature based on the detected movement of the first facial feature and moving the second avatar feature based on the detected movement of the first and second facial features provides the user with feedback indicating that further movement of the same first and second facial features will cause the device to further modify the respective first avatar feature based on the further movement of the first facial feature and further modify the respective second avatar feature based on the further movement of the first and second facial features. This provides a control scheme for operating a virtual avatar on a display of an electronic device, wherein the system detects and processes input in the form of changes to facial features of a user (and the magnitude and/or direction of those changes), including the first and second facial features, and through an iterative feedback loop provides the desired output in the form of the appearance of the virtual avatar, while eliminating the need for manual handling of the user interface (e.g., providing touch inputs on the display). This provides improved visual feedback to the user regarding how to manipulate the display to control the virtual avatar using facial movements. This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation can be done in real time during, for example, a conversation such as a text conversation or a video conversation, whereas manual animation of an avatar would have to be done before the conversation started or after it had ended.

In some embodiments, method 700 further includes: in response to detecting the movement of the one or more facial features, performing one or more of the following items. In accordance with a determination that the detected movement of the one or more facial features includes movement of the first facial (e.g., user jaw 610-1) feature by a first magnitude (e.g., a first amount of movement; e.g., an amount of movement of the first facial feature in a downward direction such as downward movement of a jaw based on opening of a mouth from a closed position to a 25% opened position), moving the second avatar feature (e.g., shark eyes 605-2) and the third avatar feature (e.g., shark nose 605-3) by a first amount of movement (e.g., a same amount of movement for both the second avatar feature and the third avatar feature) (e.g., a first amount of movement that is proportional (e.g., scaled or directly) to the magnitude of the first magnitude of movement of the first facial feature). In accordance with a determination that the detected movement of the one or more facial features includes movement of the first facial feature by a second magnitude different from the first magnitude (e.g., a second amount of movement; e.g., an amount of movement of the first facial feature in a downward direction such as downward movement of a jaw based on opening of a mouth from a closed position to a half-opened position), moving the second avatar feature and the third avatar feature by a second amount of movement that is different from the first amount of movement (e.g., a same amount of movement for both the second avatar feature and the third avatar feature) (e.g., a second amount of movement that is proportional (e.g., scaled or directly) to the magnitude of the second magnitude of movement of the first facial feature) (e.g., magnitude of movement of second and third avatar features is proportional to the magnitude of movement of the user's jaw. In some embodiments, the magnitude of movement of the second and third avatar features are the same when jaw movement occurs without independent movement of facial features that are separately mapped to the second and/or third avatar features.

Moving the second and third avatar features by the first and second amounts of movement depending on whether detected movement of the first facial feature is by a first magnitude or second magnitude provides the user with feedback indicating that movement of the first facial feature by different magnitudes will cause the device to modify the respective second and third avatar features by different amounts determined based on the different magnitudes of movement of the first facial feature. This provides a control scheme for operating a virtual avatar on a display of an electronic device, wherein the system detects and processes input in the form of changes to facial features of a user (and the magnitude and/or direction of those changes), including the first facial feature that does not correspond to the second and third avatar features, and through an iterative feedback loop provides the desired output in the form of the appearance of the virtual avatar, while eliminating the need for manual handling of the user interface (e.g., providing touch inputs on the display). This provides improved visual feedback to the user regarding how to manipulate the display to control the virtual avatar using facial movements. This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation can be done in real time during, for example, a conversation such as a text conversation or a video conversation, whereas manual animation of an avatar would have to be done before the conversation started or after it had ended.

In some embodiments, method 700 further includes: further in accordance with a determination that the detected movement of the one or more facial features includes movement of the first facial feature (e.g., user jaw 610-1) by the first magnitude, moving the first avatar feature (e.g., shark jaw 605-1) by a third amount of movement (e.g., an amount of movement that corresponds to (e.g., is equal to) the amount of movement of the first facial feature) (e.g., an amount of movement that is proportional (e.g., scaled or directly) to the first magnitude of the movement of the first facial feature); and further in accordance with a determination that the detected movement of the one or more facial features includes movement of the first facial feature by the second magnitude, moving the first avatar feature by a fourth amount of movement different from the third amount of movement (e.g., an amount of movement that corresponds to (e.g., is equal to) the amount of movement of the first facial feature) (e.g., an amount of movement that is proportional (e.g., scaled or directly) to the second magnitude of the movement of the first facial feature). Moving the first avatar feature by the third or fourth amounts of movement depending on whether detected movement of the first facial feature is by the first or second magnitude provides the user with feedback indicating that movement of the first facial feature by different magnitudes will cause the device to modify the respective first avatar feature by different amounts determined based on the different magnitudes of movement of the first facial feature. This provides a control scheme for operating a virtual avatar on a display of an electronic device, wherein the system detects and processes input in the form of changes to facial features of a user (and the magnitude and/or direction of those changes), including the first facial feature, and through an iterative feedback loop provides the desired output in the form of the appearance of the virtual avatar, while eliminating the need for manual handling of the user interface (e.g., providing touch inputs on the display). This provides improved visual feedback to the user regarding how to manipulate the display to control the virtual avatar using facial movements. This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation can be done in real time during, for example, a conversation such as a text conversation or a video conversation, whereas manual animation of an avatar would have to be done before the conversation started or after it had ended.

In some embodiments, the electronic device (e.g., 600) detects a change in pose (e.g., position and/or orientation) of the face within the field of view of the one or more cameras (e.g., 602). In response to detecting the change in pose of the face, the electronic device changes an appearance of the virtual avatar (e.g., shark avatar 605). In some embodiments, changing the appearance of the virtual avatar includes: in accordance with a determination that the change in pose of the face includes a first type of change in pose of the face (e.g., a change in orientation of the face; e.g., the user shaking or turning their head to the side or nodding or tilting their head up or down) (e.g., user states 611-11 or 611-12), changing the appearance of the virtual avatar includes moving a first portion (e.g., a shark head portion of a shark avatar (e.g., upper head portion 605-10)) (in some embodiments, the first portion optionally includes one or more fins (e.g., pectoral fins 605-6; dorsal fin 605-7)) of the virtual avatar relative to a second portion (e.g., a shark torso portion of a shark avatar (e.g., 605-8)) (e.g., avatar states 612-11 or 612-12). Moving the first portion of the virtual avatar relative to the second portion when the change in pose of the face is a first type of change in pose provides the user with feedback indicating that different types of changes in pose of the face will cause the device to modify various portions of the virtual avatar differently depending on the types of changes in pose of the face. This provides a control scheme for operating a virtual avatar on a display of an electronic device, wherein the system detects and processes input in the form of types of changes to facial features of a user (and the magnitude and/or direction of those changes), and through an iterative feedback loop provides the desired output in the form of the appearance of the virtual avatar, while eliminating the need for manual handling of the user interface (e.g., providing touch inputs on the display). This provides improved visual feedback to the user regarding how to manipulate the display to control the virtual avatar using facial movements. This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation can be done in real time during, for example, a conversation such as a text conversation or a video conversation, whereas manual animation of an avatar would have to be done before the conversation started or after it had ended.

In some embodiments, the second portion optionally includes one or more fins (e.g., dorsal fin 605-7, pelvic fins 605-6) of the virtual avatar (e.g., shark avatar 605). In some embodiments, the movement of the first portion relative to the second portion occurs without moving the second portion relative to the displayed frame of view (e.g., the first portion is upper head portion 605-10 and the second portion is shark torso 605-8). That is, the first portion moves within the displayed frame of view whereas the second portion remains fixed or substantially fixed within the displayed frame of view. In some embodiments, the movement of the first portion is a rotational movement around an axis, such as a rotation around a y-axis (e.g., vertical axis, as displayed). In some embodiments, the virtual avatar is a shark avatar and the position of the avatar is fixed at the location of the shark's dorsal fin (e.g., dorsal fin 605-7), and movement of the first portion relative to the second portion includes flexing a head portion of the shark (e.g. upper head portion 605-10) (e.g., including the shark's eyes (605-2), nose (605-3), jaws (605-1)) to the side (e.g., to the left or right), in an upward direction, or in a downward direction (e.g., mirroring left/right turning movement of the user's head or up/down nodding movement of the user's head). In some embodiments, the position of the avatar is not fixed. That is, the first portion of the avatar (e.g., the shark's head) is still configured to flex relative to the second portion (e.g., torso portion of the shark), but the position of the shark is not fixed in the displayed frame of view. In some embodiments, the avatar is not fixed and the avatar body does not flex with movement of the user's head.

In some embodiments, the virtual avatar (e.g., shark avatar 605) further includes a fourth avatar feature (e.g., shark tail 605-4) (e.g., an avatar tail) that moves independently of the detected changes in pose of the face in the field of view of the one or more cameras (e.g., 602) (e.g., the fourth avatar feature does not change in response (e.g., is non-responsive) to any detected changes in pose of the face in the field of view of the one or more cameras). In some embodiments, the electronic device (e.g., 600) displays the fourth avatar feature having a relative position (e.g., positioned having a simulated depth that places the fourth avatar feature behind the other avatar features) with respect to the first, second, and third avatar features (e.g., shark jaw 605-1, shark eyes 605-2, shark nose 605-3). In some embodiments, the electronic device displays movement (e.g., continuous movement) of the fourth avatar feature relative to the first, second, and third avatar features (e.g., the avatar tail feature is displayed having side-to-side movement). In some embodiments, while continuing to display the movement of the fourth avatar feature (e.g., the side-to-side movement of the avatar tail feature is continuously displayed) (e.g., the avatar tail feature is displayed moving side-to-side at a consistent pace), the electronic device changes an appearance of the fourth avatar feature based on the relative position of the fourth avatar feature with respect to the first, second, and third avatar features (e.g., the appearance of the avatar tail feature changes based on its relative position to the first, second, and third avatar features as it continues side-to-side movement). Changing the appearance of the fourth avatar feature based on the relative position of the fourth avatar feature with respect to the first, second, and third, avatar features provides the user with feedback indicating that relative positions of the fourth avatar feature with respect to other avatar features will cause the device to modify the appearance of the fourth avatar feature depending on whether the fourth avatar feature is visible based on its relative position to other avatar features. This provides improved visual feedback to the user by providing a more realistic appearance of the virtual avatar and various portions of the virtual avatar. Providing improved visual feedback enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. This also conserves computational resources (thereby reducing power usage and improving battery life) by foregoing the generation and display of features that should not be displayed based on their relative position on the display with respect to other rendered image data. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation can be done in real time during, for example, a conversation such as a text conversation or a video conversation, whereas manual animation of an avatar would have to be done before the conversation started or after it had ended.

In some embodiments, changing the appearance of the fourth avatar feature (e.g., shark tail 605-4) based on the relative position of the fourth avatar feature with respect to the first, second, and third avatar features (e.g., shark jaw 605-1, shark eyes 605-2, shark nose 605-3) includes one or more of the following determinations. In accordance with a determination, based on the relative position of the fourth avatar feature, that a first portion of the fourth avatar feature (e.g., an end portion of an avatar tail feature) is positioned behind one or more of the first, second, and third avatar features, the electronic device (e.g., 600) foregoes displaying the first portion of the fourth avatar feature (e.g., while continuing to display a second portion of the fourth avatar feature (e.g., a base portion of the avatar tail feature); e.g., when an end portion of the avatar tail feature is positioned behind another avatar feature, and a base portion of the avatar tail feature is not positioned behind another avatar feature, the end portion of the avatar tail is not displayed (e.g., because it is hidden behind the other avatar feature(s)), but the base portion of the avatar tail is displayed). In accordance with a determination, based on the relative position of the fourth avatar feature, that the first portion of the fourth avatar feature is not positioned behind one or more of the first, second, and third avatar features, the electronic device displays the first portion of the fourth avatar (e.g., while continuing to display a second portion of the fourth avatar feature; e.g., when both the end portion of the avatar tail feature and the base portion of the avatar tail feature are not positioned behind another avatar feature, both the end portion and the base portion of the avatar tail are displayed).

In some embodiments, the electronic device (e.g., 600) determines that the face is no longer detected within the field of view of the one or more cameras (e.g., 602) (e.g., face tracking has failed) (e.g., because the face is no longer within the field of view of the one or more cameras, the features of the face that the device was using to track the face are obscured, or the device has otherwise failed to be able to track the face), and in response to determining that the face is no longer detected within the field of view of the one or more cameras, continues to display the movement of the fourth avatar feature, and changes the appearance of the fourth avatar feature based on the relative position of the fourth avatar feature with respect to the first, second, and third avatar features. Continuing to display the movement of the fourth avatar feature and changing the appearance of the fourth avatar feature based on the relative position of the fourth avatar feature with respect to the first, second, and third avatar features after the face is no longer detected within the field of view of the one or more cameras provides the user with more control over the device by allowing the user to continue the process for modifying a virtual avatar, even when face tracking has failed. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this provides a control scheme for operating a virtual avatar on a display of an electronic device, wherein the system detects and processes input in the form of changes to facial features of a user (and the magnitude and/or direction of those changes), and through programed behavioral characteristics of the virtual avatar provides the desired output in the form of the appearance of the virtual avatar, while eliminating the need for manual handling of the user interface (e.g., providing touch inputs on the display) even when detection of the input (e.g., changes to facial features) fails. This provides improved visual feedback to the user by providing a more realistic appearance of the virtual avatar and various portions of the virtual avatar that continue to move in accordance with the behavioral characteristics of the virtual avatar, even when face tracking has failed. The improved visual feedback enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation can be done in real time during, for example, a conversation such as a text conversation or a video conversation, whereas manual animation of an avatar would have to be done before the conversation started or after it had ended.

In some embodiments, the electronic device (e.g., 600) displays, via the display apparatus (e.g., 601), a representation of image data captured via the one or more cameras (e.g., 602), wherein the representation of image data includes a representation of a subject (e.g., 632) (e.g., a representation of at least a portion of a subject), and displays via the display apparatus, one or more avatar features (e.g., 605-1, 605-2, 605-3, 605-5, 605-6, 605-7, 605-8, 605-9, 605-10, 605-11) of the virtual avatar (e.g., shark avatar 605) in place of (e.g., occludes or is displayed on top of) at least a portion of (e.g., with at least a portion of the virtual avatar partially or completely overlaying (e.g., obscuring) at least a portion of the subject) the representation of the subject (e.g., FIG. 6F), wherein the one or more avatar features of the virtual avatar does not include the fourth avatar feature (e.g., shark tail 605-4) (e.g., the shark's tail is not displayed). Displaying one or more avatar features of the virtual avatar in place of at least a portion of the representation of the subject, wherein the one or more avatar features of the virtual avatar does not include the fourth avatar feature, makes the user-device interface more efficient by only displaying portions of the virtual avatar that should be visible to the user based on a simulated depth and relative position of the virtual avatar and representation of the subject. This conserves computational resources (thereby reducing power usage and improving battery life) by foregoing the generation and display of features that should not be displayed based on their simulated depth and relative position on the display with respect to other rendered image data. This also provides a more realistic display of the virtual avatar, which improves the visual feedback of the virtual avatar displayed with respect to a displayed representation of the subject. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation can be done in real time during, for example, a conversation such as a text conversation or a video conversation, whereas manual animation of an avatar would have to be done before the conversation started or after it had ended.

In some embodiments, the image data corresponds to depth data (e.g., the image data includes data captured by a visible light camera and a depth camera) (e.g., image data that includes a depth aspect (e.g., depth data independent of RGB data) of a captured image or video) that includes depth data for the subject (e.g., information about the relative depth positioning of one or more portions of the subject with respect to other portions of the subject and/or to other objects within the field of view of the one or more cameras). In some embodiments, the image data includes at least two components: an RGB component that encodes the visual characteristics of a captured image, and depth data that encodes information about the relative spacing relationship of elements within the captured image (e.g., the depth data encodes that a user is in the foreground, and background elements, such as a tree positioned behind the user, are in the background). In some embodiments, the depth data is a depth map. In some embodiments, a depth map (e.g., depth map image) contains information (e.g., values) that relates to the distance of objects in a scene from a viewpoint (e.g., a camera). In one embodiment of a depth map, each depth pixel defines the position in the viewpoint's Z-axis where its corresponding two-dimensional pixel is located. In some examples, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., camera) in the "three dimensional" scene. In other examples, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction. In some embodiments, the depth data has a first depth component (e.g., a first portion of depth data that encodes a spatial position of the subject in the camera display region; a plurality of depth pixels that form a discrete portion of the depth map, such as a foreground or a specific object) that includes the representation of the subject (e.g., 632) in the camera display region (e.g., 620). In some embodiments, the depth data has a second depth component (e.g., a second portion of depth data that encodes a spatial position of the background in the camera display region; a plurality of depth pixels that form a discrete portion of the depth map, such as a background), separate from the first depth component, the second depth aspect including the representation of the background (e.g., 636) in the camera display region (e.g., 620). In some embodiments, the first depth aspect and second depth aspect are used to determine a spatial relationship between the subject in the camera display region and the background in the camera display region. This spatial relationship can be used to distinguish the subject from the background. This distinction can be exploited to, for example, apply different visual effects (e.g., visual effects (e.g., virtual avatars) having a depth component) to the subject and background. In some embodiments, all areas of the image data that do not correspond to the first depth component (e.g., areas of the image data that are out of range of the depth camera) are segmented out (e.g., excluded) from the depth map. In some embodiments, the depth data is in the form of a depth map or depth mask.

In some embodiments, the virtual avatar (e.g., 605) is placed at simulated depth (e.g., at a location selected so that the virtual avatar is displayed slightly in front of the representation of the subject (e.g., 632) in a depth dimension of the user interface) relative to the representation of the subject as determined based on depth data for the subject (e.g., a displayed head or face portion of the user is replaced with (or overlaid by (e.g., opaquely, transparently, translucently)) a head of a virtual avatar that corresponds to the selected avatar option) (e.g., shark avatar 605). In some embodiments, displaying a representation of the selected avatar option on the representation of the subject includes using depth information obtained using one or more depth cameras (e.g., 602) of the electronic device (e.g., 600).

In some embodiments, in accordance with a determination, based on the depth data, that a first portion of the virtual avatar (e.g., a tail feature of a shark avatar; 605-4) does not satisfy a set of depth-based display criteria for a first portion of the subject (e.g., the subject's head) (e.g., because the depth data for the subject indicate that the first portion of the virtual avatar has a simulated depth that is behind the corresponding first portion of the subject), the device (e.g., 600) excludes, from the representation of the virtual avatar (e.g., shark avatar 605), the representation of the first portion of the virtual avatar (e.g., the shark's tail is not displayed because it is positioned behind the subject's head) (e.g., shark tail 605-4 is not shown in FIG. 6F because it is positioned behind the shark 605 that is displayed in place of the subject's head). In some embodiments, the electronic device also displays a portion of the representation of the subject (e.g., the representation of the subject's shoulder or neck) in a region that would have been occupied by the first portion of the virtual avatar (e.g., forgo including as part of the representation of the virtual avatar, a representation of the first portion of the virtual avatar because that portion should be obscured by the subject). When the first portion of the virtual avatar does not satisfy depth-based display criteria because it is obscured by a portion of the subject, the first portion of the virtual avatar is excluded from the displayed representation of the virtual avatar. For example, all or a portion of the shark avatar's tail is not displayed when it is positioned behind the representation of the subject's shoulder or neck.

In some embodiments, the virtual avatar is a shark (e.g., shark avatar 605) that includes a tail feature (e.g., shark tail 605-4). In some embodiments, the electronic device (e.g., 600) displays the representation of the virtual avatar (e.g., shark avatar 605) by displaying a first portion of the avatar (e.g., a shark head) (e.g., upper head portion 605-10) and conditionally displaying a second portion of the avatar (e.g., the shark tail feature) (e.g., shark tail 605-4) based on whether or not a simulated depth of the second portion of the avatar is in front of or behind a portion of the representation of the subject (e.g., the subject's head, neck, or shoulder) based on the depth data for the subject. For example, when the tail feature of the shark avatar has a simulated depth that is behind the depth of the representation of the subject (e.g., the subject's head, neck, or shoulder), and when the avatar tail feature is positioned behind the representation of the subject (e.g., the subject's head, neck, or shoulder (e.g., from the perspective of a user viewing the representation of the subject and virtual avatar) (or behind the avatar (e.g., shark head) displayed in place of the representation of the subject), the electronic device excludes all, or a portion, of the avatar tail feature from the displayed shark avatar (e.g., depending upon whether the respective portion of the avatar tail feature is positioned behind the representation of the subject (or the avatar shark displayed in place of the representation of the subject), such that the representation of the subject (or, for example, shark head) is positioned between the portion of the avatar tail and a user viewing the representation of the subject). By determining the relative depth and position of the avatar tail feature with respect to the representation of the subject (or other displayed portions of the avatar, such as the shark avatar's head), the electronic device can selectively display portions of the avatar (e.g., such as portions of the shark tail) that should be visible to a user viewing the avatar on the representation of the subject, while selectively excluding portions of the avatar that should be hidden from view based on the position and depth of the tail feature with respect to the representation of the subject or avatar (e.g., such as when the shark's tail is positioned behind the shark's head that is displayed over, or in place of, the representation of the subject's head).

In some embodiments, in accordance with a determination that the detected movement of the one or more facial features includes movement of a fourth facial feature (e.g., user cheeks 610-4) (e.g., one or more of a user's cheeks) from a first position (e.g., a non-expanded or relaxed position) to a second position (e.g., an expanded or "puffed" position), the electronic device (e.g., 600) moves a fifth avatar feature (e.g., shark gills 605-5) (e.g., gills when the virtual avatar is a fish or shark) from an initial position (e.g., a non-expanded or relaxed position (in some embodiments, the initial position of the avatar feature is a position that is undistinguished)) to a modified position (e.g., an expanded position in which the gills of the shark are extended from the sides of the shark) based on a magnitude of displacement of the fourth facial feature when moving from the first position to the second position. Moving the fifth avatar feature from the initial position to the modified position based on the magnitude of displacement of the fourth facial feature when moving from the first position to the second position provides the user with feedback indicating that the displacement of fourth facial feature by different magnitudes will cause the device to modify the respective fifth avatar feature to different positions determined based on the magnitude of displacement of the fourth facial feature. This provides a control scheme for operating a virtual avatar on a display of an electronic device, wherein the system detects and processes input in the form of changes to facial features of a user (and the magnitude and/or direction of those changes), including the fourth facial feature, and through an iterative feedback loop provides the desired output in the form of the appearance of the virtual avatar, while eliminating the need for manual handling of the user interface (e.g., providing touch inputs on the display). This provides improved visual feedback to the user regarding how to manipulate the display to control the virtual avatar using facial movements. This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation can be done in real time during, for example, a conversation such as a text conversation or a video conversation, whereas manual animation of an avatar would have to be done before the conversation started or after it had ended.

In some embodiments, in accordance with a determination that the detected movement of the one or more facial features includes movement of a fifth facial feature (e.g., one or more of a user's eyebrows 610-5), the electronic device (e.g., 600) moves a sixth avatar feature (e.g., pectoral fins 605-6) (e.g., fins when the virtual avatar is a fish or shark) based on at least one of a direction and magnitude of movement of the fifth facial feature. In some embodiments, the sixth avatar feature does not anatomically correspond to the fifth facial feature (e.g., it is anatomically distinct or anatomically corresponds to a different physical feature) (e.g., the fifth facial feature is one or more user eyebrows and the sixth avatar feature is one or more fins of an aquatic avatar animal such as a shark or fish). In some embodiments, the movement of the fifth facial feature includes a magnitude and/or direction of movement of the facial feature(s) (e.g., in an upward or downward direction such as when the user raises or lowers their eyebrows). In some embodiments, the avatar fins move (e.g., slide, curl, tilt) in an upward/downward direction on the body of the avatar and by an amount that is determined based on the amount of movement of the user's eyebrows in an upward/downward direction. Moving the sixth avatar feature based on at least one of the direction and magnitude of movement of the fifth facial feature provides the user with feedback indicating that further movement of the fifth facial feature by different magnitudes and/or directions will cause the device to further modify the respective sixth avatar feature based on the different magnitudes and/or directions of movement of the fifth facial feature. This provides a control scheme for operating a virtual avatar on a display of an electronic device, wherein the system detects and processes input in the form of changes to facial features of a user (and the magnitude and/or direction of those changes), including the fifth facial feature, and through an iterative feedback loop provides the desired output in the form of the appearance of the virtual avatar, while eliminating the need for manual handling of the user interface (e.g., providing touch inputs on the display). This provides improved visual feedback to the user regarding how to manipulate the display to control the virtual avatar using facial movements. This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation can be done in real time during, for example, a conversation such as a text conversation or a video conversation, whereas manual animation of an avatar would have to be done before the conversation started or after it had ended.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources for sharing with other users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to better represent a user in a conversation. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sending an avatar, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:
1. An electronic device, comprising:
   a display apparatus;
   one or more cameras;
   one or more processors; and
   memory storing one or more programs configured to be executed by the one or more processors, the one or more programs including instructions for:
      displaying, via the display apparatus, a virtual avatar having:

a respective avatar feature that moves independently of detected changes in pose of a face in a field of view of the one or more cameras; and
a plurality of avatar features that change appearance in response to detected changes in pose of the face in the field of view of the one or more cameras, the plurality of avatar features including:
a first avatar feature;
a second avatar feature different from the first avatar feature; and
a third avatar feature different from the first and second avatar features;
while displaying the respective avatar feature moving independently of changes in pose of the face in the field of view of the one or more cameras and while the face is detected in the field of view of the one or more cameras, the face including a plurality of detected facial features including a first facial feature and a second facial feature different from the first facial feature, detecting movement of one or more facial features of the face; and
in response to detecting the movement of the one or more facial features:
in accordance with a determination that the detected movement of the one or more facial features includes movement of the first facial feature in a first direction:
moving the first avatar feature in the first direction based on the detected movement of the first facial feature in the first direction;
moving the second avatar feature and the third avatar feature in a second direction different from the first direction and based on the detected movement of the first facial feature in the first direction; and
continuing to display the respective avatar feature moving independently of changes in pose of the face in the field of view of the one or more cameras; and
in accordance with a determination that the detected movement of the one or more facial features includes movement of the second facial feature:
moving the second avatar feature based on at least one of a direction and a magnitude of movement of the second facial feature; and
continuing to display the respective avatar feature moving independently of changes in pose of the face in the field of view of the one or more cameras.

2. The electronic device of claim 1, the one or more programs further including instructions for:
in response to detecting the movement of the one or more facial features and in accordance with a determination that the detected movement of the one or more facial features includes movement of the second facial feature without more than a first threshold amount of movement of the first facial feature:
moving the second avatar feature based on at least one of the direction and the magnitude of movement of the second facial feature;
forgoing moving the first and third avatar features; and
continuing to display the respective avatar feature moving independently of changes in pose of the face in the field of view of the one or more cameras.

3. The electronic device of claim 1, the one or more programs further including instructions for:
in response to detecting the movement of the one or more facial features and in accordance with a determination that the detected movement of the one or more facial features includes movement of the first facial feature without more than a second threshold amount of movement of the second facial feature and a third facial feature:
moving the second and third avatar features based on the detected movement of the first facial feature; and
continuing to display the respective avatar feature moving independently of changes in pose of the face in the field of view of the one or more cameras.

4. The electronic device of claim 1, the one or more programs further including instructions for:
in response to detecting the movement of the one or more facial features and in accordance with a determination that the detected movement of the one or more facial features includes movement of both the first and second facial features:
moving the first avatar feature based on the detected movement of the first facial feature;
moving the second avatar feature based on the detected movement of the first and second facial features; and
continuing to display the respective avatar feature moving independently of changes in pose of the face in the field of view of the one or more cameras.

5. The electronic device of claim 1, wherein moving the first avatar feature in the first direction based on the detected movement of the first facial feature in the first direction includes:
in accordance with a determination that the detected movement of the first facial feature is less than or equal to a second threshold amount of movement of the first facial feature, moving the first avatar feature in the first direction by a first amount determined based on the detected movement of the first facial feature; and
in accordance with a determination that the detected movement of the first facial feature is greater than the second threshold amount of movement of the first facial feature:
moving the first avatar feature in the first direction by a second amount of movement greater than the first amount of movement, and
displaying a first subfeature of the first avatar feature that was not displayed when the movement of the first facial feature was less than the second threshold amount of movement.

6. The electronic device of claim 1, wherein:
the first facial feature is a jaw of the face;
the first avatar feature is an avatar jaw feature;
the second avatar feature is one or more avatar eyes; and
the third avatar feature is an avatar nose.

7. The electronic device of claim 1, the one or more programs further including instructions for:
in response to detecting the movement of the one or more facial features and in accordance with a determination that the detected movement of the one or more facial features includes movement of the first facial feature in a third direction:
moving the second avatar feature and the third avatar feature in a fourth direction different from the third direction and based on the detected movement of the first facial feature in the third direction; and
continuing to display the respective avatar feature moving independently of changes in pose of the face in the field of view of the one or more cameras.

8. The electronic device of claim 7, the one or more programs further including instructions for:
 further in accordance with a determination that the detected movement of the one or more facial features includes movement of the first facial feature in the third direction:
  moving the first avatar feature in the third direction based on the detected movement of the first facial feature in the third direction.

9. The electronic device of claim 1, wherein moving the second avatar feature and the third avatar feature in the second direction based on the detected movement of the first facial feature includes:
 in accordance with a determination that the detected movement of the one or more facial features includes movement of the first facial feature by a first magnitude, moving the second avatar feature and the third avatar feature by a first amount of movement; and
 in accordance with a determination that the detected movement of the one or more facial features includes movement of the first facial feature by a second magnitude different from the first magnitude, moving the second avatar feature and the third avatar feature by a second amount of movement that is different from the first amount of movement.

10. The electronic device of claim 1, the one or more programs further including instructions for:
 further in accordance with a determination that the detected movement of the one or more facial features includes movement of the first facial feature by a first magnitude, moving the first avatar feature by a third amount of movement; and
 further in accordance with a determination that the detected movement of the one or more facial features includes movement of the first facial feature by a second magnitude, moving the first avatar feature by a fourth amount of movement different from the third amount of movement.

11. The electronic device of claim 1, the one or more programs further including instructions for:
 detecting a change in pose of the face within the field of view of the one or more cameras; and
 in response to detecting the change in pose of the face, changing an appearance of the virtual avatar, including:
  in accordance with a determination that the change in pose of the face includes a first type of change in pose of the face, changing the appearance of the virtual avatar includes moving a first portion of the virtual avatar relative to a second portion of the virtual avatar.

12. The electronic device of claim 1, wherein displaying the respective avatar feature moving independently of changes in pose of the face in the field of view of the one or more cameras includes:
 displaying the respective avatar feature having a relative position with respect to the first, second, and third avatar features;
 displaying movement of the respective avatar feature relative to the first, second, and third avatar features; and
 while continuing to display the movement of the respective avatar feature, changing an appearance of the respective avatar feature based on the relative position of the respective avatar feature with respect to the first, second, and third avatar features.

13. The electronic device of claim 1, the one or more programs further including instructions for:
 determining that the face is no longer detected within the field of view of the one or more cameras; and
 in response to determining that the face is no longer detected within the field of view of the one or more cameras:
  continuing to display the respective avatar feature moving independently of changes in pose of the face in the field of view of the one or more cameras; and
  changing the appearance of the respective avatar feature based on a relative position of the respective avatar feature with respect to the first, second, and third avatar features.

14. The electronic device of claim 1, the one or more programs further including instructions for:
 displaying, via the display apparatus, a representation of image data captured via the one or more cameras, wherein the representation of image data includes a representation of a subject; and
 displaying, via the display apparatus, one or more avatar features of the virtual avatar in place of at least a portion of the representation of the subject, wherein the one or more avatar features of the virtual avatar does not include the respective avatar feature.

15. The electronic device of claim 1, the one or more programs further including instructions for:
 in accordance with a determination that the detected movement of the one or more facial features includes movement of a fourth facial feature from a first position to a second position, moving a fourth avatar feature from an initial position to a modified position based on a magnitude of displacement of the fourth facial feature when moving from the first position to the second position.

16. The electronic device of claim 1, the one or more programs further including instructions for:
 in accordance with a determination that the detected movement of the one or more facial features includes movement of a fifth facial feature, moving a fifth avatar feature based on at least one of a direction and magnitude of movement of the fifth facial feature.

17. A non-transitory computer-readable storage medium storing one or more programs configured to be executed by one or more processors of an electronic device with a display apparatus and one or more cameras, the one or more programs including instructions for:
 displaying, via the display apparatus, a virtual avatar having:
  a respective avatar feature that moves independently of detected changes in pose of a face in a field of view of the one or more cameras; and
  a plurality of avatar features that change appearance in response to detected changes in pose of the face in the field of view of the one or more cameras, the plurality of avatar features including:
   a first avatar feature;
   a second avatar feature different from the first avatar feature; and
   a third avatar feature different from the first and second avatar features;
 while displaying the respective avatar feature moving independently of changes in pose of the face in the field of view of the one or more cameras and while the face is detected in the field of view of the one or more cameras, the face including a plurality of detected facial features including a first facial feature and a second facial feature different from the first facial feature, detecting movement of one or more facial features of the face; and in response to detecting the movement of the one or more facial features:

in accordance with a determination that the detected movement of the one or more facial features includes movement of the first facial feature in a first direction:

moving the first avatar feature in the first direction based on the detected movement of the first facial feature in the first direction;

moving the second avatar feature and the third avatar feature in a second direction different from the first direction and based on the detected movement of the first facial feature in the first direction; and continuing to display the respective avatar feature moving independently of changes in pose of the face in the field of view of the one or more cameras; and in accordance with a determination that the detected movement of the one or more facial features includes movement of the second facial feature:

moving the second avatar feature based on at least one of a direction and a magnitude of movement of the second facial feature; and continuing to display the respective avatar feature moving independently of changes in pose of the face in the field of view of the one or more cameras.

18. The non-transitory computer-readable storage medium of claim 17, the one or more programs further including instructions for:

in response to detecting the movement of the one or more facial features and in accordance with a determination that the detected movement of the one or more facial features includes movement of the second facial feature without more than a first threshold amount of movement of the first facial feature:

moving the second avatar feature based on at least one of the direction and the magnitude of movement of the second facial feature;

forgoing moving the first and third avatar features; and continuing to display the respective avatar feature moving independently of changes in pose of the face in the field of view of the one or more cameras.

19. The non-transitory computer-readable storage medium of claim 17, the one or more programs further including instructions for:

in response to detecting the movement of the one or more facial features and in accordance with a determination that the detected movement of the one or more facial features includes movement of the first facial feature without more than a second threshold amount of movement of the second facial feature and a third facial feature:

moving the second and third avatar features based on the detected movement of the first facial feature; and continuing to display the respective avatar feature moving independently of changes in pose of the face in the field of view of the one or more cameras.

20. The non-transitory computer-readable storage medium of claim 17, the one or more programs further including instructions for:

in response to detecting the movement of the one or more facial features and in accordance with a determination that the detected movement of the one or more facial features includes movement of both the first and second facial features:

moving the first avatar feature based on the detected movement of the first facial feature;

moving the second avatar feature based on the detected movement of the first and second facial features; and continuing to display the respective avatar feature moving independently of changes in pose of the face in the field of view of the one or more cameras.

21. The non-transitory computer-readable storage medium of claim 17, wherein moving the first avatar feature in the first direction based on the detected movement of the first facial feature in the first direction includes:

in accordance with a determination that the detected movement of the first facial feature is less than or equal to a second threshold amount of movement of the first facial feature, moving the first avatar feature in the first direction by a first amount determined based on the detected movement of the first facial feature; and in accordance with a determination that the detected movement of the first facial feature is greater than the second threshold amount of movement of the first facial feature:

moving the first avatar feature in the first direction by a second amount of movement greater than the first amount of movement, and displaying a first subfeature of the first avatar feature that was not displayed when the movement of the first facial feature was less than the second threshold amount of movement.

22. The non-transitory computer-readable storage medium of claim 17, wherein:

the first facial feature is a jaw of the face;
the first avatar feature is an avatar jaw feature;
the second avatar feature is one or more avatar eyes; and
the third avatar feature is an avatar nose.

23. The non-transitory computer-readable storage medium of claim 17, the one or more programs further including instructions for:

in response to detecting the movement of the one or more facial features and in accordance with a determination that the detected movement of the one or more facial features includes movement of the first facial feature in a third direction:

moving the second avatar feature and the third avatar feature in a fourth direction different from the third direction and based on the detected movement of the first facial feature in the third direction; and continuing to display the respective avatar feature moving independently of changes in pose of the face in the field of view of the one or more cameras.

24. The non-transitory computer-readable storage medium of claim 23, the one or more programs further including instructions for:

further in accordance with a determination that the detected movement of the one or more facial features includes movement of the first facial feature in the third direction:

moving the first avatar feature in the third direction based on the detected movement of the first facial feature in the third direction.

25. The non-transitory computer-readable storage medium of claim 17, wherein moving the second avatar feature and the third avatar feature in the second direction based on the detected movement of the first facial feature includes:

in accordance with a determination that the detected movement of the one or more facial features includes movement of the first facial feature by a first magnitude, moving the second avatar feature and the third avatar feature by a first amount of movement; and in accordance with a determination that the detected movement of the one or more facial features includes movement of the first facial feature by a second magnitude different from the first magnitude, moving the second avatar feature and the third avatar feature by a second amount of movement that is different from the first amount of movement.

26. The non-transitory computer-readable storage medium of claim 17, the one or more programs further including instructions for:

further in accordance with a determination that the detected movement of the one or more facial features includes movement of the first facial feature by a first magnitude, moving the first avatar feature by a third amount of movement; and further in accordance with a determination that the detected movement of the one or more facial features includes movement of the first facial feature by a second magnitude, moving the first avatar feature by a fourth amount of movement different from the third amount of movement.

27. The non-transitory computer-readable storage medium of claim 17, the one or more programs further including instructions for:

detecting a change in pose of the face within the field of view of the one or more cameras; and in response to detecting the change in pose of the face, changing an appearance of the virtual avatar, including:

in accordance with a determination that the change in pose of the face includes a first type of change in pose of the face, changing the appearance of the virtual avatar includes moving a first portion of the virtual avatar relative to a second portion of the virtual avatar.

28. The non-transitory computer-readable storage medium of claim 17, wherein displaying the respective avatar feature moving independently of changes in pose of the face in the field of view of the one or more cameras includes:

displaying the respective avatar feature having a relative position with respect to the first, second, and third avatar features;

displaying movement of the respective avatar feature relative to the first, second, and third avatar features; and while continuing to display the movement of the respective avatar feature, changing an appearance of the respective avatar feature based on the relative position of the respective avatar feature with respect to the first, second, and third avatar features.

29. The non-transitory computer-readable storage medium of claim 17, the one or more programs further including instructions for:

determining that the face is no longer detected within the field of view of the one or more cameras; and in response to determining that the face is no longer detected within the field of view of the one or more cameras:

continuing to display the respective avatar feature moving independently of changes in pose of the face in the field of view of the one or more cameras; and changing the appearance of the respective avatar feature based on a relative position of the respective avatar feature with respect to the first, second, and third avatar features.

30. The non-transitory computer-readable storage medium of claim 17, the one or more programs further including instructions for:

displaying, via the display apparatus, a representation of image data captured via the one or more cameras, wherein the representation of image data includes a representation of a subject; and displaying, via the display apparatus, one or more avatar features of the virtual avatar in place of at least a portion of the representation of the subject, wherein the one or more avatar features of the virtual avatar does not include the respective avatar feature.

31. The non-transitory computer-readable storage medium of claim 17, the one or more programs further including instructions for:

in accordance with a determination that the detected movement of the one or more facial features includes movement of a fourth facial feature from a first position to a second position, moving a fourth avatar feature from an initial position to a modified position based on a magnitude of displacement of the fourth facial feature when moving from the first position to the second position.

32. The non-transitory computer-readable storage medium of claim 17, the one or more programs further including instructions for:

in accordance with a determination that the detected movement of the one or more facial features includes movement of a fifth facial feature, moving a fifth avatar feature based on at least one of a direction and magnitude of movement of the fifth facial feature.

33. A method, comprising:

at an electronic device having one or more cameras and a display apparatus:

displaying, via the display apparatus, a virtual avatar having:

a respective avatar feature that moves independently of detected changes in pose of a face in a field of view of the one or more cameras; and a plurality of avatar features that change appearance in response to detected changes in pose of the face in the field of view of the one or more cameras, the plurality of avatar features including:

a first avatar feature;

a second avatar feature different from the first avatar feature; and a third avatar feature different from the first and second avatar features;

while displaying the respective avatar feature moving independently of changes in pose of the face in the field of view of the one or more cameras and while the face is detected in the field of view of the one or more cameras, the face including a plurality of detected facial features including a first facial feature and a second facial feature different from the first facial feature, detecting movement of one or more facial features of the face; and in response to detecting the movement of the one or more facial features:

in accordance with a determination that the detected movement of the one or more facial features includes movement of the first facial feature in a first direction:

moving the first avatar feature in the first direction based on the detected movement of the first facial feature in the first direction;

moving the second avatar feature and the third avatar feature in a second direction different from the first direction and based on the detected movement of the first facial feature in the first direction; and continuing to display the respective avatar feature moving independently of changes in pose of the face in the field of view of the one or more cameras; and in accordance with a determination that the detected movement of the one or more facial features includes movement of the second facial feature:

moving the second avatar feature based on at least one of a direction and a magnitude of movement of the second facial feature; and continuing to display the respective avatar feature moving independently of changes in pose of the face in the field of view of the one or more cameras.

34. The method of claim 33, further comprising:
in response to detecting the movement of the one or more facial features and in accordance with a determination that the detected movement of the one or more facial features includes movement of the second facial feature without more than a first threshold amount of movement of the first facial feature:

moving the second avatar feature based on at least one of the direction and the magnitude of movement of the second facial feature;

forgoing moving the first and third avatar features; and continuing to display the respective avatar feature moving independently of changes in pose of the face in the field of view of the one or more cameras.

35. The method of claim 33, further comprising:
in response to detecting the movement of the one or more facial features and in accordance with a determination that the detected movement of the one or more facial features includes movement of the first facial feature without more than a second threshold amount of movement of the second facial feature and a third facial feature:

moving the second and third avatar features based on the detected movement of the first facial feature; and continuing to display the respective avatar feature moving independently of changes in pose of the face in the field of view of the one or more cameras.

36. The method of claim 33, further comprising:
in response to detecting the movement of the one or more facial features and in accordance with a determination that the detected movement of the one or more facial features includes movement of both the first and second facial features:

moving the first avatar feature based on the detected movement of the first facial feature;

moving the second avatar feature based on the detected movement of the first and second facial features; and continuing to display the respective avatar feature moving independently of changes in pose of the face in the field of view of the one or more cameras.

37. The method of claim 33, wherein moving the first avatar feature in the first direction based on the detected movement of the first facial feature in the first direction includes:

in accordance with a determination that the detected movement of the first facial feature is less than or equal to a second threshold amount of movement of the first facial feature, moving the first avatar feature in the first direction by a first amount determined based on the detected movement of the first facial feature; and in accordance with a determination that the detected movement of the first facial feature is greater than the second threshold amount of movement of the first facial feature:

moving the first avatar feature in the first direction by a second amount of movement greater than the first amount of movement, and displaying a first subfeature of the first avatar feature that was not displayed when the movement of the first facial feature was less than the second threshold amount of movement.

38. The method of claim 33, wherein:
the first facial feature is a jaw of the face;
the first avatar feature is an avatar jaw feature;
the second avatar feature is one or more avatar eyes; and
the third avatar feature is an avatar nose.

39. The method of claim 33, further comprising:
in response to detecting the movement of the one or more facial features and in accordance with a determination that the detected movement of the one or more facial features includes movement of the first facial feature in a third direction:

moving the second avatar feature and the third avatar feature in a fourth direction different from the third direction and based on the detected movement of the first facial feature in the third direction; and continuing to display the respective avatar feature moving independently of changes in pose of the face in the field of view of the one or more cameras.

40. The method of claim 39, further comprising:
further in accordance with a determination that the detected movement of the one or more facial features includes movement of the first facial feature in the third direction:

moving the first avatar feature in the third direction based on the detected movement of the first facial feature in the third direction.

41. The method of claim 33, wherein moving the second avatar feature and the third avatar feature in the second direction based on the detected movement of the first facial feature includes:

in accordance with a determination that the detected movement of the one or more facial features includes movement of the first facial feature by a first magnitude, moving the second avatar feature and the third avatar feature by a first amount of movement; and in accordance with a determination that the detected movement of the one or more facial features includes movement of the first facial feature by a second magnitude different from the first magnitude, moving the second avatar feature and the third avatar feature by a second amount of movement that is different from the first amount of movement.

42. The method of claim 33, further comprising:
further in accordance with a determination that the detected movement of the one or more facial features includes movement of the first facial feature by a first magnitude, moving the first avatar feature by a third amount of movement; and further in accordance with a determination that the detected movement of the one or more facial features includes movement of the first facial feature by a second magnitude, moving the first avatar feature by a fourth amount of movement different from the third amount of movement.

43. The method of claim 33, further comprising:
detecting a change in pose of the face within the field of view of the one or more cameras; and
in response to detecting the change in pose of the face, changing an appearance of the virtual avatar, including:
in accordance with a determination that the change in pose of the face includes a first type of change in pose of the face, changing the appearance of the virtual avatar includes moving a first portion of the virtual avatar relative to a second portion of the virtual avatar.

44. The method of claim 33, wherein displaying the respective avatar feature moving independently of changes in pose of the face in the field of view of the one or more cameras includes:
displaying the respective avatar feature having a relative position with respect to the first, second, and third avatar features;
displaying movement of the respective avatar feature relative to the first, second, and third avatar features; and
while continuing to display the movement of the respective avatar feature, changing an appearance of the respective avatar feature based on the relative position of the respective avatar feature with respect to the first, second, and third avatar features.

45. The method of claim 33, further comprising:
determining that the face is no longer detected within the field of view of the one or more cameras; and
in response to determining that the face is no longer detected within the field of view of the one or more cameras:
continuing to display the respective avatar feature moving independently of changes in pose of the face in the field of view of the one or more cameras; and
changing the appearance of the respective avatar feature based on a relative position of the respective avatar feature with respect to the first, second, and third avatar features.

46. The method of claim 33, further comprising:
displaying, via the display apparatus, a representation of image data captured via the one or more cameras, wherein the representation of image data includes a representation of a subject; and
displaying, via the display apparatus, one or more avatar features of the virtual avatar in place of at least a portion of the representation of the subject, wherein the one or more avatar features of the virtual avatar does not include the respective avatar feature.

47. The method of claim 33, further comprising:
in accordance with a determination that the detected movement of the one or more facial features includes movement of a fourth facial feature from a first position to a second position, moving a fourth avatar feature from an initial position to a modified position based on a magnitude of displacement of the fourth facial feature when moving from the first position to the second position.

48. The method of claim 33, further comprising:
in accordance with a determination that the detected movement of the one or more facial features includes movement of a fifth facial feature, moving a fifth avatar feature based on at least one of a direction and magnitude of movement of the fifth facial feature.

* * * * *

UNITED STATES PATENT AND TRADEMARK OFFICE
CERTIFICATE OF CORRECTION

| | | |
|---|---|---|
| PATENT NO. | : 12,482,161 B2 | Page 1 of 1 |
| APPLICATION NO. | : 17/461014 | |
| DATED | : November 25, 2025 | |
| INVENTOR(S) | : Nicolas Scapel et al. | |

It is certified that error appears in the above-identified patent and that said Letters Patent is hereby corrected as shown below:

On the Title Page

In Column 2, Line 3 (Other Publications), delete "InComputer" and insert -- In Computer --.

Signed and Sealed this
Thirteenth Day of January, 2026

John A. Squires
*Director of the United States Patent and Trademark Office*